INVENTORS:
Cecil H. Burns, Jr.
John F. Donan
Albert E. Wolfe, Jr.
Donald E. Eckdahl
Daniel J. Daugherty
Bernard T. Wilson
Hrant H. Sarkissian
Carl Bergst
Louis A Kline
By John J. Matlago, Agent
Their Attorneys

| Decimal Equivalent | Tape Channels Ch4a Ch4b | Ch3a Ch3b | Ch2a Ch2b | Ch1a Ch1b |
|---|---|---|---|---|
| 0 | 0 | 0 | 1 | 1 |
| 1 | 0 | 1 | 0 | 0 |
| 2 | 0 | 1 | 0 | 1 |
| 3 | 0 | 1 | 1 | 0 |
| 4 | 0 | 1 | 1 | 1 |
| 5 | 1 | 0 | 0 | 0 |
| 6 | 1 | 0 | 0 | 1 |
| 7 | 1 | 0 | 1 | 0 |
| 8 | 1 | 0 | 1 | 1 |
| 9 | 1 | 1 | 0 | 0 |

INVENTORS:
Cecil H. Burns, Jr.
John F. Donan
Albert E. Wolfe, Jr.
Donald E. Eckdahl
Daniel J. Daugherty
Bernard T. Wilson
Hrant H. Sarkissian
Their Attorneys.

INVENTORS:
Cecil H. Burns, Jr.
John F. Donan
Albert E. Wolfe, Jr.
Donald E. Eckdahl
Daniel J. Daugherty
Bernard T. Wilson
Hrant H. Sarkissian By Earl Benst
Louis A. Kline
John T. Matlagos, Agent
Their Attorneys INVENTORS:
Cecil H. Burns, Jr
John F. Donan
Albert E. Wolfe, Jr.
Donald E. Eckdahl
Daniel J. Daugherty
Bernard T. Wilson
Hrant H. Sarkissian
Leonard Bernst
Louis A Kline
By John T. Matlago, Agent
Their Attorneys INVENTORS:
Cecil H. Burns, Jr
John F. Donan
Albert E. Wolfe, Jr.
Donald E. Eckdahl
Daniel J. Daugherty
Bernard T. Wilson
Hrant H. Sarkissian
By Carl Beust
Louis A. Kline
John T. Matlago, Agent
Their Attorneys INVENTORS:
Cecil H. Burns, Jr.
John F. Donan
Albert E. Wolfe, Jr.
Donald E. Eckdahl
Daniel J. Daugherty
Bernard T. Wilson
Hrant H. Sarkissian By Earl Benst
Louis A Kline
John T. Matlago, Agent
Their Attorneys.

INVENTORS:
Cecil H. Burns, Jr.
John F. Donan
Albert E. Wolfe, Jr.
Donald E. Eckdahl
Daniel J. Daugherty
Bernard T. Wilson
Hrant H. Sarkissian
Earl Benst
By Louis A Kline
John J. Matlago, Agent
Their Attorneys.

Fig. 12

| | | FLIP-FLOPS | | | | |
|---|---|---|---|---|---|---|
| | | A4 | A3 | A2 | A1 | |
| Counting Cycle | $P_0$ | 0 | 1 | 0 | 1 | |
| | $P_1$ | 0 | 1 | 1 | 0 | |
| | $P_2$ | 0 | 1 | 1 | 1 | $P_2 = A_1 A_2 A_3 A_4'$ |
| | $P_3$ | 1 | 0 | 0 | 0 | $P_3 = A_1' A_2' A_3'$ |
| | $P_4$ | 1 | 0 | 0 | 1 | $P_4 = A_1 A_2' A_3'$ |
| | $P_5$ | 1 | 0 | 1 | 0 | $P_5 = A_1' A_2 A_3'$ |
| | $P_6$ | 1 | 0 | 1 | 1 | $P_6 = A_1 A_2 A_3'$ |
| | $P_7$ | 1 | 1 | 0 | 0 | $P_7 = A_1' A_2' A_3 A_4$ |
| | $P_8$ | 1 | 1 | 0 | 1 | $P_8 = A_1 A_2' A_3 A_4$ |
| | $P_9$ | 1 | 1 | 1 | 0 | |
| | $P_{10}$ | 1 | 1 | 1 | 1 | |
| | $P_\ell$ | 0 | 1 | 0 | 0 | $P_\ell = A_1' A_2' A_4'$ |
| | | | | | | |
| Reset | $B_\ell$ | 0 | 0 | 1 | 1 | $B_\ell = A_3' A_4'$ |

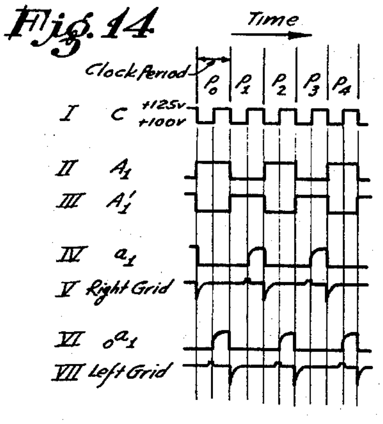

Fig. 15

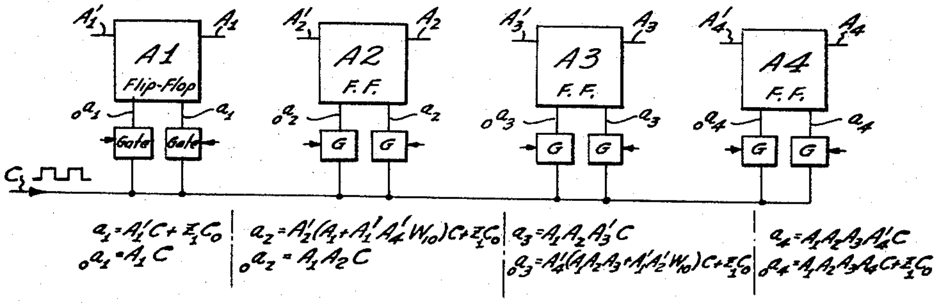

Fig. 13

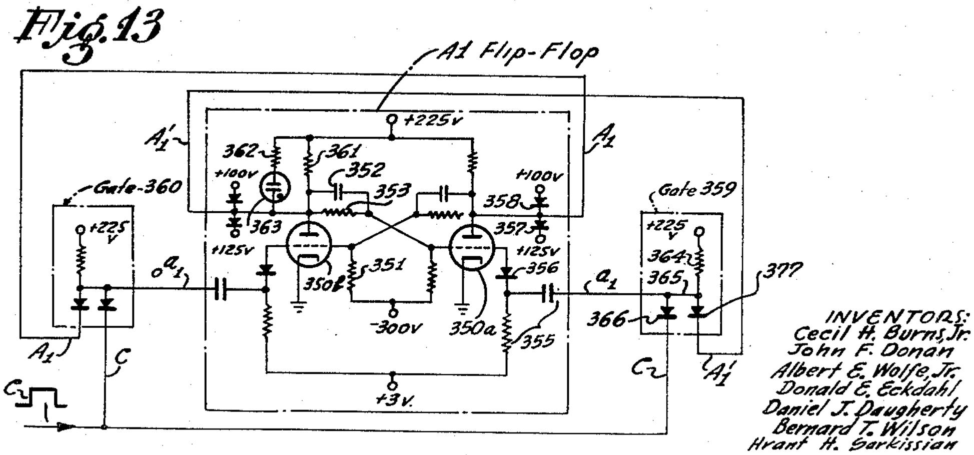

INVENTORS:
Cecil H. Burns Jr.
John F. Donan
Albert E. Wolfe, Jr.
Donald E. Eckdahl
Daniel J. Daugherty
Bernard T. Wilson
Hrant H. Sarkissian
Carl Berst
By Louis A Kline
John T. Matlago, Agent
Their Attorneys INVENTORS:
Cecil H. Burns, Jr
John F. Donan
Albert E. Wolfe, Jr.
Donald E. Eckdahl
Daniel J. Daugherty
Bernard T. Wilson
Hrant H. Sarkissian Carl Beust
By Louis A Kline
John T. Matlago, Agent
Their Attorneys.

Fig. 18
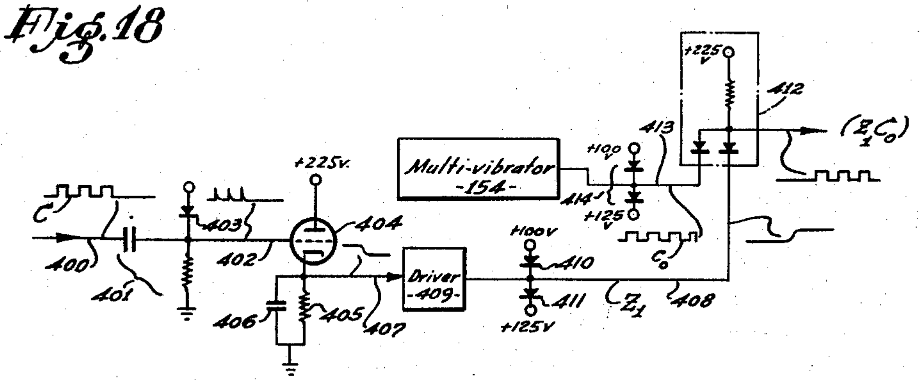
Fig. 20
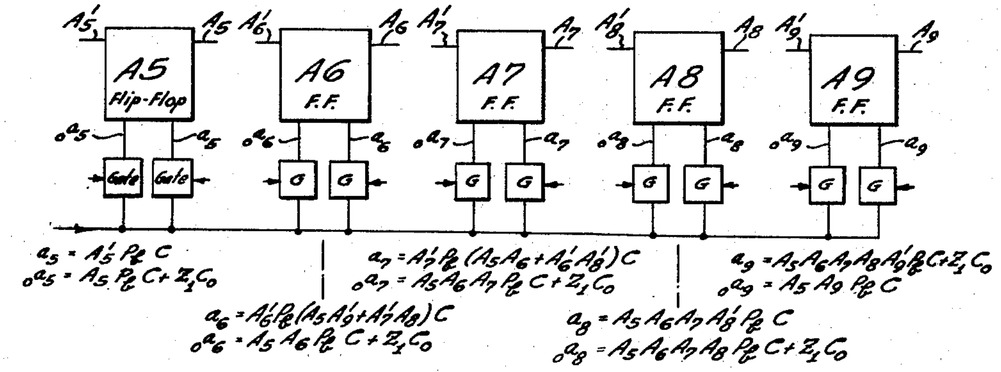
Fig. 19
| | FLIP-FLOPS | | | | |
|---|---|---|---|---|---|
| | A9 | A8 | A7 | A6 | A5 |
| $W_S$ | 1 | 0 | 0 | 0 | 0 |
| $W_0$ | 1 | 0 | 0 | 0 | 1 |
| $W_1$ | 0 | 0 | 0 | 0 | 0 |
| $W_2$ | 0 | 0 | 0 | 0 | 1 |
| $W_3$ | 0 | 0 | 0 | 1 | 0 |
| $W_4$ | 0 | 0 | 0 | 1 | 1 |
| $W_5$ | 0 | 0 | 1 | 0 | 0 |
| $W_6$ | 0 | 0 | 1 | 0 | 1 |
| $W_7$ | 0 | 0 | 1 | 1 | 0 |
| $W_8$ | 0 | 0 | 1 | 1 | 1 |
| $W_9$ | 0 | 1 | 0 | 0 | 0 |
| $W_{10}$ | 0 | 1 | 1 | 1 | 1 |
One Word Block ($W_S$ – $W_{10}$)
$W_S = A_5' A_9$
$W_0 = A_5 A_9$
$W_1 - W_{10}$ Inclusive $= A_9'$
$W_{10} = A_5 A_6 A_7 A_8$
INVENTORS:
Cecil H. Burns, Jr.
John F. Donan
Albert E. Wolfe, Jr.
Donald E. Eckdahl
Daniel J. Daugherty
Bernard T. Wilson
Hrant H. Sarkissian
Carl Beust
By Louis A Kline
John T. Matlago, Agent
Their Attorneys INVENTORS:
Cecil H. Burns, Jr.
John F. Donan
Albert E. Wolfe, Jr.
Donald E. Eckdahl
Daniel J. Daugherty
Bernard T. Wilson
Hrant H. Sarkissian By Louis A Kline
John J. Matlago, Agent
Their Attorneys Sept. 27, 1960 C. H. BURNS, JR., ET AL 2,954,546

MAGNETIC TAPE STORAGE SYSTEM

Filed Oct. 18, 1954 16 Sheets-Sheet 12

INVENTORS
Cecil H. Burns, Jr.
John F. Donan
Albert E. Wolfe, Jr.
Donald E. Eckdahl
Daniel J. Daugherty
Bernard T. Wilson
Hrant H. Sarkissian Carl Beust
By Louis A Kline
John T. Matlago, Agent
Their Attorneys $$C_s = C\{W_0 R_{41} + (W_{1-10}) R_{31} + R_{11}\}$$
$$Q_1 = W_0 R_{41} + (W_{1-10}) R_{31} + R_{11}\}$$

INVENTORS:
Cecil H. Burns, Jr.
John F. Donan
Albert E. Wolfe, Jr.
Donald E. Eckdahl
Daniel J. Daugherty
Bernard I. Wilson
Hrant H. Sarkissian By Louis A. Kline
John T. Matlago, agent
Their Attorneys

Fig. 23

| | M4 | M3 | M2 | M1 |
|---|---|---|---|---|
| From Reader Flip-Flops | M4 | M3 | M2 | M1 |
| From the Register | B4 | B3 | B2 | B1 |
| 0 | 0 | 0 | 1 | 1 |
| 1 | 0 | 1 | 0 | 0 |
| 2 | 0 | 1 | 0 | 1 |
| 3 | 0 | 1 | 1 | 0 |
| 4 | 0 | 1 | 1 | 1 |
| 5 | 1 | 0 | 0 | 0 |
| 6 | 1 | 0 | 0 | 1 |
| 7 | 1 | 0 | 1 | 0 |
| 8 | 1 | 0 | 1 | 1 |
| 9 | 1 | 1 | 0 | 0 |

Binary-Coded Decimal Digits

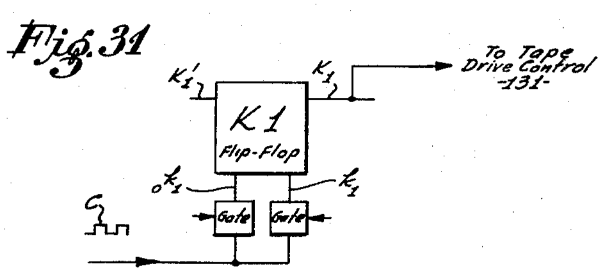

Fig. 31

| | |
|---|---|
| Forward Tape Motion | $k_1=(P_2+P_3+P_4+P_5)W_0F_1H_1D_4C$<br>$_0k_1=(P_2+P_3+P_4+P_5)W_0F_1H_1D_4'C$ |
| Reverse Tape Motion | $k_1=(P_5+P_6+P_7+P_8)W_{10}R_1H_1D_4C$<br>$_0k_1=(P_5+P_6+P_7+P_8)W_{10}R_1H_1D_4'C$ |
| Reset | $k_1=W_5P_6H_1C$<br>$_0k_1=W_5B_\ell C_0$ |
| Computer STOP Signal | $k_1=(U_{1R}+U_{1W})C$<br>$_0k_1=0$ |

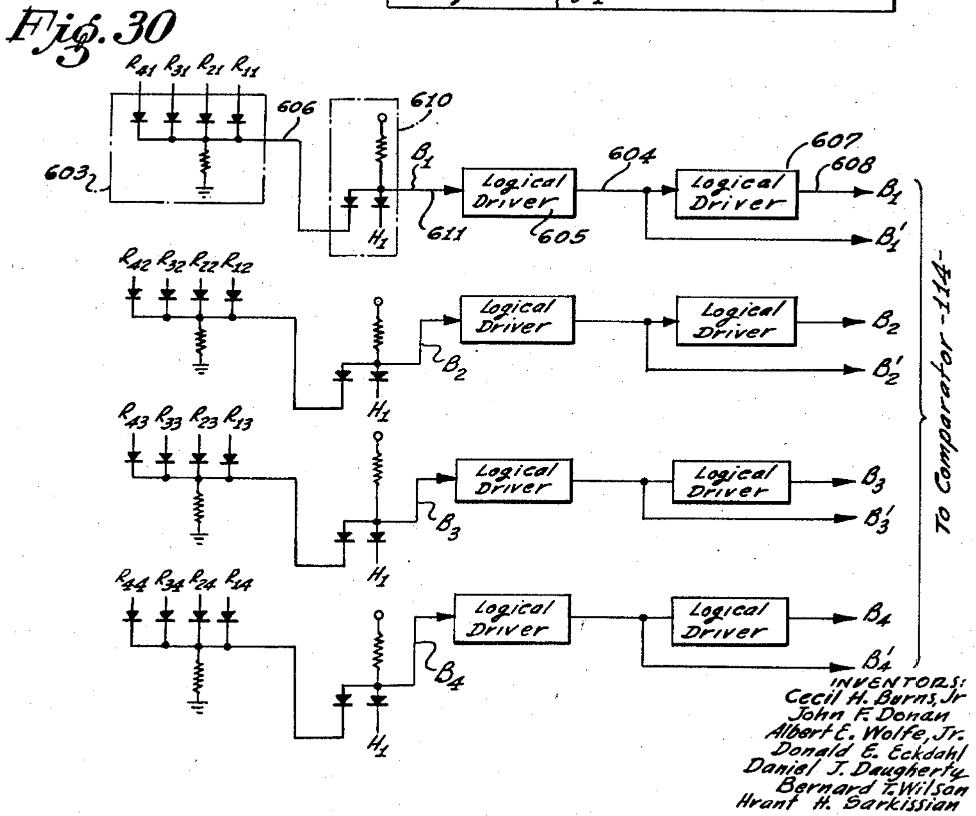

Fig. 30

INVENTORS:
Cecil H. Burns, Jr
John F. Donan
Albert E. Wolfe, Jr.
Donald E. Eckdahl
Daniel J. Daugherty
Bernard T. Wilson
Hrant H. Sarkissian By Earl Benst
Louis A Kline
John T. Matlago, Agent
Their Attorneys INVENTORS
Cecil H. Burns, Jr.
John F. Donan
Albert E. Wolfe, Jr.
Donald E. Eckdahl
Daniel J. Daugherty
Bernard T. Wilson
Hrant H. Sarkissian By Lozarl Benst
Louis A Kline
John J. Matlago, Agent
Their Attorneys INVENTORS:
Cecil H. Burns, Jr.
John F. Donan
Albert E. Wolfe, Jr.
Donald E. Eckdahl
Daniel J. Daugherty
Bernard T. Wilson
Hrant H. Sarkissian By Earl Beust
Louis A Kline
John T. Matlago, Agent
Their Attorneys United States Patent Office 2,954,546

Patented Sept. 27, 1960

2,954,546

MAGNETIC TAPE STORAGE SYSTEM

Cecil H. Burns, Jr., Norwalk, John F. Donan, Reseda, Albert E. Wolfe, Jr., Downey, Donald E. Eckdahl, Palos Verdes Estates, Daniel J. Daugherty, Torrance, Bernard T. Wilson, Los Angeles, and Hrant H. Sarkissian, Pacific Palisades, Calif., assignors to The National Cash Register Company, Dayton, Ohio, a corporation of Maryland Filed Oct. 18, 1954, Ser. No. 462,752

19 Claims. (Cl. 340—174.1)

The present invention relates to data storage systems, and more particularly to apparatus for enabling magnetic tape to be employed, for example, as an auxiliary memory for a large scale digital computer.

In electronic computational activity, the main memory of a large scale digital computer, such as the magnetic drum, provides sufficient internal storage for the execution of most problems of moderate complexity. However, the drum memory capacity is limited, and for those applications which require exceptionally long programs, or many programs, or large quantities of tabular data some automatic data storage medium external to the computer is necessary. A magnetic tape memory storage system is highly suitable for such auxiliary memories because of the additional large memory area it provides and its flexibility of handling. Thus, in addition to providing greatly expanded memory facilities for the computer with which it is used, it may also serve as a quickly accessible computer repository of tables of empirical and higher functions, computer subroutines, and computer conversion programs; and it is extremely useful as input-output equipment. When a large volume of information or input-output data is to be stored, several magnetic tape storage systems may be connected to a single computer; similarly, additional systems may be added to a computer system as memory storage requirements increase. Also, since the tape employed in the tape handling system is removable without obliterating or altering information stored on it, a library of information or input-output data may be accumulated for intermittent use in the computer system.

One object of this invention is, therefore, to provide apparatus whereby an extremely large quantity of information may be magnetically stored on a moving tape.

Another object of this invention is to provide circuitry whereby any desired portion along the length of a magnetic tape can be automatically selected so that information may be recorded thereon or read therefrom.

Another object of this invention is to provide circuitry arrangement for controlling the movement of a magnetic tape so as to enable it to be automatically repositioned, with respect to a magnetic head communicating therewith, from the storage address it is in to any other desired storage address along its length.

Another object of the invention is to provide a novel, reliable circuitry for generating clock pulses in response to timing signals sensed from a moving tape such that the fall of the clock pulse always occurs at the end of the period of the clock pulse signal sensed from the tape, irrespective of the direction of motion of the tape.

Another object of the present invention is to provide an apparatus whereby a command, as for example from a computer, to locate a given area on a tape may be instantly registered, thus freeing the computer to perform other computational processes during the time the area is being located on the tape.

Another object of the present invention is to provide apparatus for magnetically storing information on a tape medium in such a manner that loss of information because of dust or surface imperfections of the tape medium is minimized.

Other objects of this invention will be pointed out in the following description and claims, and illustrated in the accompanying drawings which disclose, by way of example, the principle of the invention and the best mode which has been contemplated of applying that principle.

In the drawings:

Fig. 12 is a table showing the counting cycle of the digit counter.

Fig. 13 shows the circuitry of the A1 flip-flop.

Fig. 14 is a graph of the waveforms appearing at points on the A1 flip-flop circuitry.

Fig. 15 is a block diagram of the A1, A2, A3, and A4 flip-flops in the digit counter.

Fig. 18 presents the schematic circuit for generating the reset signal used in the digit and word counters.

Fig. 19 is a table of the counting cycle of the word counter.

Fig. 20 is a block diagram of the A5, A6, A7, A8, and A9 flip-flops in the word counter.

Figure 21:
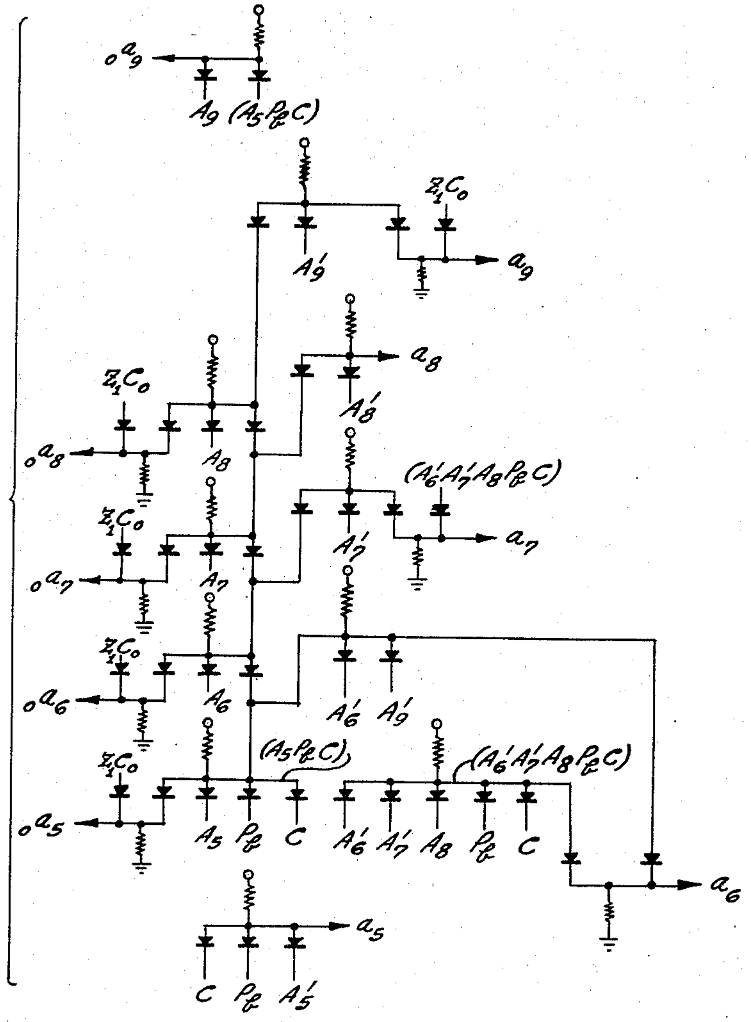

Fig. 21 is a schematic diagram of the input circuitry to the A5, A6, A7, A8, and A9 flip-flops.

Figure 22:
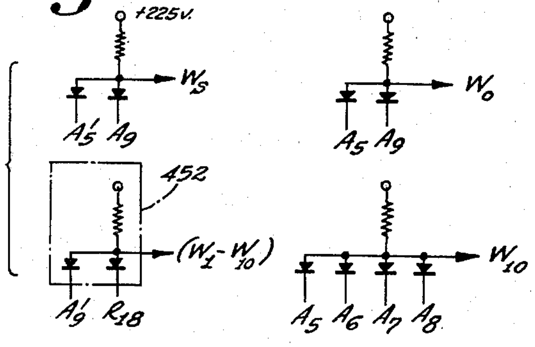

Fig 22 shows the diode networks used for generating the outputs of the word counter.

Fig. 23 is a table of the decimal equivalent of the states of the M1, M2, M3, and M4 flip-flops, and B1, B2, B3, and B4 propositions.

Figure 24:
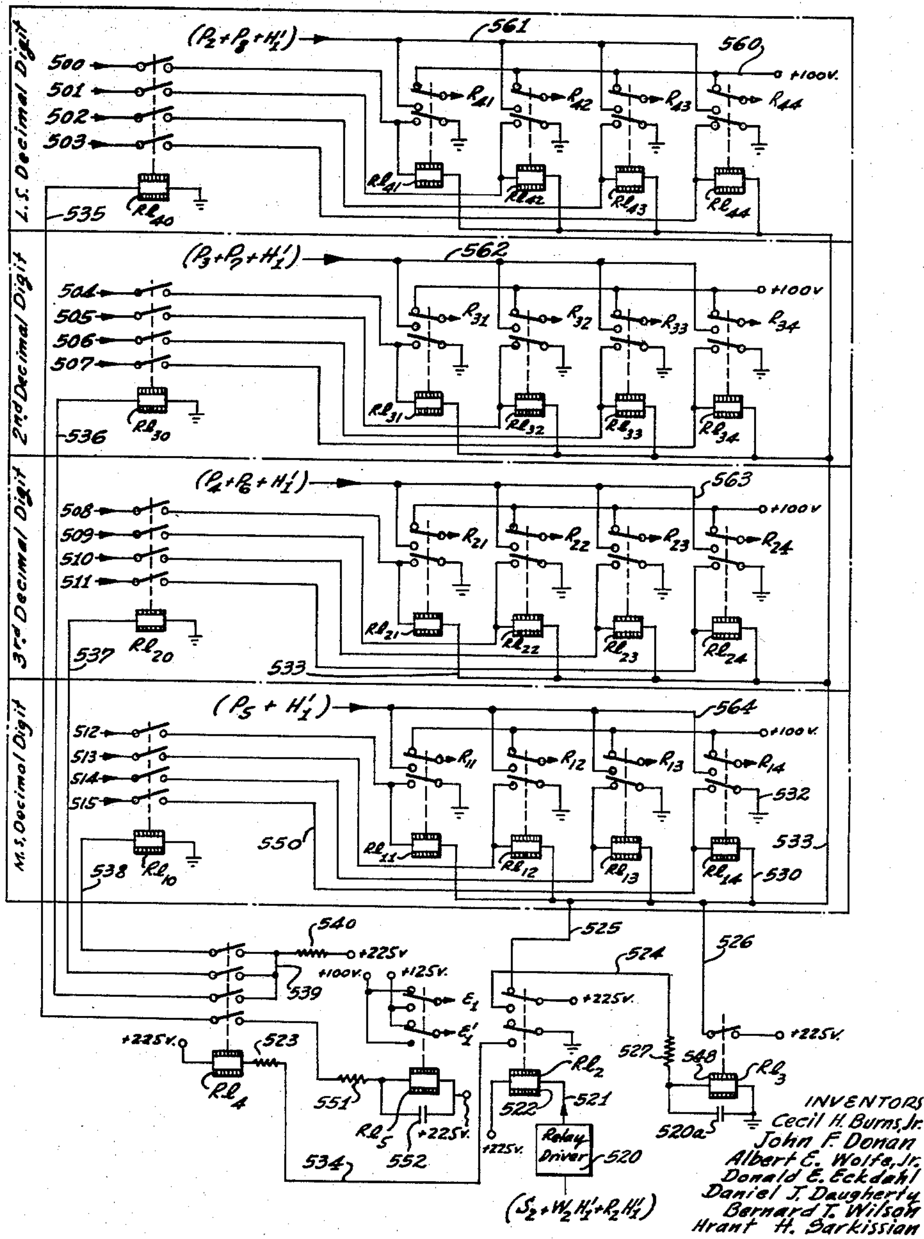

Fig. 24 is a detailed diagram of the relay section of the register.

Figure 25:
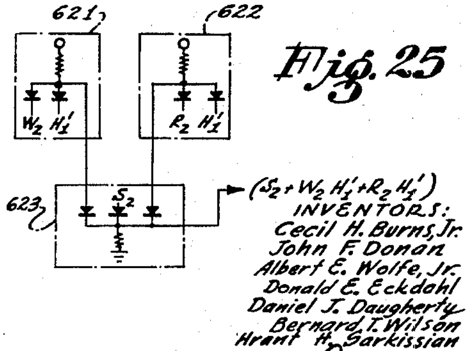

Fig. 25 shows the diode network representing the input to the register.

Figure 26:
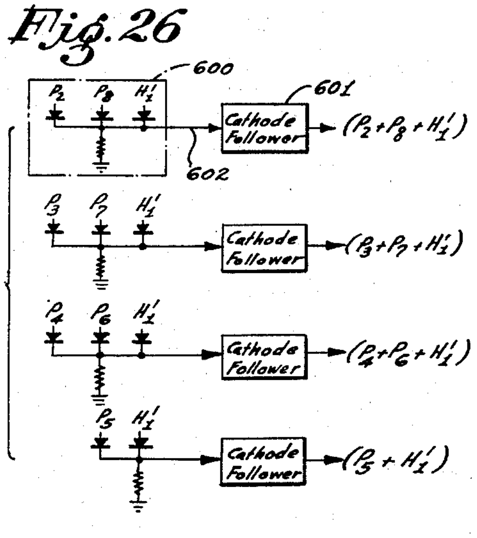

Fig. 26 shows the diode networks referred to in Fig. 24.

Figure 27:
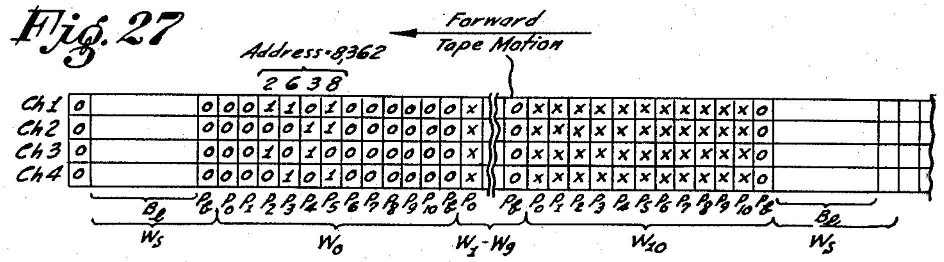

Fig. 27 shows a section of the magnetic tape with the actual digit and word positions indicated thereon.

Figure 28:
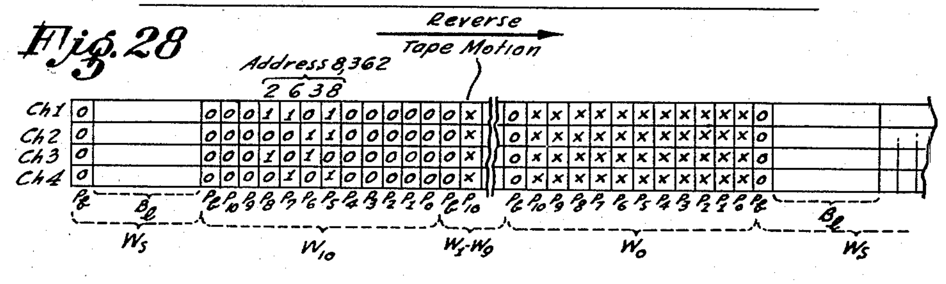

Fig. 28 shows a section of the magnetic tape with the apparent digit and word positions indicated thereon when the tape is traveling in reverse.

Figure 29:
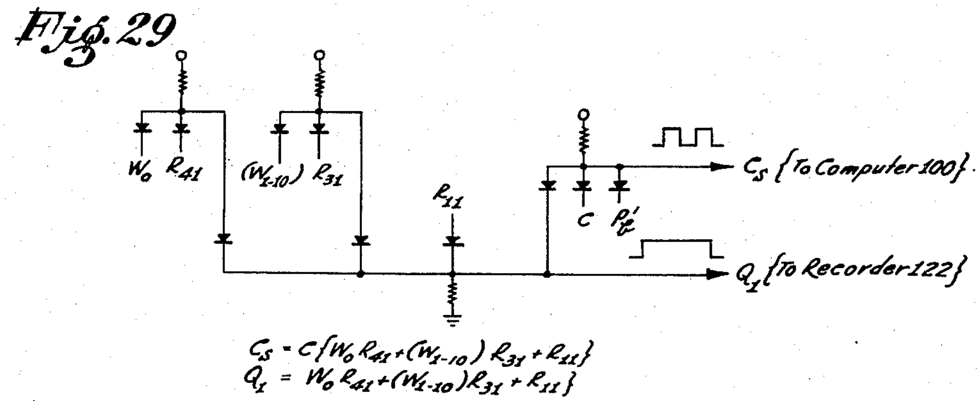

Fig. 29 shows the diode network for generating the gated clock pulses $C_8$ and the inhibiting product $Q_1$.

Fig. 30 shows the networks for generating the outputs of the register.

Fig. 31 is a block diagram of the K1 flip-flop in the comparator.

Figure 32:
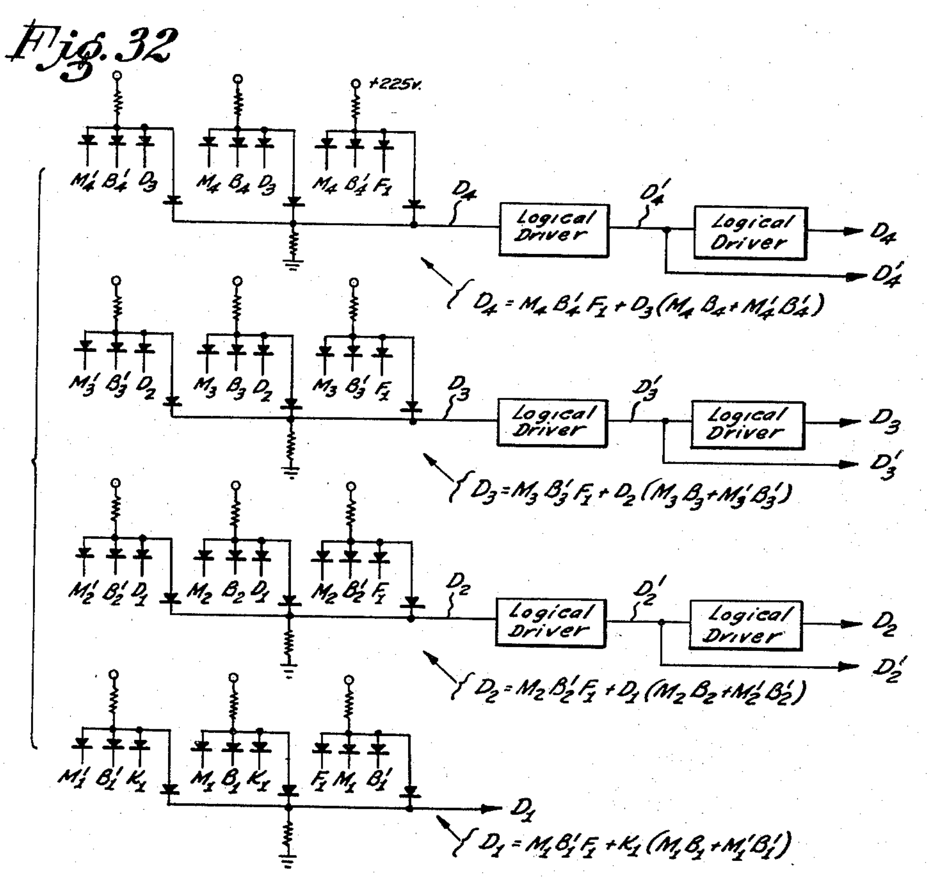

Fig. 32 is a schematic diagram of the diode networks representing a portion of the inputs to the K1 flip-flop.

Figure 33:
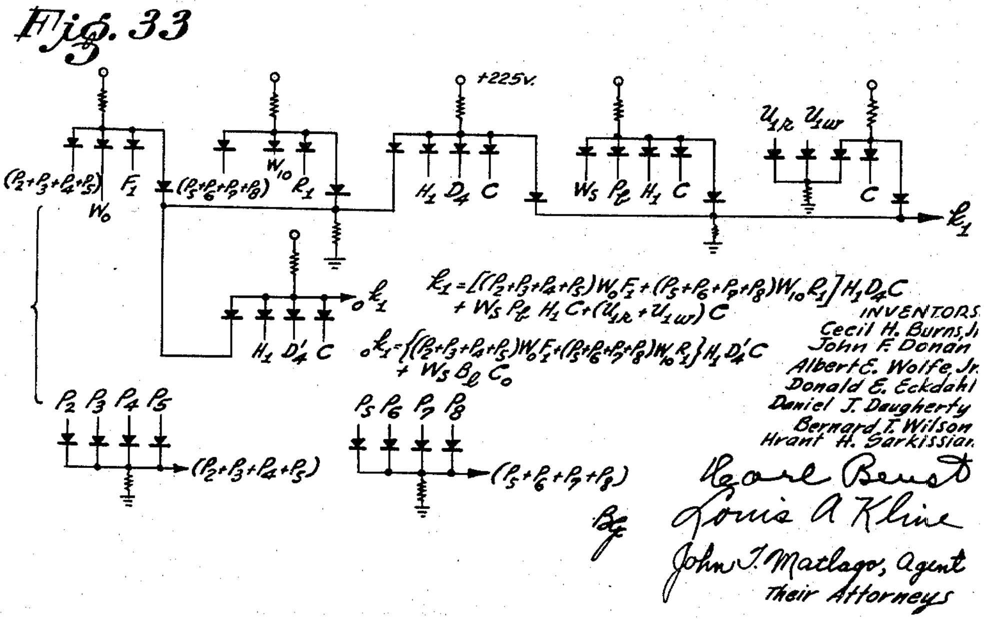

Fig. 33 is a diagram of the diode network representing the remainder of the inputs to the K1 flip-flop in the comparator.

Figure 34:
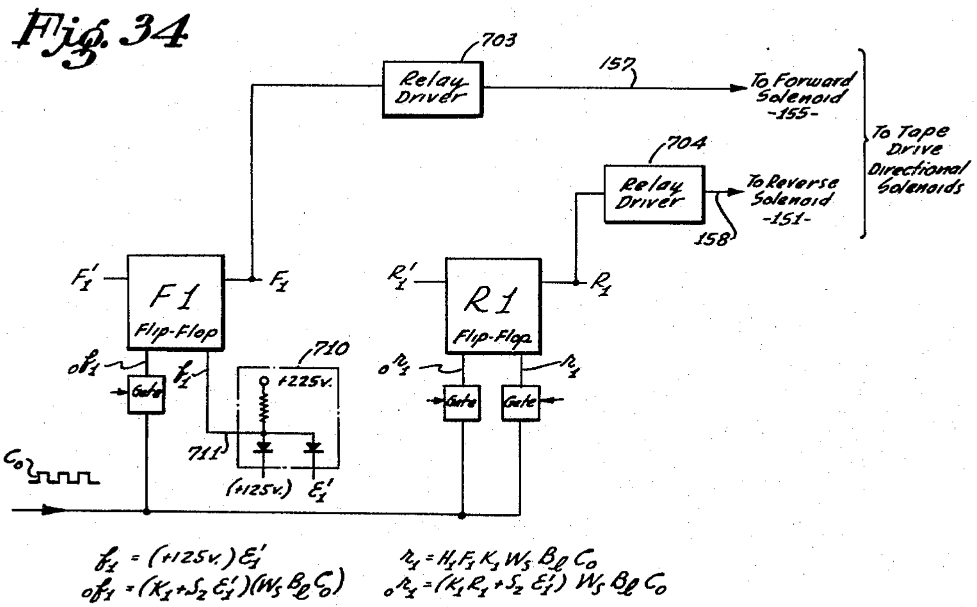

Fig. 34 is a block diagram of the flip-flops in the tape drive control.

Figure 35:
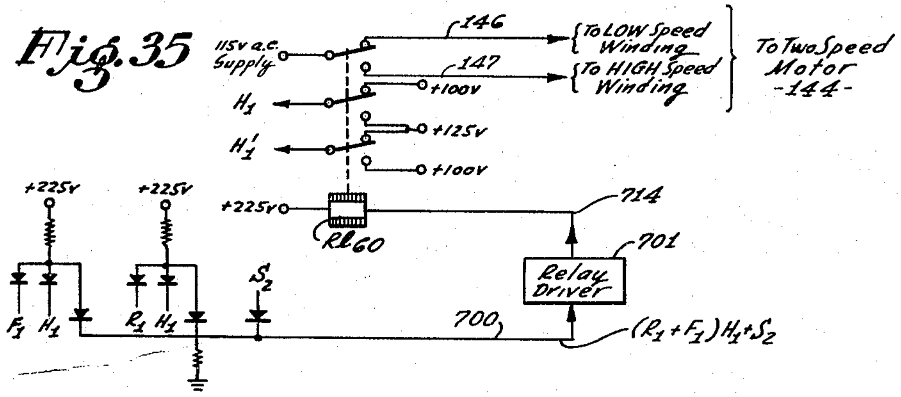

Fig. 35 is a diagram of the circuitry for controlling the two-speed motor in the tape drive control.

Figure 36:
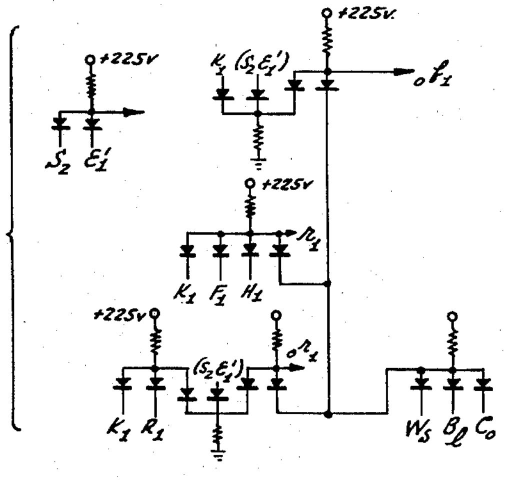

Fig. 36 is a detailed circuit of the diode networks which represent the inputs to the flip-flops in the tape drive control.

*General description*

Figure 1:
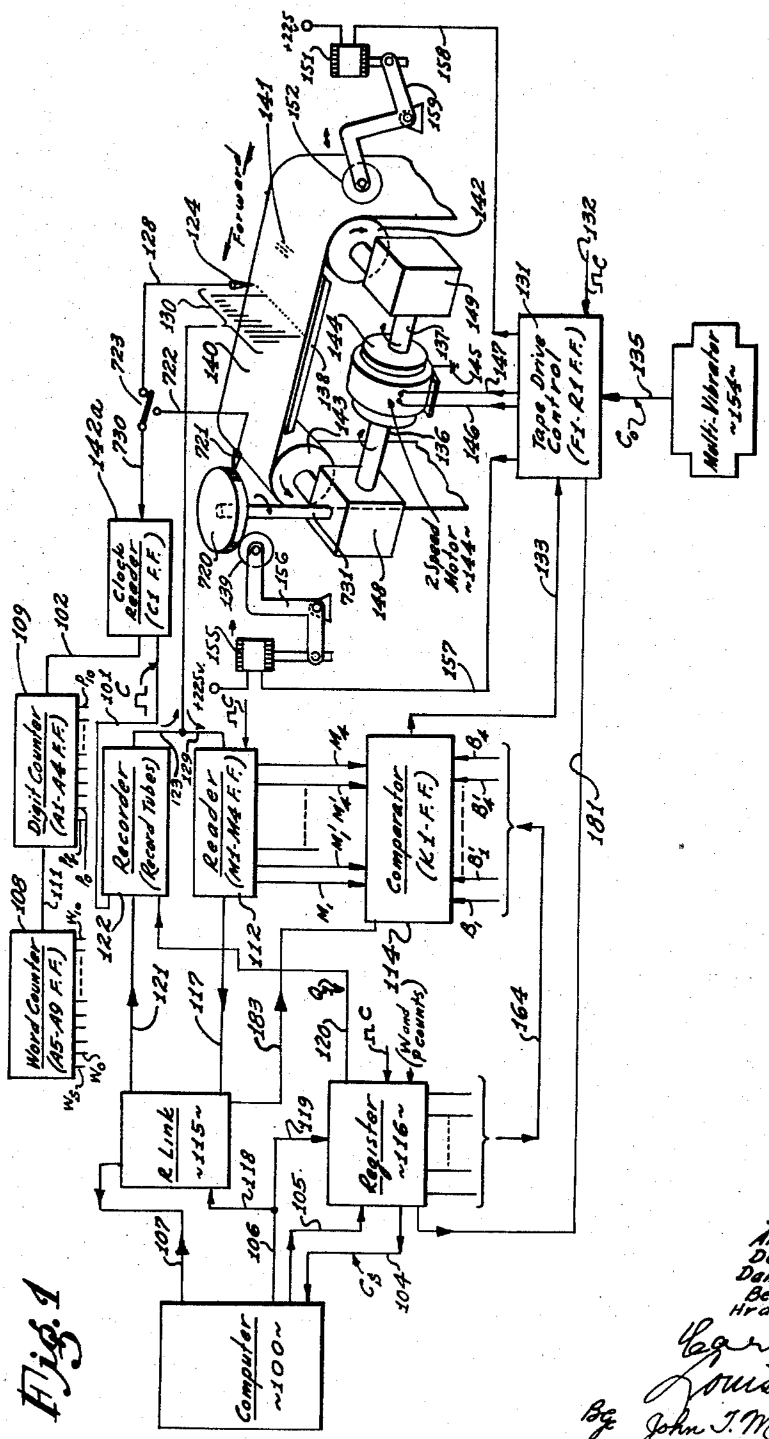
Fig. 1 is a block diagram for explaining the cooperative relation of the various components of the magnetic tape storage system of the present invention.

Referring to Fig. 1, a general view of the preferred embodiment of the present invention is presented. Broadly the preferred embodiment of the present invention performs the following operations: (1) locates any desired portion of a moving tape as identified by address signals received from an outside source; and either (2) records in magnetic form, on the selected portion of the tape, information received from an outside source in electrical pulse form; or (3) reads in electrical pulse form to an outside source the information magnetically stored on the tape.

The magnetic tape storage unit is an auxiliary device which performs the above-mentioned operations in response to commands received from a source, such as a computer. These commands are of three kinds: (1) Search, (2) Record, and (3) Read; and are referred to as "operational commands."

The information received from the source, in the present example the computer 100, is recorded on the tape 140 in magnetic form. The tape 140 is composed of a flexible ribbon of plastic material with a coating 141 of magnetic material, such as ferric oxide, deposited on the upper surface thereof. The information is received from the computer 100 in the form of electrical pulses representing binary coded decimal digits. As is well known in the prior art, these binary digits are "ones" and "zeros." The binary digits, so received in electrical pulse form, are recorded on the tape 140 in small unit areas of saturated magnetic flux patterns either in one direction or the opposite direction, i.e., a saturated flux unit area in one direction representing a binary "one," and a saturated flux unit area in the opposite direction representing a binary "zero." The unit areas of magnetic flux above referred to are defined on the magnetic tape transversely by channels and longitudinally by "clock pulses."

Figures 2, 3:
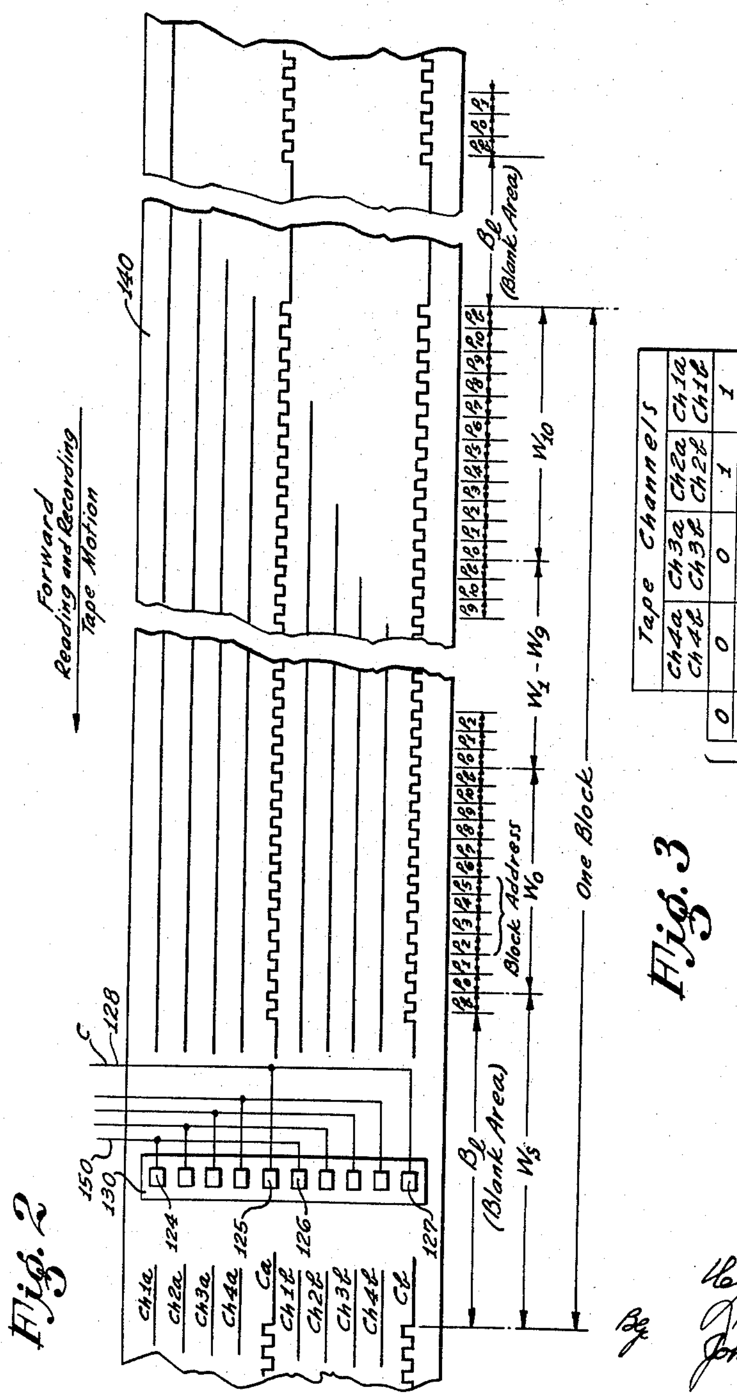
Fig. 2 shows the details of a section of the magnetic tape showing the flux area divisions.
Fig. 3 shows a table representing the binary-coded decimal code used throughout the invention.

Referring momentarily to Fig. 2, which is a drawing of a section of the magnetic tape 140 (Fig. 1), it may be seen that the tape is transversely divided into ten channels; i.e., clock channels *Ca* and *Cb*, and information channels *Ch1a*, *Ch2a*, *Ch3a*, *Ch4a*, *Ch1b*, *Ch2b*, *Ch3b*, and *Ch4b*. Because of imperfections in the tape magnetic medium and the inevitable presence of dust particles, both the information and "clock pulses" are recorded in duplicate. This affords four effective information channels and one clock channel, each in duplicate, to insure against losses. As previously stated, the unit areas of magnetic flux on the tape are defined longitudinally by "clock pulses." The magnetic tape is prepared by permanently recording on the clock channels, *Ca* and *Cb*, in duplicate, as the tape moves, a magnetic flux pattern induced in response to electrical square wave signals. Each cycle of this square wave defines a unit longitudinal length on the tape, hereinafter referred to as clock pulse periods. Clock pulses are recorded on the tape in groups of 133 pulses, each group of clock pulses being separated by a blank area ½" in length on the tape where no clock pulses are recorded. The blank area, together with the following 133 clock pulses, is known as a "block" and one block occupies approximately 1½ inches of length on the tape. The entire length of the tape in the preferred embodiment is thereby divided into 10,000 blocks. Each clock pulse period defines a magnetic flux area, which represents a binary digit, on each of the eight channels. As previously explained, the channels are in duplicate; therefore, during each clock pulse period, four binary bits of information may be transversely recorded, in duplicate, on four pairs of information channels, i.e., *Ch1a*—*Ch1b*, *Ch2a*—*Ch2b*, *Ch3a*—*Ch3b*, and *Ch4a*—*Ch4b*. As is well known in the prior art, it requires four binary digits to represent a single decimal digit in a binary coded system. In the present invention, since four binary bits of information are recorded during each clock pulse period, each of the said clock pulse periods may define the area for each decimal digit of information recorded on the tape. As shown in Fig. 2, these decimal digit positions are referred to as $P_0$, $P_1$, $P_2$, $P_3$, $P_4$, $P_5$, $P_6$, $P_7$, $P_8$, $P_9$ $P_{10}$ and $P_b$. Each block is further divided into twelve sections, hereinafter refered to as "words," eleven of the said words being composed of the above twelve decimal digit positions, designated as $W_0$, $W_1$, $W_2$, $W_3$, $W_4$, $W_5$, $W_6$, $W_7$, $W_8$, $W_9$, and $W_{10}$. The twelfth word, designated as $W_s$, is made up of the previously referred to "blank" area of each block (wherein no clock pulses are recorded), and one decimal digit position called $P_b$.

Since the non-return-to-zero method of storing information on the tape is employed, the recorded flux pattern on each information channel only changes on successive clock pulse positions when the binary digits of a sequence change from a zero to a one or vice versa.

When using a non-return-to-zero method, it is necessary to provide for the memory flip-flops to always enter into the succeeding word period in a zero state. If this were not done, it is possible that the flip-flops would not be in the proper state when they are made effective at the beginning of some word period. This will be explained in more detail later on.

In the present invention, the decimal digit position $P_b$ is used for recording this reference zero on each of the four duplicated information channels. This reference decimal digit position is therefore not available for recording information from the computer, leaving eleven available decimal digit positions within each word, except $W_s$. Each block is identified by binary digits representing four decimal digits recorded in decimal digit positions $P_2$, $P_3$, $P_4$, and $P_5$ of its $W_0$ word. These block-identifying signals are hereinafter referred to as the "block address," or simply "address."

Both the address and information are recorded on the tape in the excess-three coded decimal system using four binary digits to represent each decimal digit. A conventional excess 3 coded decimal table is presented in Fig. 3. Since channels *Ch1b*, *Ch2b*, *Ch3b*, and *Ch4b* are duplicates of channels *Ch1a*, *Ch2a*, *Ch3a*, and *Ch4a*, both channels of each pair appear at the top of the binary columns in the table. The decimal equivalents of the binary digits recorded in the four channels appear at the left of the table.

In the present system the address and information are recorded on the tape with the least significant decimal digit to the left of the most significant decimal digit. For example, the least significant decimal digit of the address of a block is recorded in the $P_2$ pulse position of word $W_0$, and the following decimal digits are recorded in the $P_3$ pulse position, the $P_4$ pulse position, and the $P_5$ pulse position, respectively.

Referring back to Fig. 1 momentarily, the multiple-head 130 is held stationary near the surface of the moving tape 140, and records the magnetic flux patterns on the clock and information channels as well as senses the clock and information channels.

Returning to Fig. 2, it is seen that each channel is separated from its duplicate channel by four of the other channels, as for example channels $Ch1a$ and $Ch1b$. This further insures against loss of information by minute imperfections or dust particles on the surface of the tape. Each of the five duplicated channels has a pair of pickups in the multiple-head 130. Each of the pairs of heads are connected in series, such as heads 124 and 126 of channels $Ch1a$ and $Ch1b$, which has a single input-output line 150. The duplicated clock pulse channels $Ca$ and $Cb$ are sensed by heads 125 and 127 connected in series to the single output line 128.

The clock pulses, so sensed, not only define the unit areas on the tape surface, as previously explained, but also synchronize the operation of all the circuits in the magnetic tape storage unit so that the operations of the unit function in accordance with a basic timing logic hereinafter described.

Referring to Fig. 1, the mechanics of motion of the tape 140 will now be described. The two-speed motor 144 is an induction motor consisting of two separate sets of stator windings, one extremity of both windings being connected to a common ground 145. The other extremity of the high-speed winding is fed by line 147, and the other extremity of the low-speed winding is fed by line 146 to the tape drive control 131. The tape drive control 131 consists of flip-flop circuits and relays controlled by the clock pulses received on line 132 and signals received on lines 133, 181, and 135. The equipment and operation of the tape drive control will be explained in complete detail later on. Either the high-speed or low-speed winding of the motor 144 is energized at all times, causing the capstans 142 and 143 to rotate either at a high or low speed by way of the dual motor shafts 136 and 137 and the two gear boxes 148 and 149. It should be understood that the motor 144 always rotates in one direction only, irrespective of speed; and, therefore, the capstans 142 and 143 always rotate in the same direction, i.e., capstan 142 always rotates clockwise and capstan 143 always rotates counterclockwise. The tape 140 is threaded over the circumferential surface of the capstan 142, on the upper surface of the stationary support 138 and over the circumferential surface of the capstan 143. The two capstans are of non-magnetic metal with the circumferential surfaces highly polished, resulting in little friction between the capstans and the tape. The tape normally remains stationary as the frictional components between the tape and each capstan are opposite and nearly equal, any unbalance being absorbed by the slight friction between the tape and the stationary support 138, which is also of non-magnetic metal with the upper surface polished.

The tape is moved in the forward direction only for recording and reading information onto and from the tape. The forward direction of motion of the tape 140 is from right to left as indicated. Remembering that the two capstans are always rotating and that the tape remains stationary because of the equal and opposite frictional components of force between each capstan and the tape, a substantial increase in friction between the tape 140 and the rotating capstan 143 would cause the tape to move in the forward direction. This is accomplished by pressing the free-rolling rubber surfaced roller 139 against the capstan 143 which almost instantaneously sets the tape in forward motion at the peripheral speed of the capstan. The roller 139 is pressed against the capstan 143 by means of the mechanical link 156 and the electrical solenoid 155 which is energized by line 157 from the tape drive control 131. Thus the capstans are continually rotating and the tape is moved in a forward direction at the peripheral speed of the capstans by energizing the electrical solenoid 155 by line 157 from the tape drive control 131. In searching for a particular block of information, the tape is moved either in the forward or reverse direction at high speed in order to locate the desired block of information in the shortest possible time. The tape is set in the reverse motion by energizing solenoid 151 by way of line 158 which, by link 159, presses the roller 152 against the reverse capstan 142. It should be clear that only one of the solenoids 151 and 155 is energized at a time, depending on whether it is desired to move the tape 140 forward or reverse.

Since the clock pulses C are generated only when the tape 140 is in motion, provision is made to substitute an auxiliary source of square wave pulses for controlling the tape drive control 131. The auxiliary source of pulses is supplied by the multivibrator 154 which feeds the tape drive control 131 by way of line 135. The multivibrator 154 emits an electrical square wave continuously, but it should be understood that this wave is in no way synchronized with the basic timing of the clock pulses which are used throughout the system during either recording, searching, or reading.

Upon receipt of an operation command to "read" or "record," which is transmitted from the computer on line 106, the register 116 receives the command on line 119, and the R link 115 receives the command on line 118. The register 116 signals the tape drive control 131 by line 181. The tape drive control 131, in response to the signal from the register 116, starts the tape 140 moving in the forward direction at slow speed. In response to a "record" operational command, the R link 115 connects the recorder 122 to the input lines from the computer 100 symbolically represented as line 107. In response to a "read" operational command, the link 115 connects the reader 112 to the same input lines 107 from the computer.

When beginning with a blank tape, it is first necessary to record the clock pulses in duplicate on the clock channels $Ca$ and $Cb$. To accomplish this, use is made of the gear 720. The gear 720 is of low reluctance soft iron and is approximately five inches in diameter. One hundred and thirty-three evenly spaced teeth are cut on two-thirds of the periphery of the gear, the other one-third of the periphery being left blank. The gear 720 is mounted on the upper extremity of shaft 731 entering the gear box 148 so that the gear 720 rotates at the same speed as the capstans 142 and 143. The two equal sized capstans 142 and 143 are of a diameter such that when the tape 140 is in motion, one complete revolution of the gear 720 will represent approximately one and one-half inches of travel of the tape 140. A permanent magnet magnetic head 721 is permanently mounted near the peripheral surface of the gear 720 so that the change in reluctance of the path between the peripheral surface of the gear (due to the gear teeth) and the magnetic head 721 generates an electrical signal in the output line 722 of the head 721. The switch 723, which is normally in the position shown for all other operations of the magnetic tape storage system, is thrown connecting line 722 to line 730. Thus the pulses generated by the gear 720 in the head 721 are received by the clock reader 142a where they are amplified, phase inverted, clipped, and finally caused to trigger a flip-flop C1 included in the clock reader 142a. The true and false outputs of the C1 flip-flop within the reader 142a are fed by line 101 to the recorder 122. The signals received by the recorder 122 form the input to clock record tubes 746 and 747 (Fig. 4), the outputs of which are transmitted to the clock heads (125 and 127 of Fig. 2) of the multiple-head 130.

When beginning with a tape which contains only the magnetically recorded clock pulse channels, it is sometimes desirable to record first the block "address" in the first word $W_0$ of each of the blocks along the entire length of the tape, then at a later time record the "information" in the remaining words $W_1$–$W_{10}$ of each of the blocks. At other times it is desirable to record first the "information" of each block on the entire length of the tape and then later on record the assigned "addresses." Still again it may be desirable to record both the "address" and the "information" in each block on the tape during the same operation. In reading information from the tape, it is desirable to be able to similarly limit the information read from the tape to the computer. Immediately following the operational command to "read" or "record," the computer 100 sends instructions to the register 116 by line 105 to record or read (1) the "address" only, (2) the "information" only, or (3) the "address" and "information." The register 116 permanently stores these instructions in storage relays.

As soon as the decimal digit position $P_b$ of word $W_s$ (Fig. 2) reaches the multiple-head 130, clock pulses are sensed and received by the clock reader 142a by way of line 128. The amplified and squared clock pulses are applied to the word and digit counters 108 and 109, respectively, by line 102. An inhibiting signal $Q_1$, which is generated from the outputs of the word and digit counters and the instructions stored in the register 116, is fed to the recorder 122 by line 120. This signal limits the information recorded onto the tape 140 in accordance with the instructions stored in the register 116. The clock pulses C, received by the register 116 are gated in accordance with the instructions, and these gated clock pulses $C_s$ are returned to the computer on line 104. For example, if the instructions from the computer stored in the register are "address only," the gated clock pulses $C_s$ will be received by the computer during the $W_0$ word time only (Fig. 2). If the stored instructions in the register are "information only," the gated clock pulses $C_s$ are sent to the computer during word times $W_1$ to $W_{10}$. If the instructions are for "address and information," clock pulses sent to the computer are uninhibited and $C_s$ is equal to C.

The decimal digits to be recorded, which, as previously explained, are composed of four binary digits each, are serially sent from the computer 100 on four separate conductors, schematically represented as line 107, from the outputs of storage flip-flops in the computer which are triggered by the gated clock pulses $C_s$.

The four input lines (represented as line 107) are connected to four conductors to the recorder 122 by the R link 115. As previously mentioned, in order to prevent a series of binary "ones" or "zeros" from being recorded during the time that the gated clock pulses $C_s$ are not present on the inputs to the storage flip-flops in the computer, the inhibiting signal $Q_1$, received by the recorder 122 from the register on line 120, limits the operation of the recorder to the times while the gated clock pulses $C_s$ are generated.

The output 123 of the recorder 122 is fed to the multiple-head 130 which records on the tap 140 the four binary digits of each decimal digit in duplicate on eight information channels of the tape. In this manner information is recorded on the tape in synchronism with the basic timing of the magnetic tape storage unit as determined by the clock pulses C generated by the previous recording on the tape, and in accordance with the instructions from the computer stored in the register.

In reading information from the tape 140, the four binary signals of each decimal digit recorded on the tape are simultaneously sensed by the multiple-head 130 and transmitted in electrical form on four separate conductors, schematically represented as line 129 in Fig. 1, to the reader 112. These binary signals are combined in logical networks within the reader 112 with the clock pulses C to form the inputs of four memory flip-flops M1, M2, M3, and M4 in the reader. The true outputs of these M flip-flops, which represent the four binary digits of each decimal digit read from the tape synchronized with the clock pulses C, are sent to the computer 100, by way of the R link 115, on four separate conductors, schematically represented as line 107. In the computer 100 these binary signals are combined with the gated clock pulses $C_s$, and the combined signals trigger the storage flip-flops (not shown) within the computer. The output of these flip-flops within the computer represents the information read from the tape in the magnetic tape storage unit in conformity to the instructions previously sent by the computer and stored in the register 116.

If it is desired to search for a particular block previously recorded on the tape, the "search" operational command is transmitted in electrical signal form from the computer 100 to the register 116 by lines 106 and 119. The register 116 then signals the tape drive control 131 by line 181 to start the tape moving at high speed in the forward direction.

Immediately following the "search" operational command, the computer sends the address of the block desired to the register 116, in the form of 16 electrical signals representing binary digits, simultaneously on 16 separate conductors represented by line 105. Upon receipt of the 16 binary digits, each four of which represent a decimal digit of the address, the register permanently stores the address of the block desired in a group of 16 storage relays. Once the address is stored in the register 116, the computer 100 is free to perform other functions, and the magnetic tape storage system independently carries out the remainder of the block search routine.

The address of each block recorded on the tape is composed of four decimal digits in decimal digit positions $P_2$, $P_3$, $P_4$, and $P_5$ of word $W_0$ (the second word of each block, the first word being the blank area $W_s$). Each of these decimal digits is composed of four binary digits transversely in line with a single clock pulse which defines the decimal digit (Fig. 2). The addresses are usually recorded in unit arithmetical progression; that is, progressing on the tape from left to right, the address of each succeeding block is one decimal unit higher. Starting with the first block address of decimal number 0000 at the extreme left end of the tape, the last block address will be the decimal number 9999 at the other extremity of the tape. The length of the tape therefore will have a total of 10,000 blocks.

When the multiple-head 130 reaches the decimal digit position $P_b$ of word $W_s$ of the first block (Fig. 2), clock pulses are sensed. These clock pulses are sent to the word and digit counters 108 and 109 by line 102.

In order to enable the components of the magnetic tape storage unit to respond properly to each of the decimal digits within a word, the digit counter 109 is provided for counting each clock pulse C read from the tape. The digit counter has a capacity of 12 clock pulse counts; namely, $P_0$ to $P_{10}$ and $P_b$ (Fig. 2). A carry pulse, generated each time the digit counter counts the $P_b$ digit, is sent to the word counter 108 by line 111, and causes the word counter 108 to manifest a new count. The word counter 108 has a capacity for counting 12 words; namely, $W_s$ and $W_0$ to $W_{10}$, inclusive (Fig. 2).

With the aid to the outputs of the digit and word counters, the register 116 steps out the decimal digits of the address stored in the register in synchronism with the decimal digits of the addresses read from the tape. The decimal digits stepped out of the register 116 are transmitted to the comparator 114 on eight separate conductors represented as line 164 in the figure. The decimal digits of the addresses read from the tape are sent to the comparator 114 on eight separate conductors from the reader 112.

As was previously mentioned, when the "search" operational command was received from the computer, the tape 140 was started in the forward direction at high speed. The comparator 114 compares digit for digit the addresses read from the tape with that stored in the register until an address on the tape is equal to or greater than that in the register, at which time a signal is sent to the tape drive control 131 by line 133 from the comparator 114. In response to this signal, the tape drive control 131 de-energizes the solenoid 155 and energizes solenoid 151 by line 158. Since the motor 144 was not affected, the tape 140 is immediately moved in the reverse direction (left to right) at high speed.

As will be brought out later in complete detail, both the clock pulses and the block address may be read during the reverse motion of the tape 140 as well as the forward motion. Of course, the first decimal digit of the address will now be read out as the fourth decimal digit, the second decimal digit will be read out as the third digit, the third will be read out as the second, and the fourth will be read out first. In order to properly compare the address in the register 116 with that on the tape 140, the register 116 also steps out the decimal digits of the address stored therein in reverse order to the compartor 114 by means which will be explained in detail later on.

The two addresses (that in the register 116 and that read from the tape 140) are again compared for equality with the tape 140 moving in reverse. When they are alike, the comparator 114 sends another signal to the tape drive control 131 also by line 133; and in response to this signal the tape drive control 131 stops the motion of the tape at the $B_1$ (blank) position of the $W_s$ word of the block finally compared.

The above search procedure assumes that the address sought was to the right of the multiple-head 130 on the tape 140 at the beginning of the search; that is, that the address desired and stored in the register 116 is a larger decimal number than the address of the block under the multiple-head 130 before the tape 140 was in motion.

If the address desired and stored in the register 116 is a smaller decimal number than the address first read from the tape 140 when started in forward high speed in "search," a signal sent by the comparator 114 causes the tape drive control 131 to put the tape in reverse high speed. The tape 140 continues in reverse high speed, and the comparator 114 continues comparing the addresses of the blocks read from the tape 140 with the address stepped out from the register 116 until the comparator 114 receives two numerically equal addresses; at which time the comparator 114 signals the tape drive control 131 which in turn stops the tape 140 at the beginning of the block desired.

*Clock reading circuitry*

A detailed description of the circuitry employed in clock reader 142a of Fig. 1 for reading the clock pulses from the tape 140 (Fig. 1) will now be given by referring to Fig. 4.

The two heads 125 and 127 of the multiple-head 130 (Fig. 2) are each comprised of two single coils wound on a split core, as for example the head 125, which is composed of the coils 201a and 201b wound on the split core 200. One terminal of each of the coils of head 125 is connected to a common point 741 which is connected by switch 740 to either ground or a +225 v. source. The other terminal of each of the coils of head 125 is connected to the extremity of one of the coils of head 127, the other terminals of which are connected to the plates of the clock record tubes 746 and 747. One of these latter terminals is also connected by line 128 to one contact of switch 723. When reading the clock pulses recorded on the magnetic tape 140, switches 740 and 723 are in the positions shown. Since the multiple-head 130 (Fig. 1) is held stationary near the surface of the tape 140, as the tape 140 moves past the heads 125 and 127, magnetic flux patterns of the clock channels *Ca* and *Cb* recorded on the magnetic coating 141 of the tape 140 induce an electrical waveform in the series connected coils. This waveform is applied to the grid of a conventional triode amplifier tube 203 by way of capacitor 204. The plate output of the first amplifier tube 203 is fed to the grid of tube 213 by way of the resistor 205 and the coupling capacitor 207. The resistor 205 and the triode tube 206 together form a voltage divider circuit, such that the amplitude of the input to the grid of the triode tube 213 is controlled by the grid of the triode tube 206. The grid of the triode tube 206 is in turn connected to another voltage divider comprised of the two resistors 208 and 209. The upper end of resistor 208 is connected to $H_1$, which is the true output of an *H1* proposition developed within the tape drive control 131 (Fig. 1). When the tape is moving at high speed, $H_1$ is equal to 125 volts D.C.; and when the tape is moving at slow sped, $H_1$ is equal to 100 volts D.C. The values of resistors 208 and 209 are so chosen that the triode tube 206 is cut off when $H_1$ is equal to 100 volts D.C. but conducts when $H_1$ is 125 volts D.C. The sensed voltage appearing on line 128 will be higher at high tape speed than at low speed. Since the triode tube 206 is cut-off when the tape is moving at slow speed, the full plate output of tube 203 is applied on the grid of triode tube 206. But at high tape speed sufficient current is drawn by the triode tube 206 to drop the signal applied to the grid of tube 213 to the same level as at low tape speed.

Because of the close proximity of the heads on the multiple-head 130, as for example heads 125 and 126 (Fig. 2), a magnetic coupling effect exists between the clock heads and adjacent heads which may be recording information on the tape at the same time. Since information is recorded on the adjacent channels at the fall of the clock pulse, which will be explained later in detail, relatively high voltage spikes are induced in the coils, such as coil 201a of head 125. These voltage spikes are of short duration and on the order of one volt amplitude, whereas the desired electrical waveforms induced from the clock channels of the tape are in the order of five millivolts amplitude. Since the sensed clock pulses on line 128 must be amplified to approximately 40 volts amplitude, these voltage spikes induced by adjacent heads during recording would become prohibitively large. To avoid this, limiter amplifiers are used in the second and third stages of amplification, which limits the positive and negative swing of the amplified signal.

The first limiter amplifier is made up of triode tubes 213 and 215 together with their associated network. The cathodes of the two tubes are connected to ground by way of a common cathode resistor 214. The plate of tube 213 is connected directly to a low impedance direct current 225 volt source, while the plate of tube 215 is connected to the same 225 volt source by way of plate resistor 210. The input is fed to the grid of tube 213 by way of the coupling capacitor 207, while the grid of tube 215 is connected directly to ground. The cathode resistor 214 is chosen so that the grid bias of both tubes will be approximately one volt above cut-off.

Assume, as previously mentioned, that the positive and negative amplitude of the clock signal on line 128 is 5 millivolts. Further, assume that the first stage of amplification (tube 203) has a voltage amplification of ten. Then the clock signal will be 50 millivolts and the induced voltage spikes will be 10 volts, which appear at the grid of triode tube 213. The voltage signal appearing across the cathode resistor 214 will be approximately the same as that at the grid of triode tube 213, except that the negative portion of the 10 volt induced voltage spikes will be cut-off at minus one-volt amplitude. Since the grid of triode tube 215 is tied to ground, this signal voltage appearing across the cathode resistor 214 will appear on the plate output of tube 215 except that the remaining positive portion of the inducted voltage spikes will be cut-off above approximately one volt. Thus the sensed clock pulse signal is linearly amplified in its entirety, yet the induced voltage spikes are cut-off for any value greater than one volt positive or negative. The next stage of amplification is a limiter amplifier composed of tubes 217 and 218 and is similar to the limiter amplifier just discussed. The output of the second limiter amplifier is fed to the grid of a conventional triode amplifier 219 through the coupling capacitor 220.

The plate output of the amplifier 219 is fed through a coupling capacitor 221 to the grid input of the phase inverter 222. The plate of the triode tube 227 is connected to the 225 volts positive return through resistor 223. The cathode is connected through resistors 225 and 224 in series to ground. The grid input is tied to the junction of resistors 224 and 225 through the grid leak resistor 226. Resistors 223 and 224 are equal in value and comparatively large compared to resistor 225 which is chosen so that the grid is a convenient negative value in relation to the cathode when the inverter is in its quiescent state; i.e., during the time no signal is received on the grid input circuit.

Any time a positive pulse is impressed on the grid input circuit of the phase inverter 222, the increase of current in the triode tube 227 causes a proportional increase in voltage drop across resistors 223 and 224. The increased voltage drop across resistor 224 appears as a positive voltage pulse on the output line 228, as well as raising the cathode potential, keeping the grid of the tube negative in relation to its cathode regardless of the fact that the positive pulse applied on the grid may have been of a greater amplitude than the steady state negative bias of the grid. Thus a non-inverted replica of the positive pulse appears on the output line 228 and the grid has never been driven positive in relation to the cathode. The increased voltage drop across the plate resistor 223 causes an equal negative voltage pulse to appear on line 229 which is the inverted replica of the positive pulse appearing on the grid input of tube 227.

A negative input pulse to the input of the inverter 222 generates a negative voltage pulse on line 228 and a positive voltage pulse on line 229. Because of the equal value of resistors 223 and 224, the voltage pulses appearing on lines 228 and 229 are therefore of equal magnitude and opposite polarity.

The pulses on the two output lines 228 and 229 of the phase inverter 222 are fed into the clippers 230*a* and 230*b* by way of the coupling condensers 231 and 232, respectively.

Considering first the clipper 230*a*, it is seen that the output line 229 of the phase inverter 222 is fed to the grid of triode tube 236 by way of the coupling condenser 231 followed by a first and second diode-resistor circuit. The first diode-resistor circuit 234 is composed of a diode and resistor in series, where the anode lead of the diode is connected to line 251, and the cathode lead of the diode is connected to the resistor which in turn is connected to a low impedance positive 10 volt source. The second diode-resistor circuit is comprised of two equal resistors 252 and 253 and a blocking diode 254. The lower ends of both resistors are tied together to a low impedance +5 v. source, and the upper ends are tied to each side of the diode 254. The cathode terminal of the diode 254 is also connected to line 251 and the anode is connected to the grid of triode tube 236 through a small resistor.

When there is no signal on the input line 229, the grid will attempt to rise to some positive value because of the 5 volts positive source at the lower end of resistor 253. But the instant the grid becomes a few millivolts above ground, sufficient grid current is drawn to produce a voltage drop across the resistor 253 (which is in the order of 100,000 ohms) to hold the grid 255 of tube 236 at a few millivolts above ground. Line 251 will be held at 5 volts positive (as there is no current return) by the positive 5 volt source through resistor 252. When a negative pulse is applied on line 251 through the coupling condenser 231, it will be referenced to the steady state positive 5 volts of line 251. Since the blocking diode 254 has its cathode lead connected to line 251, and the pulse is referenced to positive 5 volts, only that portion of the negative pulse impressed on line 229 which is more negative than minus 5 volts will appear on the grid 255 of tube 236. When a positive pulse is impressed on line 229, it appears on line 251 also referenced to positive 5 volts, but the entire pulse is blocked by the diode 254. Thus only the portion of a negative pulse below minus 5 volts, which is applied on the input line 229, appears on the plate output line 242. The diode and resistor in circuit 234, which is connected to a low impedance positive 10 volt source, supplies current to the coupling condenser 231 during a positive pulse to replace the charge thereon which is lost during a negative pulse through resistor 252 and through the low impedance source of positive 10 volts to ground.

The clipper 230*b* is similar in arrangement and function as the clipper 230*a* just described.

To further square the plate output pulses of the clipper tubes 235 and 236, the voltages on the output lines 241 and 242 are each clamped by a pair of diodes, such as diodes 239 and 240, which connect the output line 242 to a low impedance source of +100 and +125 volts, respectively.

The clamped output lines 241 and 242 of the clippers 230*a* and 230*b* are fed to logical drivers 253*a* and 253*b* which are direct coupled current amplifiers. Considering first the logical driver 253*a*, the clamped output line 242 of the clipper 230*a* is fed directly to a voltage divider comprised of resistors 246 and 248, the lower end of the divider being connected to a minus 300 volt reference. The resistors 246 and 248 are chosen to maintain the grid negative in respect to the cathode of tube 243 so that the clipped and squared +25 volt pulses appearing on line 242 will not swing the grid positive. In order to increase the rapidity of charging the interelectrode capacitance 245 between grid and cathode of the tube 243, a relatively large capacitance 247 parallels the resistor 246 to allow a low impedance path for charging current for the interelectrode capacitance 245. Without this low impedance path for current, the capacitance 245 would take a relatively long time to charge, thus sloping and rounding off the steep front of the squared input pulses.

The logical driver 253*b* is similar to the driver 253*a* just described.

The outputs of the drivers 253*a* and 253*b* are again clamped between +100 and +125 volts by diodes, such as diodes 251*a* and 252*a* on the output line 249 of the driver 253*a*. The clamped output of the driver 253*a* is fed to a second logical driver 255*a* by line 249. The clamped output of the logical driver 253*b* is also fed to a second logical driver 255*b* by line 250. The outputs of the second drivers 255*a* and 255*b* appearing on lines 257 and 258, respectively, are again clamped between +100 and +125 volts by diodes.

The squared and clamped outputs of the first pair of logical drivers 253*a* and 253*b*, appearing on lines 249 and 250, are hereinafter referred to as $I_5$ and $I_6$, respectively. The squared and clamped outputs of the second pair of logical drivers 255*a* and 255*b*, appearing on lines 257 and 258, are hereinafter referred to as $I_5'$ and $I_6'$, respectively.

The output $I_5$ is fed to the gate circuit 260, and the output $I_6$ is fed to the gate circuit 261. These gate circuits, 260 and 261, are typical logical "and" networks. In such a circuit, as noted in particular for gate 260, the inputs therein are applied on the cathode-ends of crystal diodes, such as diode 264, whose anode-ends are joined to a common line 265 which is connected to the positive 225 volt source through the load resistor 270. Whenever all the inputs to gate circuit 260 are relatively high in potential, the common line 265 is also high; i.e., when $I_5$, $C_1'$, $O_1$, and $F_1$ are all +125 volts, the common line 265 will be at +125 volts. Whenever any one or more of the inputs is low, that is, +100 volts, the common line 265 will also be +100 volts.

The outputs $J_5$ and $J_6$ of the gate circuits 260 and 261 are fed to gate circuits 262 and 263, respectively. These gate circuits 262 and 263 are typical logical "or" networks. In such a circuit, as for example gate circuit 262, the inputs are applied on the anode-ends of crystal diodes, such as diode 271, whose cathode-ends are joined to a common junction line 272 which is connected to ground through the resistor 273. Whenever any one of the inputs to gate circuit 262 is high, the common junction line 272 is also high; and when all the inputs are low, the common junction line 272 will be low; i.e., when either $J_5$ or $J_6'$ is +125 volts, the common junction line 272 will be +125 volts; and when both $J_5$ and $J_6'$ are +100 volts, line 272 will be +100 volts.

$I_5'$ and $I_6'$, the outputs of the logical drivers 255a and 255b, are fed to gates 274 and 275, which are typical logical "and" networks. The output of the gate 274 is hereinafter referred to as $J_5'$ and the output of the gate 275 is hereinafter referred to as $J_6'$.

The outputs of the gate circuits 262 and 263 are fed to the C1 flip-flop circuit. The flip-flop circuit C1 is similar to the well-known Eccles-Jordan circuit having two stable states. The circuit is comprised of a pair of triode tubes 277 and 278, the grid and cathode electrodes of which are connected in conventional fashion for this type of circuit; the grid of tube 277 being connected to the anode of tube 278 through a charging condenser 280 shunted by a voltage dividing resistor 282, and the grid of tube 278 being similarly connected to the anode of the tube 277 through a similar charging condenser 279 shunted by a voltage dividing resistor 281. The plate of each triode is connected through a load resistor to the +225 volt supply, and the cathode of each triode is grounded. Each of the grids of the tubes are joined through a separate grid resistor to a −300 volt source. The inputs to the flip-flop circuit are coupled to the grids through a differentiating circuit, and block diode, such as line 272, which is coupled to the grid of triode 277 through the differentiating circuit 276 and the blocking diode 275a. The flip-flop circuit is arranged to be triggered into its opposite state by applying negative pulses to the grid of the conducting tube.

The output lines $C_1$ and $C_1'$ from the C1 flip-flop are taken from the right and left plates, respectively. In order to maintain the swing of the plate voltage, the outputs are clamped between +100 and +125 volts by clamping diodes, such as diodes 286 and 287 of the $C_1$ output.

According to the system of nomenclature used throughout this presentation, the input to the grid circuit of the right tube 277 (whose plate output is $C_1$) is referred to as small case $c_1$, and that to the left tube 278 (whose plate output is $C_1'$) as small case ${}_0c_1$.

If tube 277 is conducting, then the output $C_1$ of the tube will be low (+100 volts), and tube 278 will be nonconducting and its plate output $C_1'$ will be high (+125 volts). If a pulse is applied on the input $c_1$, it is differentiated by the differentiating circuit 276. The positive portion of the differentiated pulse is blocked by the blocking diode 275 and only the negative differentiated pulse is applied to the grid of tube 277, which cuts the tube off, and tube 278 becomes conductive. The output $C_1$ then becomes high (+125 volts), and $C_1'$ becomes low (+100 volts). In a similar manner, a pulse applied on the input ${}_0c_1$ of tube 278 will be differentiated and clipped, and the differentiated negative pulse will cut off tube 278 making $C_1'$ high and tube 277 will become conductive making $C_1$ low. Thus the flip-flop is changed to the opposite state by the leading edge of a negative squared pulse or the trailing edge of a squared positive pulse applied to the input circuit of the conducting tube.

The output $C_1$ of the flip-flop is connected to one of the inputs of the gate circuit 260 and the output $C_1'$ of the flip-flop is connected to one of the inputs of gate circuit 261.

One input of each of the two gate circuits 260 and 261 is labeled $O_1$. This proposition is the output of a logical driver whose input is fed from the output of a well-known "one-shot" which is triggered by the $C_1$ output of the C1 flip-flop. The one-shot and logical driver are detailed in Fig. 5. The one-shot is comprised of the two triodes 300 and 301 whose cathodes are connected together and returned to ground through the common cathode resistor 302. The anode of each tube is connected to the low impedance +225 volt source through individual plate resistors 307 and 308 which are equal in value. The two resistors 303 and 304 comprise a voltage divider between the +225 volt source and ground, and are so chosen that the grid of triode 301 is slightly above ground. The grid of triode 300 is connected to the +225 volt source through resistor 306 which is in the order of 10 megohms. The grid of triode 300 is also connected to the $C_1$ (right hand) output of the C1 flip-flop of Fig. 4.

Since the grid of the triode 300 is connected to the +225 volt source through the resistor 306, grid current will be drawn from ground through the common cathode resistor 302 and through the resistor 306 to the +225 volt source. As previously mentioned, the resistor 306 is large in value; therefore, a very small grid current will cause a large voltage drop across the resistor. Also, since the grid is positive in relation to the cathode, triode 300 becomes conductive. The common cathode resistor 302 is chosen so that when triode 300 is conducting, the voltage drop appearing across the cathode resistor 302 maintains the triode 301 non-conductive. Thus a no-signal steady state condition of the one-shot is obtained where triode 300 is conducting and triode 301 is non-conducting.

When the $C_1$ output of the C1 flip-flop (Fig. 4) rises from low to high (+100 volts to +125 volts) the sudden rise in $C_1$, which passes through the capacitor 310 to the grid of triode 300 as a positive pulse, has no effect, as triode 300 is already conductive. When $C_1$ suddenly drops from high to low (+125 volts to +100 volts), the negative pulse appearing on the grid of triode 300 cuts the tube off. The resultant drop in current through the cathode resistor 302 lowers the potential of the cathode of triode 301 practically to zero, and since the grid of triode 301 is held by the voltage divider, comprised of resistors 303 and 304, slightly above ground, triode 301 conducts. This suddenly lowers the potential at the plate 311 of triode 301. Since the capacitor 305, which is connected between the plate 311 of triode 301 and the grid of triode 300, had a charge approaching 225 volts while triode 300 was conducting, this sudden potential drop at plate 311 will appear as a corresponding negative potential on the grid of triode 300 as long as the capacitor 305 remains charged. The charge on capacitor 305 drains off through resistor 306 to the +225 volt source. Therefore, triode 300 of the one-shot is normally conductive and triode 301 is cut-off when no signal is passed by the capacitor 310. When $C_1$ drops from high to low, the negative pulse appearing on the grid of triode 300 cuts-off the tube and makes triode 301 conductive. Triode 300 is cut-off and triode 301 conducts during a period of time dependent upon the time constant of the capacitor 305 and the resistor 306, after which the circuit flips back to its steady state condition of triode 300 conducting and triode 301 cut-off.

The plate output 311 of triode 301, which is designated $O_1$, is clamped between +100 and +125 volts by the clamping diodes 312 and 313. Thus output $O_1$ is normally high (+125 v.), and is changed to low (+100 v.) when $C_1$ changes from high to low and remains low during a period of time determined by the time constant of the one-shot.

Returning to Fig. 4, the proposition $F_1$ appears as an input of both gate circuits 260 and 261. $F_1$ is the true output of a flip-flop F1 in the tape drive control 131 (Fig. 1) which is always high when the tape is moving in the forward direction.

Figures 6, 7:
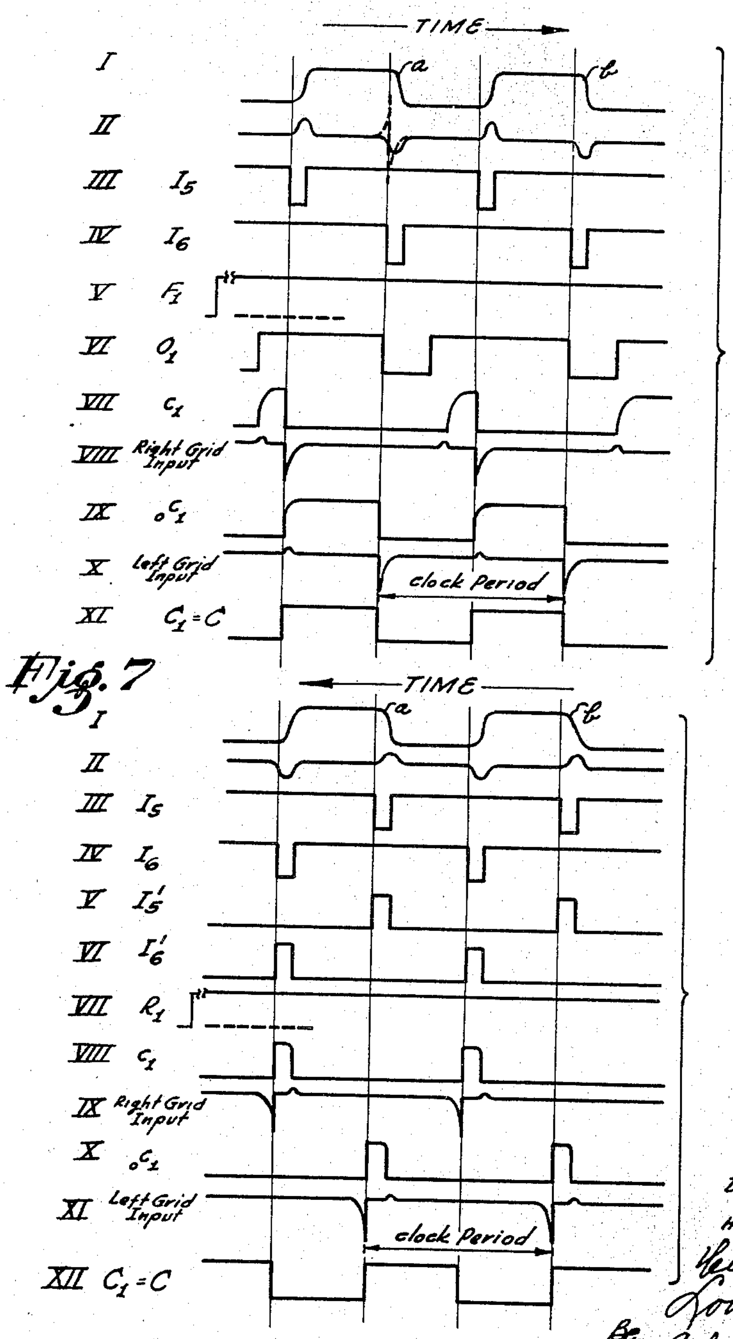
Fig. 6 is a graph of the waveforms referred to in the clock reading circuit when the magnetic tape is moving in the forward direction.
Fig. 7 is a graph of the waveforms referred to in the clock reading circuit when the magnetic tape is moving in the reversed direction.

Fig. 6 is a graph of the waveforms appearing at different points of the clock reading circuitry when the tape is moving in the forward direction. In line I the flux pattern of the clock channels are shown. In line II the waveform sensed from the clock channel by the series connected clock heads 125 and 127 (Fig. 4) is presented. In lines III and IV the outputs of the first logical drivers $I_5$ and $I_6$ (Fig. 4) are shown. On line V the waveform $R_1$, if high, indicates the tape 140 is moving forward. On line VI the output $O_1$ of the one-shot and driver (Fig. 5) is represented as dropping to a low potential following the fall of $C_1$ on line XI and remaining low during the one-short time constant, then rising high again until the next fall of $C_1$. The input $c_1$ represented on line VII, which is effectively the output of the gate circuit 260 (Fig. 4), is seen to rise with the rise of $O_1$ on line V, since the other inputs to the gate, i.e., $F_1$, $C_1'$, and $I_5$, are already high; and $c_1$ is seen to fall sharply with the fall of waveform $I_5$ on line III. The pulse form appearing on the grid of the right-hand tube of the C1 flip-flop (Fig. 4), represented in line VIII, is seen to be essentially the differentiated trailing edge of the pulse appearing on line VII. It is thus noted that the C1 flip-flop changes state on the leading edge of the $I_5$ pulse appearing on line III, i.e., $C_1$ (line XI) is triggered high on the fall of $I_5$. Line IX represents the output of the left gate circuit 261 (Fig. 4), which is effectively the ${}_0c_1$ input to the C1 flip-flop. It is noted that ${}_0c_1$ rises with the rise in $C_1$, but falls with the fall of $I_6$ represented on line IV. On line X is represented the pulse form appearing on the left grid of the C1 flip-flop and is essentially the differentiated trailing edge of ${}_0c_1$ on line IX. Therefore, the C1 flip-flop changes back to its original state on the leading edge of the $I_6$ pulse appearing on line IV, i.e., $C_1$ on line XI is triggered low on the fall of $I_6$. The right output $C_1$ of the C1 flip-flop shown on line XI reproduces the clock pulses recorded on the tape and the left output $C_1'$ of the C1 flip-flop (waveform not shown) is the inverse of the recorded clock pulses on the tape.

According to the system of nomenclature used throughout the present invention, the right output of a flip-flop, as for example the $C_1$ output of the C1 flip-flop, will be hereinafter referred to as the "true" output; and the left output, as $C_1'$ of the C1 flip-flop, will be hereinafter referred to as the "false" output. Similarly the right input, as $c_1$ in the present example, will be referred to as the "true" input; and the left input, as ${}_0c_1$, will be referred to as the "false" input of a flip-flop.

As previously mentioned, during recording of information on adjacent channels, which is always done when the tape is moving in the forward direction, induced voltage spikes are picked up in the clock reading circuit from the adjacent high current recording pickups. These voltage spikes are of extremely short duration and appear following the fall of the clock pulse signal $C_1$ represented on line XI. These voltage spikes are of sufficient magnitude to trigger the clock flip-flop C1 were there not preventative measures taken. It is for this reason that the $O_1$ proposition represented on line VI is introduced as an input on both the gate circuits 260 and 261 in Fig. 4. The $O_1$ proposition is triggered low by the fall of the clock signal $C_1$ and remains low, effectively closing both gates for the duration of the said undesirable induced voltage spikes.

As has been previously mentioned, the clock pulses recorded on the tape must be read and the clock signal made available also when the tape is traveling in the reverse direction during the block address searching routine. An essential consideration, which will be brought out in complete detail later on, is that the operations within the present invention are synchronized with the fall of the clock pulse $C_1$. As will be made clearer later on, the basic timing of all operations is the time between the fall of one clock pulse and the fall of the next clock pulse. In reading the clock pulse when the tape is moving in reverse, the fall of the true output $C_1$ of the clock flip-flop C1 must occur at the same points on the tape that the fall of $C_1$ occurs when the tape is moving in the forward direction. To clearly explain the operation of the clock reader during the reverse motion of the tape, reference is made to Fig. 7.

Fig. 7 is a graph of the waveforms appearing at various points of the clock reading circuit when the tape is moving in the reverse direction. In line I is presented the flux pattern of the clock channels recorded on the tape. It should be noted that it is the same flux pattern as presented in line I of Fig. 6, but that since the tape is moving in the reverse direction in Fig. 7, time is represented as from right to left. The electrical waveforms sensed by the clock heads 125 and 127 (Fig. 4) are presented on line II. The outputs $I_5$ and $I_6$ from the first pair of logical drivers 253*a* and 253*b*, respectively (Fig. 4), are depicted on lines III and IV.

Figure 4:
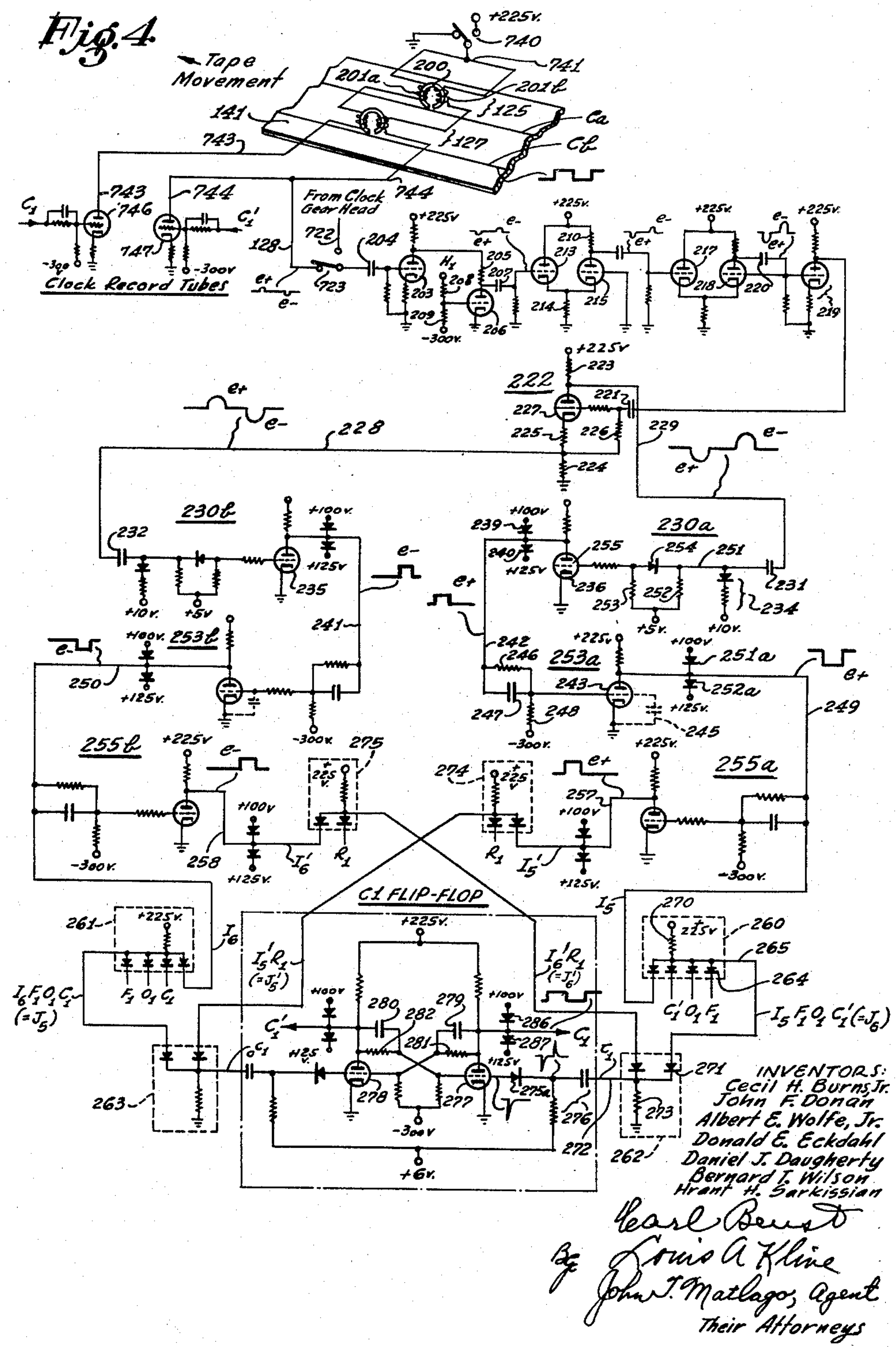
Fig. 4 is a detailed circuit of the clock reading circuits for the present invention.
Figure 5:
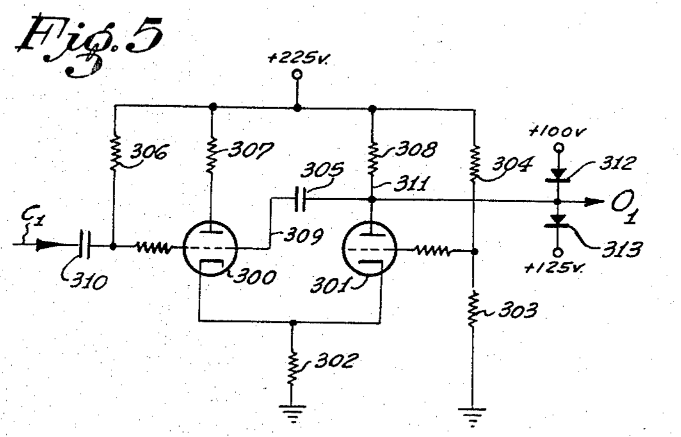
Fig. 5 is a detailed circuit diagram of the "$O_1$" signal generating circuit used in the clock reading circuit.

Referring momentarily to Fig. 4, it is apparent that the gate circuits 260 and 261 will not pass the $I_5$ and $I_6$ signals while the tape is moving in the reverse direction because the $F_1$ input, present on both the gate circuits, is low. The outputs $I_5'$ (line V) and $I_6'$ (line VI) from the second logical drivers 255*a* and 255*b*, which are the inverse of $I_5$ and $I_6$, are fed to the product gates 275 and 274, respectively. These gates are typical "and" networks previously described. The $R_1$ input waveforms (line VII) present on both gates are from the true output of the R1 flip-flop in the tape drive control 131 (Fig. 1), which is in the true state when the tape is moving in the reverse direction. Therefore, the inputs $I_5'$ and $I_6'$ are effectively passed to the outputs $J_5'$ and $J_6'$ of the gates. $J_5'$ represents one input of the "or" network 263, and $J_6'$ represents one input of the "or" network 262. Since an "or" network output is high when any one input is high and is low when all the inputs are low; and further, since the inputs $J_5$ and $J_6$ are low during the reverse motion of the tape, the $c_1$ input to the C1 flip-flop is effectively $I_6'$ and the ${}_0c_1$ input is effectively $I_5'$.

Referring back to Fig. 7, $I_5'$ and $I_6'$ are presented on lines V and VI, respectively. The true input $c_1$ is presented on line VIII and the false input ${}_0c_1$ is presented on line X.

The pulse form appearing on the grid of the right-hand tube of the C1 flip-flop, which is the differentiated trailing edge of $I_6'$, is presented on line IX. The pulse form appearing on the grid of the left-hand tube of the C1 flip-flop, which is the differentiated trailing edge of $I_5'$, is presented on line XI. Thus the C1 flip-flop is triggered true by the trailing edge of $I_6'$ and triggered false by the trailing edge of $I_5'$.

The true output of the C1 flip-flop, which represents the clock pulse C, is presented on line XII.

As previously mentioned, the basic timing of the present invention is referenced to the fall of the clock pulses, i.e., the fall of the $C_1$ output of the clock flip-flop. By a careful comparison of Figs. 6 and 7, it is seen that the true clock flip-flop output $C_1$ falls (changes from high to low) at the same points on the tape when the tape is moving either in the forward or reverse direction. For example, $C_1$ represented on line XII of Fig. 7 falls at the same points *b* and *a* of the clock flux pattern on the tape in line I. Thus the clock reading circuitry is capable of a reading the clock flux channels recorded on the tape, when the tape is moving either forward or backward, without changing the basic timing of the rest of the magnetic tape storage unit.

For initially recording the clock pulses on the tape, switches 723 and 740 (Fig. 4) are thrown thus connecting the common junction 741 to the +225 v. source and connecting output line 722 to the capacitor 204. Thus the signals from the clock gear head 721 (Fig. 1) are fed to the input of the clock reading circuitry. The outputs $C_1$ and $C_1'$ of the C1 flip-flop are fed to the inputs of a clock record tube (Fig. 4), the plates of which, by lines 743 and 744, are connected to the coils of the heads 125 and 127 of the clock channels *Ca* and *Cb*.

*The R link*

Referring to Fig. 1, information sent by the computer 100 to be recorded onto the tape 140 is received by the magnetic tape storage unit in the form of electrical signals representing binary digits on four input lines symbolically represented as line 107 in the figure. Similarly, information read from the tape 140 is sent to the computer 100 from the magnetic tape storage unit in the form of electrical signals representing binary digits on the same four input lines. Once the magnetic tape storage unit commences recording information onto the tape or reading information from the tape, the process continues until a "stop" signal is sent by the computer, in response to which the process of recording or reading is discontinued at the end of the block being recorded or read.

The functions of the R link 115 are (1) to connect the four input lines 107 from the computer to the recorder 122 in response to a "record" operational command, or to the reader 112 in response to a "read" operational command; (2) to link supply voltages from a source to the plates of the record tubes in the recorder 122 in response to a "record" operational command; and (3) to link a "stop" proposition line $U_1$ from the computer 100 to the comparator 114 in response to a "read" or "record" operational command.

Figure 8:
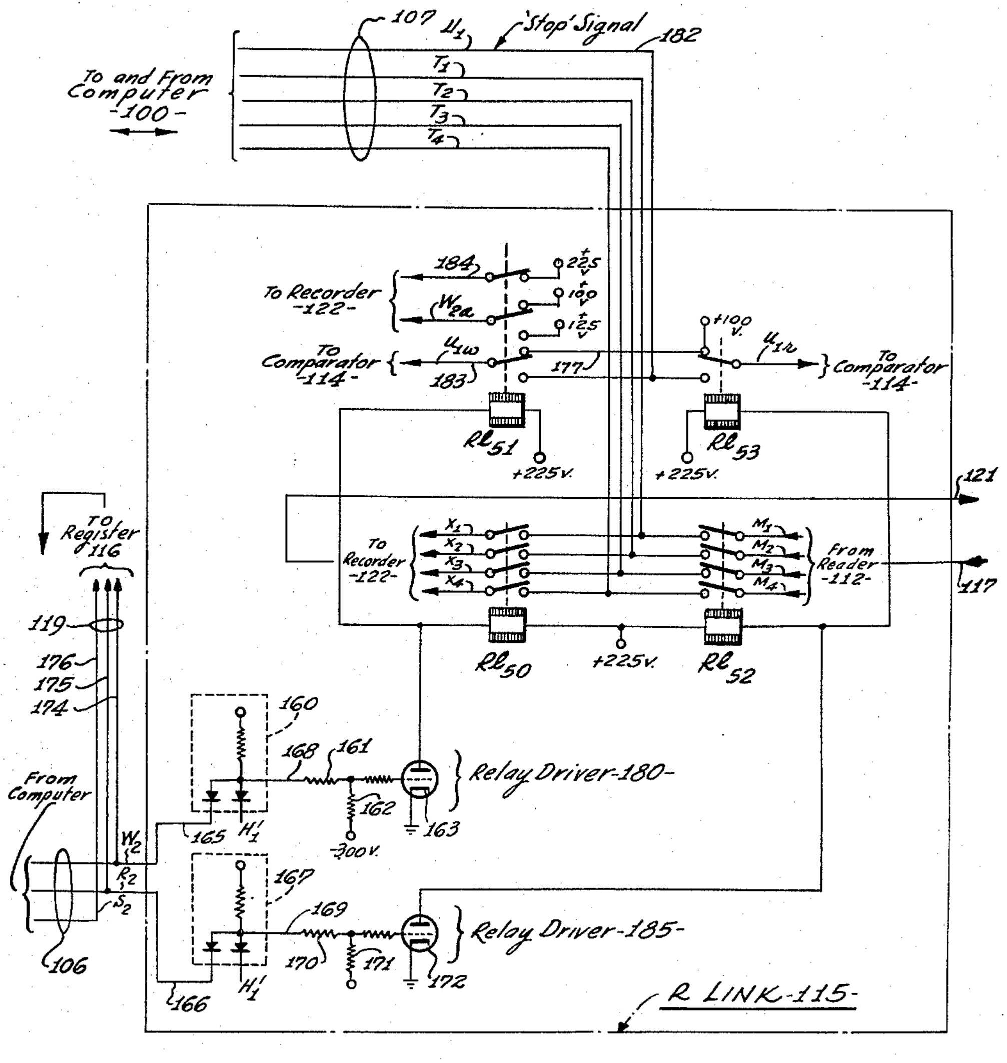
Fig. 8 is a detailed circuit diagram of the linking circuit between the present invention and a source, such as a computer.

Fig. 8 is a detailed drawing of the R link 115. The operational command record, read, or search is sent from the computer in the form of an electrical signal appearing on the lines $W_2$, $R_2$, and $S_2$, respectively. This command appears as a high potential (+125 v.) on one of the operational command lines, the other two lines remaining at a low (+100 v.) potential.

If the operational command is to search for a given block on the tape, the line $S_2$ will be high and lines $W_2$ and $R_2$ will be low. The signal $S_2$ is sent directly to the register 116 by line 176, and thence to the tape drive control 131 by way of line 181 (Fig. 1).

Assume it is desired to record information onto the tape. The proposition $W_2$ will be high and the propositions $R_2$ and $S_2$ will be low. The signal $W_2$ is sent directly to the register 116 by line 174 as well as being fed to one input of the product gate 160 by line 165. The other input to the product gate $H_1'$ is from the false output of the H1 proposition developed in the tape drive control 131 which is high when the capstans 142 and 143 (Fig. 1) are rotating at slow speed. The product gate 160 is a logical "and" network similar to that introduced in the clock reading circuits, wherein the output 168 will be high when both inputs are simultaneously high. Since searching is done at high speed travel of the tape, the $H_1'$ input to the gate 160, being low, will hold the output 168 low until the block desired is located. At the end of the search routine, the H1 proposition changes state, causing the input $H_1'$ to go high, at which time the proposition $W_2$ will effectively appear as a high (+125 v.) potential on output 168 which is fed to the relay driver 180.

The cathode of the triode 163 is tied directly to the ground, and the anode is connected to one terminal of the windings of relays $Rl_{50}$ and $Rl_{51}$, the other terminals of which are connected to the +225 v. source. The grid of the triode is connected to the common junction of resistors 161 and 162 which comprise a voltage divider between the input 168 and the −300 v. reference. The values of resistors 161 and 162 are so chosen that triode 163 is cut-off when the potential on output 168 is low (+100 v.) but conducts sufficiently to close relays $Rl_{50}$ and $Rl_{51}$ when output 168 is high (+125 v.).

Information to be recorded onto the tape is sent by the computer in the form of serially transmitted decimal digits, each decimal digit being composed of four binary digits represented by electrical signals on the four input lines $T_1$, $T_2$, $T_3$, and $T_4$. The closing of relay $Rl_{50}$ connects these four input lines to lines $X_1$, $X_2$, $X_3$, and $X_4$, respectively, which link the input lines $T_1$, $T_2$, $T_3$, and $T_4$ to the recorder 122.

The "stop" signal is sent by the computer on line 182. During the process of reading or recording, the proposition $U_1$ is maintained at +100 v., and the magnetic tape storage unit will read or record block after block on the tape until a "stop" signal in the form of a high potential (+125 v.) signal on the $U_1$ proposition line is received, at which time the read or record process will stop at the end of the block on the tape being recorded or read.

When relay $Rl_{51}$ closes, line 183 to the comparator 114, which was maintained at +100 v. by line 177 and the back relay contact, will be connected to line 182 from the computer thus connecting the $U_1$ proposition from the computer to the comparator 114. Also the proposition line $W_{2a}$ to the recorder 122, which was at +100 v., will become +125 v. Line 184, which is connected to the plate bus V of the record tubes in the recorder 122 (Fig. 9), will be connected by the relay contacts to the +225 v. source.

A "read" operational command will be received by the R link 115 as a high potential on the $R_2$ line and a low potential on lines $W_2$ and $S_2$. At the termination of any search in process, $H_1'$ will become high, causing the output 169 of the product gate 167 to be high, causing the relay driver 185 to conduct sufficient current to close relays $Rl_{52}$ and $Rl_{53}$. When relay $Rl_{52}$ closes, the $T_1$, $T_2$, $T_3$, and $T_4$ lines from the computer will be connected to the tape outputs $M_1$, $M_2$, $M_3$, and $M_4$, respectively, of the M memory flip-flops in the reader 112. The closing of relay $Rl_{53}$ connects the $U_1$ proposition line from the computer to line $u_{1r}$ to the comparator 114 by way of line 182.

*Recording circuitry*

Referring momentarily to Fig. 1, the computer 100 serially sends to the magnetic tape storage system the decimal digits of the information to be recorded onto the tape 140 in synchronism with the fall of the gated clock pulses $C_g$. Each decimal digit is represented by four binary digits, in the excess 3 coded decimal system (Fig. 3), which are simultaneously sent by the computer in electrical signal form on the four input lines $T_1$, $T_2$, $T_3$, and $T_4$, which are connected to the recorder inputs $X_1$, $X_2$, $X_3$, and $X_4$, respectively, by the R link 115 (Fig. 8).

The recorder 122, in combination with the multiple-head 130, records the binary signals received on line $X_1$ (Fig. 8) in duplicate on channels *Ch1a* and *Ch1b* on the tape 140 (Fig. 2). Similarly, the binary signals received on line $X_2$ are recorded in duplicate on channels *Ch2a* and *Ch2b*; the signals received on line $X_3$ are recorded on channels *Ch3a* and *Ch3b*; and the binary signals received on line $X_4$ are recorded on channels *Ch4a* and *Ch4b*.

When initially recording the clock channels, switch 723 is thrown connecting line 722 to line 730. Electrical signals induced in the clock gear head 721 are fed to the clock reader 142*a*, and the resulting amplified and square output signals are fed to the inputs of clock record tubes 746 and 747 (Fig. 4) whose plates are fed by lines 743 and 744 to the clock heads 125 and 127, respectively, of the multiple-head 130.

Figure 9:
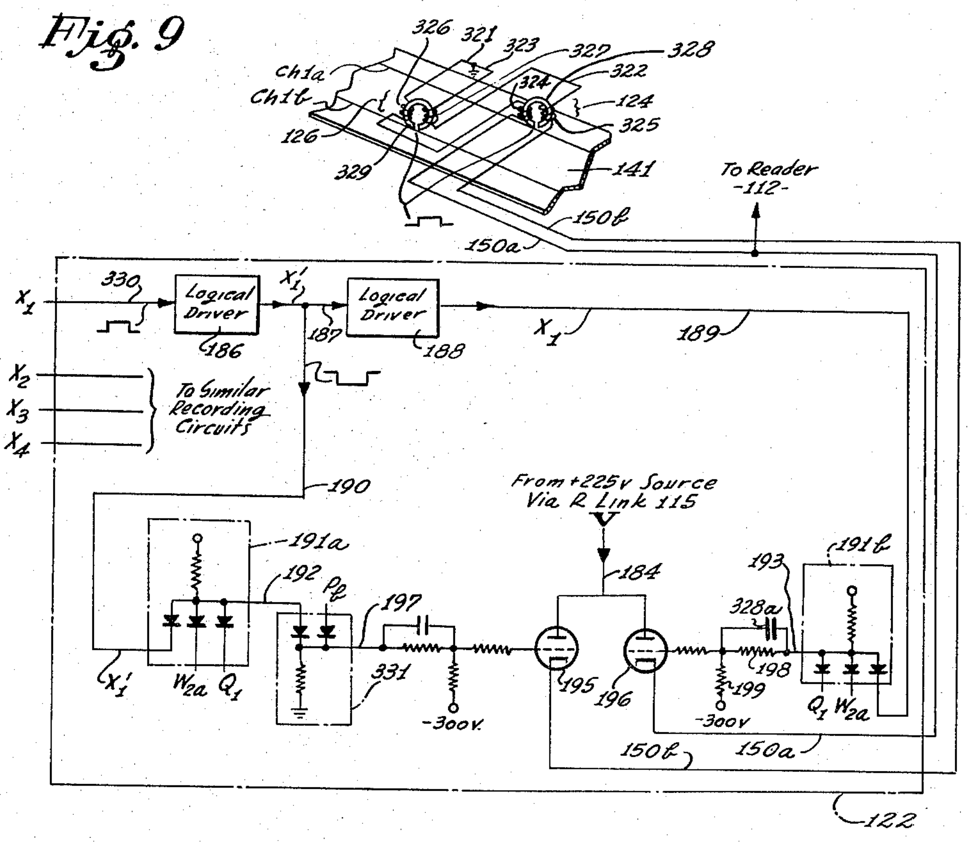
Fig. 9 is a diagram of the recording circuit.

In Fig. 9 is presented the detailed circuitry for recording information received from the computer onto the magnetic tape.

The information to be recorded is received in binary signal form by the recorder 122 (Fig. 1) on four separate input lines $X_1$, $X_2$, $X_3$, and $X_4$.

Noting in particular the $X_1$ input line, it is seen to feed to the logical driver 186 which is similar to the logical driver 253*a* of Fig. 4 previously described in that the signal appearing on the output line 187 is the inverse of the input signal.

In conformity with the system of nomenclature used throughout this presentation, the output on line 187 is designated $X_1'$. The output of the logical driver 186 is fed to a similar second logical driver 188. The output $X_1$ of the second driver 188 is fed to one input of the product gate **191*b* by line 189. The product gate 191*b* is a typical "and" logical network previously introduced, the output 193 of which will be high when all three inputs are simultaneously of a high potential. The input $W_{2a}$ is a product line from the R link 115 (Fig. 1), which remains low (+100 v.) until the R link has completed linking the input lines from the computer 100 to the recorder 122, at which time $W_{2a}$ is made high (Fig. 8). The third input $Q_1$ is a product line 120 from the register 116** (Fig. 1).

As has been previously mentioned, the information to be recorded on the tape 140 from the computer 100 is sent to the magnetic tape storage unit in binary signal form from the true outputs of storage flip-flops in the computer 100. These flip-flops are triggered by products which include the gated clock pulses $C_s$ sent from the register 116 to the computer 100 in conformity with the instruction stored in the register 116 (Fig. 1). During the time that the computer 100 is not receiving gated clock pulses $C_s$ from the register 116, these storage flip-flops will rest in their last triggered states. Depending upon these states, a series of "zeros" or "ones" would be recorded on the tape during this period, were the recording circuits not made inoperative. The product $Q_1$, which is high only during the time the gated clock pulses $C_s$ are sent to the computer 100 from the register 116, effectively permits the signals $X_1$ on line 189 to appear on the output 193 of the product gate **191*b*** only during the time that $C_s$ pulses are received by the computer.

The output 193 of the product gate **191*b* is fed to one end of a voltage divider composed of resistors 198 and 199, the other end of which is connected to a —300 v. reference. The common junction of resistors 198 and 199 is connected to the grid of a triode tube 196. The plate of the triode 196 is connected to the +225 v. source by way of line 184 from the R link (Fig. 8). The cathode of triode tube 196 is connected to one terminal of the left coil 324 on the split core 328 of the head 124 of the multiple-head 130 by way of line 150*a* (Fig. 2). The other terminal of coil 324 is connected to one terminal of the left coil 326 on the split core 329 of head 126 of the multiple-head 130 (Fig. 2). The other terminal of coil 326 is connected to ground by line 321**.

The resistors 198 and 199 are so chosen that tube 196 is cut-off when the output 193 of the product gate **191*b* is low (+100 v.), but conducts when the output line 193 is at +125 v. The capacitor 328*a* which is comparatively large, by-passes sufficient current around resistor 198 to rapidly charge the grid to cathode inter-electrode capacitance of tube 196**, thus preserving the steep wavefront of the binary signals applied to the grid.

The output $X_1'$ of the first logical driver 186 is applied to one input of the product gate **191*a* by way of line 190. The input $W_{2a}$, of the gate 191*a*, as previously explained, will be high (+125 v.) when the R link 115 has connected the input leads from the computer 100 to the recorder 122 (Fig. 1). The third input $Q_1$ is, as previously explained, a product line from the register 116** (Fig. 1) which will be high (+125 v.) as long as gated clock pulses $C_s$ are sent to the computer.

The output 192 of the product gate **191*a* is fed to one input of the sum gate 331. The sum gate 331 is a logical "or" network similar to the sum gate 262 introduced in Fig. 4, in that the output 197 will be high when either input 192** or input $P_b$ is high, or both, and will only be low when both inputs are simultaneously low.

As was previously discussed in relation to Fig. 2, the digit position $P_b$ of each word of a block requires binary "zeros" recorded therein on the information channels on the tape as a reference signal in order to rest the memory flip-flops of the reader 112 (Fig. 1) to their false states at the beginning of each word. The line $P_b$ from the digit counter 109 (Fig. 1) is applied to the second input of the sum gate 331 in order to make the output 197 high during the $P_b$ pulse time of each word, thus recording a binary "zero" at each $P_b$ digit position on the tape.

The output 197 of the sum gate 331 is fed to the grid input circuit of the triode 195 which is similar to the grid input circuit of triode 196 previously explained in that when output 197 is at +100 v. triode 195 will be cut-off, but when output 197 is at +125 v., the triode will conduct. The plate of triode 195 is also connected to the +225 v. source by way of line 184 and the R link 115. The cathode is fed by line **150*b* to one terminal of right coil 325 of the head 124, the other terminal of coil 325 being connected by line 322 to one terminal of right coil 327 of head 126. The other terminal of coil 327 is connected to ground by line 323**.

Thus a binary "one" represented by a high potential signal $X_1$ on the input line 330 will cause the right-hand triode 196 to conduct, causing a current to flow through coil 324 of head 124 and coil 326 of head 126. The resulting magnetic lines of force in the split cores 328 and 329, respectively, will produce permanently magnetized areas in one direction in the magnetic coating 141 on the tape 140 directly below the air gaps of the two split cores on channels *Ch1a* and *Ch1b*. A binary "zero" represented by a low potential on the input line 330, which will appear as a high potential on line 190, or a high potential on the product line $P_b$, will cause the triode 195 to conduct, permitting current to flow through coil 325 and 327 of heads 124 and 126, respectively, producing magnetized areas on the coating 141 of the tape 140 in the opposite direction on channels *Ch1a* and *Ch1b*.

The recording circuitry for the signals received on input lines $X_2$, $X_3$, and $X_4$, which are recorded on the tape on channels *Ch2a—Ch2b*, *Ch3a—Ch3b*, and *Ch4a—Ch4b* (Fig. 2), respectively, are precisely similar to that just described for the $X_1$ input which is recorded in duplicate on channels *Ch1a* and *Ch1b*.

Referring momentarily to Fig. 4, the circuitry of the clock record tubes 746 and 747 is presented. The input signals $C_1$ and $C_1'$ are fed from the true and false outputs, respectively, of the C1 flip-flop also shown in Fig. 4. The record tubes are similar to those previously explained in Fig. 9 with the exception that the cathode circuits are connected to ground and the plates are connected by lines 743 and 744 to the windings of the clock heads 125 and 127, the other extremities of the windings being terminated at +225 v. source.

*Reading circuitry*

Referring momentarily to Fig. 1, as the tape 140 is moved past the multiple-head 130, the magnetically recorded clock and information signals on magnetic coating 141 induce electrical signals in the multiple-head 130. The electrical signals sensed from the clock channels are fed, by line 128, to the clock reader **142*a* which has been previously explained with reference to Fig. 4. The electrical signals are fed to the reader 112 by way of four separate conductors represented symbolically in the figure as line 129. The electrical signals sensed from the information channels on the tape are amplified, phase inverted, clipped, and finally combined in product gates with the clock pulses C within the reader 112. The above combined signals comprise the inputs to four memory flip-flops, M1, M2, M3, and M4, within the reader. Both the true and false outputs of the M1 to M4 memory flip-flops are fed on eight separate conductors to the comparator 114, which compares the addresses read from the tape with that stored in the register 116 during the search routine. The true outputs of the four memory flip-flops in the reader 112 are also fed on four separate conductors, symbolically represented as line 117 to the R link 115, which upon reception of a "read" operational command from the computer links the four above mentioned conductors to four input lines from the computer, represented as line 107**.

Figures 10, 11:
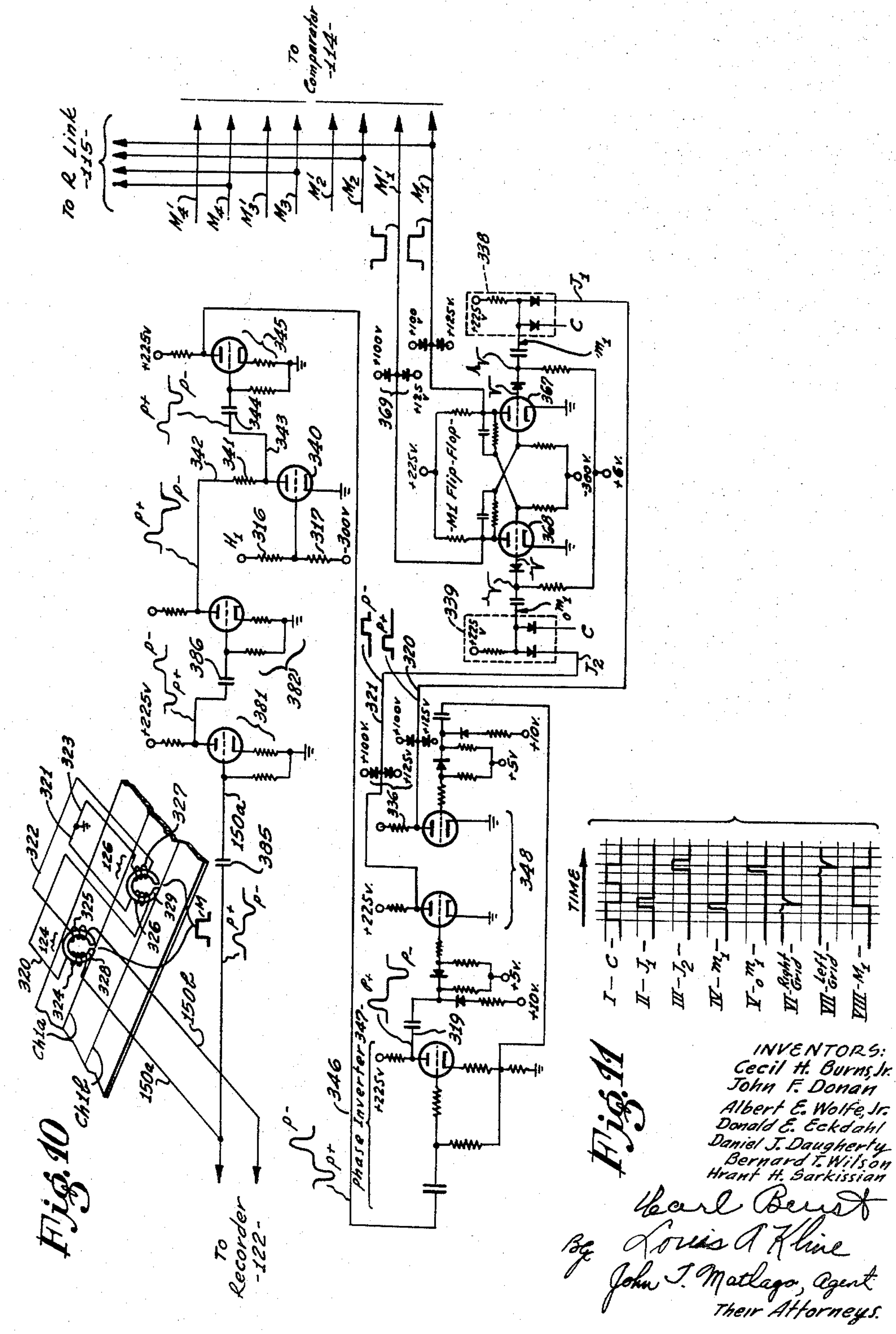
Fig. 10 is a diagram of the reading circuit.
Fig. 11 is a graph of the waveforms referred to in the reading circuit.

Reference will next be made to Fig. 10 showing the detailed circuitry for reading information recorded on the duplicated information channels on the tape. As previously explained in relation to Fig. 9, the heads 124 and 126, corresponding to channels *Ch1a* and *Ch1b*, are each composed of two separate windings on a single split core, as for example head 124 is composed of the separate coils 324 and 325 wound on the single split core 328. The left coil 324 of head 124 is connected by line 320 to the left coil 326 of head 126. The right coil 325 of head 124 is connected to the right coil 327 of head 126. The other terminals of both coils of head 126 are grounded. The other terminals of both coils of head 124, designated 150*a* and 150*b*, comprise the inputs to the two heads when recording information onto the tape; the input 150*a* for recording binary "ones" and the input 150*b* for recording binary "zeros" (Fig. 9). Only the coils 324 and 326 connected in series between ground and line 150*a* are used for reading information from channels *Ch1a* and *Ch1b* on the tape.

As the tape 140 moves past the heads 124 and 126, the substantially square magnetic saturation pattern M, duplicated on channels *Ch1a* and *Ch1b*, induces electrical pulses on line 150*a* such that positive pulses p+ are generated on the leading edges and negative pulses p− are generated on the trailing edges of the magnetic pattern M. These positive and negative pulses are fed to a conventional triode amplifier 381 by way of the coupling capacitor 385. The output of the amplifier 381 is fed to a second amplifier 382 through the coupling capacitor 386. The output of the amplifier 382 is fed to a voltage divider comprised of resistor 341 and a triode tube 340. The common junction of two resistors 316 and 317 connected in series is connected to a −300 volt reference, and the other end of resistor 316 is connected to $H_1$. $H_1$ is the true output of the H1 proposition in the tape drive control 131 (Fig. 1). As will be explained later, $H_1$ is high (+125 v.) when the tape is moving at high speed, and is low (+100 v.) when the tape is moving at slow speed. The values of the two resistors 316 and 317 are chosen so that the triode tube 340 is conductive when $H_1$ is equal to +125 volts, but cut-off when $H_1$ is equal to +100 volts. The plate resistor 341 is so chosen that the pulses appearing on the output line 343 are substantially of the same magnitude for the low and high speed tape travels.

The pulses appearing on output line 343 are fed to a third amplifier 345 by way of capacitor 344. The output 346 of the third amplifier 345 is fed to a phase inverter 347 and thence to a clipper 348, which circuits are similar to the circuits 222 and 230*a*, respectively, previously described in reference to Fig. 4.

As a result of the operation of the clipper circuit 347, positive polarity squared pulses corresponding to p+ and p− are impressed on the lower and upper output lines 320 and 321, respectively. The potential swing on these pulses is limited between +100 v. and +125 v. by clamping diodes, such as diodes 336 on the upper line 321. The p+ positive pulses, designated $J_1$, are applied to one input of the product gate 338. The p− positive pulses, designated $J_2$, are applied to one input of the product gate 339. The clock pulses C are applied to the second input of both gates. The product gates 338 and 339 are typical "and" logical networks similar to the product gates 274 and 275 introduced in Fig. 4, in that the outputs of the gates will be high (+125 v.) when both inputs are high. For example, the output $m_1$ of the product gate 338 will be high when both C and $J_1$ are simultaneously high (+125 v.).

Although the information on the tape is recorded in synchronism with the fall of the clock pulses, the recorded flux patterns spread as they are recorded on the tape. This causes the play-back signal to extend from slightly before to slightly after the fall of the clock.

The clock pulses C are introduced in the reading circuitry at this point to resynchronize the information read from the tape with the fall of the clock pulses, which form the basic timing of the magnetic tape storage unit.

The output $m_1$ of the product gate 338 is applied to the right or true grid input circuit of memory flip-flop M1. The output $_0m_1$ of the product gate 339 is applied to the left or false grid input circuit of the M1 flip-flop.

The M1 flip-flop is similar to the C1 flip-flop in Fig. 4 previously described in that each of its input circuits is comprised of a differentiating circuit and a clipping diode. The rght triode 367 plate output (the true output) is designated $M_1$ and the left triode 368 plate output (the false output) is designated $M_1'$.

In Fig. 11 is presented a graph of the waveforms appearing on the inputs and outputs of the gates 338 and 339 and the inputs and outputs of the M1 flip-flop. The clock pulses C are shown in line I. In lines II and III are shown the inputs $J_1$ and $J_2$, respectively, of the "and" networks 338 and 339. On line IV is shown the output of the gate 338 which is the true input $m_1$ of the M1 flip-flop. It should be noted that $m_1$ rises when $J_1$ rises, and falls when C falls. Because of the comparatively slight deviation possible by the stretch of the tape, the fall of the clock pulse C is always within the positive $J_1$ and $J_2$ pulses. Similarly, the false grid input $_0m_1$ of the M1 flip-flop, shown on line V, rises with $J_2$ and falls with the fall of C. The negative portion of the differentiated $m_1$ pulse, which appears on the grid of the right tube 367 of the M1 flip-flop, is shown on line VI, and the negative differentiated $_0m_1$ pulse, appearing on the grid of the left tube 368 of the M1 flip-flop, is presented on line VII. The true output of the M1 flip-flop appears on line VIII. Thus the output $M_1$ of the memory flip-flop M1 is a reproduction of the information magnetically recorded on channel *Ch1*, resynchronized with the fall of the clock pulses C.

Returning to Fig. 10, both the true $M_1$ and false $M_1'$ outputs of the M1 memory flip-flop are clamped between +100 v. and +125 v. by diode clamps, such as the two diodes 369 of the $M_1'$ output.

A similar circuit is employed for reading out each of the pairs of information chanels *Ch2a*—*Ch2b*, *Ch3a*—*Ch3b*, and *Ch4a*—*Ch4b*, terminating in the memory flip-flops, M2, M3, and M4, respectively.

Both the true and false outputs of the M1, M2, M3, and M4 flip-flops are fed to the comparator 114 on eight separate conductors. The true outputs $M_1$, $M_2$, $M_3$, and $M_4$ are also fed to the R link 115 on four separate conductors. The R link, in response to the "read" operational command, links these four true output lines to lines $T_1$, $T_2$, $T_3$, and $T_4$ from the computer (Fig. 8).

In Fig. 23 is presented a table of binary coded decimal digits in a conventional excess 3 system. This table is similar to that presented in Fig. 3, except that the tape channels heading the binary columns in Fig. 3 are replaced by the memory flip-flops in the binary column headings in the table in Fig. 23. The binary digits in the latter table represent the states of the M1 to M4, inclusive, flip-flops; i.e., a binary "one" represents that the flip-flop at the head of the column is in the true state, and a binary "zero" represents that the flip-flop is in a false state. Each column has a second heading, B1 to B4 from the register which will be explained later. At the left of the table is presented the decimal equivalent of the binary digit combinations.

*Counting circuits*

As previously described in Fig. 1, the digit counter 109 responds to successive clock pulses generated by the clock pickup circuitry described in detail in Fig. 4.

The digit counter counts repeatedly through twelve pulses corresponding to the digit positions $P_0$ to $P_{10}$ and $P_b$ of each word, with the exception of the $P_b$ position of the $W_{10}$ word when the counter is reset (Fig. 2).

Each time the digit counter 109 counts the digit pulse $P_b$, the word counter 108 is set up to advance one unit. The word counter steps through a cycle of twelve steps corresponding to word positions $W_s$ and $W_0$ to $W_{10}$ of each block.

The digit and word counts together may be used to define any digit position of a word within a block.

Before going into a description of the details of the counting circuitry, the convention of the logical methods employed for presenting the remaining circuitry of the magnetic tape storage unit will next be broadly described.

Logical propositions may be considered to be represented in the circuits by conditions of flip-flop circuits. When the flip-flop is in one condition, the proposition is considered to be "true" (or the flip-flop is said to be storing a binary "1"). When the flip-flop is in the other condition, the proposition is considered to be "false" (or the flip-flop is said to be storing a binary "0").

The true and false conditions of a proposition are preferably referred to as terms which are each represented by a D.C. voltage on separate output lines. When a voltage on an output line is high (+125 v.), the term it represents is effective; and when the voltage on an output line is low (+100 v.), the term represented is ineffective.

The two terms descriptive of a logical proposition are defined by output lines connected to each of the plates of the tubes of the flip-flop circuit. One of these terms represents the proposition itself, and the other represents its logical inverse.

In accordance with the present scheme, in order to trigger a proposition flip-flop to either its true or false state by signals applied thereto on separate inputs, an input line is coupled to the grid of each of the tubes of the flip-flop.

The nomenclature employed for the present invention uses combinations of capital letters and numbers, or lower case letters, for designating the proposition flip-flops themselves. The outputs of the flip-flops are characterized by corresponding capital letters with the number, or lower case letter, as a subscript. In order to characterize the true state of a proposition flip-flop from its logical inverse, the latter is distinguished from the former by an affixed prime.

As for the inputs to a flip-flop, these are designated by corresponding lower case letters with the associated number or letter as a subscript. The input, which when energized renders a flip-flop into a false state, is further characterized by a subscript zero prefixing the lower case letter.

This standardized notation, which is to be used throughout the rest of the present specification, will be made clear by referring to Figs. 12 through 18, together with the following description as to how the outputs of the A1 to A4 flip-flops are connected to the inputs to cause the digit counter to count each digit position of a word.

The counter arrangement is a parallel one in that the clock pulses generated by the clock pickup circuitry in Fig. 4 is simultaneously applied on all the gates associated with the A1 to A4 flip-flop inputs. The interconnection of the flip-flop outputs, however, only allow themselves to be triggered by the successive clock pulses C, so as to change their states in an orderly fashion to indicate the digit counts.

In Fig. 12 the combinations of the states of the A1, A2, A3, and A4 flip-flops which indicate the digit count of the counter are shown by a table. Each row of the table indicates the states assumed by the flip-flops during each digit time of a word as defined at the right of the table.

The counting cycle, from $P_0$ through $P_{10}$ and $P_b$, recycles with the exception of the last digit position $P_b$ of the last word $W_{10}$ of a block, when the counter is "reset." Since, as previously stated, in order for the memory flip-flops to function properly, the zero reference digit position $P_b$ must precede each word on the tape, the counter must change from "reset" to $P_b$, thence to the $P_0$ digit position of the $W_0$ word (Fig. 2).

On examining the states of the A1 to A4 flip-flops in the table of Fig. 12, it is noted that in order to render the A1 flip-flop into a false state, i.e., have a 0 therein during the next clock period, as for example in advancing from $P_0$ to $P_1$, the A1 flip-flop must have a 1 therein, i.e., it must be in a true state during the $P_0$ digit count. Similarly the A1 flip-flop must be in a false state in order to be switched into a true state during the next clock pulse period, as in advancing from count $P_1$ to $P_2$.

Referring next to Fig. 13, a detailed schematic circuit diagram is shown of how the A1 flip-flop is connected so as to operate as the first stage of the digit counter.

The flip-flop circuit, which has already been briefly explained in Fig. 4, will here be more fully described. As shown, triodes **350*a* and 350*b* have their plates and grids intercoupled, as for example, by a resistor 353 in parallel with a capacitor 352. The plate of each of the triodes is connected through a separate load resistor, like resistor 361, to the low impedance +225 volt source, and the cathode of each triode is grounded. Each of the grids of the tubes is joined through a separate grid resistor, such as 351**, to a negative bias —300 v. reference. The flip-flop circuit is provided with output circuits connected to each of its plates and triggering circuits associated with each of its grids in accordance with the arrangement previously noted.

Whenever the flip-flop is considered to be in a "one" state, neon light 363, connected in series with a limiting resistor 362 across the left load resistor 361, lights up; and when the flip-flop is in the "zero" state, neon light 363 is extinguished.

The output lines $A_1$ and $A_1'$ from the A1 flip-flop are taken from the right and left plates, respectively. In order to maintain the swing of the plate voltage between +100 v. and +125 v., clamping diodes, such as diodes 357 and 358 associated with the right output $A_1$, are provided on each of the output lines.

The inputs to the flip-flop are controlled by right and left gates 359 and 360 associated with the grids of tubes **350*a* and 350*b*, respectively. Each of the gates is coupled to a grid through a differentiating circuit 355 and a blocking diode 356 as shown in particular for the circuitry connected to the grid of tube 350*a***.

For this particular counting stage, the right plate output $A_1$ is connected to one input of the left gate 360 and the left plate output $A_1'$ is connected to one input of the right gate 359. The clock pulse C is applied simultaneously to the other input of each of the right and left gates 359 and 360.

These gate circuits 359 and 360 are typical logical "and" networks, such as were briefly explained in Fig. 4. In such a circuit, as noted in particular for right gate 359, the inputs therein are applied on the cathode-ends of crystal diodes 366 and 377 whose anode-ends are joined to a common line 365 which is connected to the positive source of 225 v. through a load resistor 364.

Each of the inputs to a logical "and" network can be either of the high potential +125 v. or the low potential +100 v., depending on the state of the flip-flop or clock pulse C. Any time the input to the gate from the plate output $A_1'$ of the flip-flop is high, the clock pulse C applied to the other input is, in effect, passed to the output of the gate. This pulse is differentiated in differentiating circuit 355 and the positive portion thereof is blocked by diode 356 while the negative portion, which represents the trailing edge of the clock pulse C, is passed therethrough and thus triggers tube 350a into a non-conductive state.

It should be noted that the diode 356 is returned through the resistor of the differentiating circuit 355 to a positive voltage of 3 volts. This serves to place a bias voltage of 3 volts across diode 356, thus preventing the passage of the initial 3 volts of a signal fed into it. This bias arrangement functions to clip spurious signals resulting from slight variations of the gate output voltage level caused by the cutting off of current flow through one of the input diodes of gate 359. Any time this is done the increased current flow through the other diode results in the gate output level being slightly lower. This results from the small forward resistance inherent in each diode. The differentiation of these negative drops in voltage level creates the spurious signals which the aforementioned bias circuit arrangement effectively prevents from passing to the grid.

In Fig. 14 the graphs of the waveforms appearing at different points of the A1 counting stage circuit during a part of the digit counter counting cycle are shown. In line I the regularly recurring clock pulses C are shown. In line II the $A_1$ plate output is shown to be high (+125 v.) during $P_0$ clock period, while in line III the $A_1'$ output is shown to be low (+100 v.) during the $P_0$ digit time. As shown in line VI, since the output $A_1$ is high in potential during the $P_0$ digit time, the clock pulse C causes the "and" network (gate 360) to generate a pulse ${}_0a_1$ which is substantially similar to the clock pulse C. On line VII the pulse form impressed on the input to the left grid during $P_0$ is shown to be essentially the differentiated trailing edge of the rectangular pulse ${}_0a_1$. It is thus noted that the A1 flip-flop changes state on the trailing edge of the ${}_0a_1$ pulse so generated during $P_0$. It is also noted that, as a result of triggering the left tube off at this instance, the left plate output $A_1'$ rises in potential according to the time constant of the flip-flop circuit. The output $A_1'$ is thus high during $P_1$ period which results in the next clock pulse C effectively appearing as $a_1$ in line IV. The differentiated trailing edge of the $a_1$ pulse, as shown in line V, then operates to trigger the A1 flip-flop so as to bring it back to its original state during $P_2$. In a similar manner, the differentiated trailing edge of ${}_0a_1$ in line VI triggers the left tube off at the end of $P_2$ time, thus making $A_1$ low and $A_1'$ high during $P_3$. Similarly, the differentiated trailing edge of $a_1$ on line IV triggers $A_1$ high and $A_1'$ low at the end of the $P_3$ clock period.

It should be noted that the circuit arrangements shown enable the flip-flop circuits in the present embodiment of the invention to be reliably operated without the use of any delay circuits. Referring to the circuit shown in Fig. 13, the abrupt swing in the output voltage level of flip-flop A1 at the end of period $P_0$, induced by the particular clock pulse passing through gate 360 during period $P_0$, controls the opposite gate 359 so as to permit it to pass the next clock pulse during the next clock period $P_1$.

For example, if the change in the A1 flip-flop induced by a particular clock pulse were to be sensed by the opposite gate before the clock pulse which causes this change is dissipated, it would be possible for the flip-flop to end up in an undesired state. The present arrangement of circuit elements overcomes the possibility of this. First, it should be pointed out that each squared clock pulse appears simultaneously at all the gates. Now then, by effectively differentiating the trailing edge of a clock pulse, and using this signal for triggering the circuits, assurance is given that the clock pulse which causes the triggering is no longer present on any of the other gating circuits. This results from the fact that the flip-flop voltage level changes are communicated to the input gates after the clock pulse disappears.

It is now evident that the clock pulse period may be considered to divide the timing of the circuit operations into two distinct phases of operation. During the first half of a clock pulse period when the voltage from the clock source is low, the transients of the circuitry are occurring. For reliability, these should be completed before the leading edge of the clock pulse arrives. During the last half of the clock pulse period when the clock pulse is present, gating circuits can be thought of as observing the flip-flop outputs so as to determine if a pulse should pass onto the grid of the flip-flop circuit. The clock pulse must be broad enough so that, taking into account its rise time, it reaches its maximum voltage level before the end of the clock period. The clock pulse must also have a low impedance source so that a square edge can be created on the trailing end of the pulse passing through the grid gates. These conditions make it possible to create by differentiation a negative pulse coincident with the end of the clock period which can be used for triggering the flip-flops.

Referring to Fig. 15, the simplified manner in which the remaining circuitry of the present invention is to be presented will now be described.

Instead of showing the wiring diagrams of the flip-flops together with the logical circuits, as in Fig. 13, the remaining circuits are presented by simplified block diagrams of the flip-flops. As shown in Fig. 15, only the input and output lines for the flip-flop are indicated and these are marked in accordance with the convention previously described. Furthermore, the grid input differentiating and blocking circuits are omitted in the block diagrams for simplicity. Only the gates indicating the logical product of the control input and clock input are shown at each of the inputs so as to emphasize the fact that the clock pulses are applied simultaneously to all the flip-flop inputs.

In accordance with the scheme of presenting the present invention, after the system of thought to be accomplished is explained by means of binary table or similar schemes for systematizing the thought, the terms of the system are represented by the conditions of flip-flop circuits, or other sources of potentials, having the two possible operating levels.

Logical equations are then written which define when and how the flip-flop circuits are to change in accordance with the effective terms of the system. The logical equations, so devised, are then presented below the block diagram of the flip-flops.

The logical equations for the grid triggering of a flip-flop circuit may be interpreted as a statement of the terms which have to be simultaneously of a high potential in order that the particular flip-flop should trigger into the particular state. Two distinct notations are used for the equations. The first, "logical multiplication," means that all the terms in the particular product have to be of high potential in order to make that product effective in a particular equation. The second, "logical addition," means that at least one term of the sum has to be of high potential in order to make that sum effective in a particular equation.

Refer, for example, to the $a_2$ counting equation for the A2 flip-flop as shown below the A2 flip-flop in Fig. 15. This equation, $a_2=A_2'(A_1+A_1'A_4'W_{10})C$, states that the A2 flip-flop will change to a "true" state at the end of the clock period during which the following three terms are at a high potential: $A_2'$, $(A_1+A_1'A_4'W_{10})$, and C. The term $(A_1+A_1'A_4'W_{10})$ will be of a high potential if either $A_1$ or all three inputs $A_1'$, $A_4'$, $W_{10}$ are of a high potential.

The particular mode disclosed of representing these logical equations has been chosen because these equations can be operated upon according to certain well-known rules of logic in a manner similar to those by which algebraic equations are operated upon.

Having once described the means for physically generating a typical logical product and logical sum, the present techniques enable the logical circuitry for solving the entire logical equations to be set up directly by reference to the equations alone. The logical circuitry generally ends up as one large interconnected network comprised of the two fundamental circuits. In reducing the equations to physical circuitry, recognition is made of the fact that certain common complex terms and partial products can be generated separately and used repeatedly where needed. This results in a reduction of the number of components required but often at the expense of complicating the recognition of the original equations. The present techniques, however, make it possible to retain in the equations the original system of thought, even though the equations go through several revisions, as long as the revisions are according to the well-known rules of symbolic logic.

It should be noted that circuits to solve "logical multiplication" are commonly called "gates," and circuits to solve "logical addition" are commonly called "mixers" in the prior art.

The conditions required during a clock pulse period for flipping the A1 flip-flop, as previously described in connection with Figs. 12 and 13, are represented by symbolic logic equations $a_1=A_1'C$ and ${}_0a_1=A_1C$. Note that these equations are merely a shorthand method of stating that the terms of the equations representing the inputs to the right and left gates 359 and 360, respectively, must be simultaneously at the high operating potential (+125 v.) in order to pass the pulses $a_1$ and ${}_0a_1$ previously indicated and described in Fig. 14.

By examining the states of the A flip-flops in Fig. 12, the symbolic logic equations for the A2 flip-flop can now be similarly determined. As noted in the table, the conditions necessary to enable the A2 flip-flop to be triggered to a true state, i.e., change from a 0 to a 1 state, are that the A2 flip-flop be in a false state and the A1 flip-flop be true. This can be symbolically noted by $a_2=A_1A_2'C$. Upon further examination of the table, it is noted that the A2 flip-flop is triggered true at the end of the $P_b$ time of the last word, $W_{10}$, of each block in order to be in the true state during $B_1$ time. The logical equation for accomplishing this may be written as $$a_2=A_1'A_2'A_4'W_{10}C$$

The A2 flip-flop is triggered false at the end of the pulse period during which both the A1 and the A2 flip-flops are true. Thus the symbolic logic equation for the false input to the A2 flip-flop may be written: ${}_0a_2=A_1A_2C$.

The A3 flip-flop is seen to be triggered true at the end of the pulse period during which the A1 and A2 flip-flops are true and the A3 flip-flop is false, thus $a_3=A_1A_2A_3'C$. The A3 flip-flop is seen to be triggered false at the end of the pulse period during which the A1, A2, and A3 flip-flops are all true and the A4 flip-flop is false, thus ${}_0a_3=A_1A_2A_3A_4'C$. The A3 flip-flop is also triggered false at the end of the $P_b$ time of the last word, $W_{10}$, of each block in order to be in the false state during $B_1$ time. The $P_b$ digit period is uniquely characterized by the false states of the A1, A2, and A4 flip-flops, thus the logical equation ${}_0a_3=A_1'A_2'A_4'W_{10}C$ may be written to satisfy this condition.

The A4 flip-flop is triggered true at the end of the $P_2$ pulse period of each word, at which time the A1, A2, and A3 flip-flops are all true and the A4 flip-flop is false; thus: $a_4=A_1A_2A_3A_4'C$. The A4 flip-flop is triggered false at the end of the $P_{10}$ pulse period of each word, which is characterized by the true state of all four flip-flops, thus: ${}_0a_4=A_1A_2A_3A_4C$.

A second set of equations, the reset equations, will now be explained. In order to make clear the nature of the reset terms, reference is made to Fig. 2. The $B_1$ (blank) area of the first word $W_s$ of each block is comprised of a one-half inch blank area on the tape terminated by a single clock pulse period $P_b$. In order to insure that the digit counter remains in step with the tape, the digit counter is reset to the $B_1$ count by an external signal during the time the multiple-head 130 is over the blank area at the beginning of each block on the tape during which no clock pulses are sensed.

This is accomplished by means of the circuit presented in Fig. 18. The clock pulses C are fed by line 400 into a differentiating circuit 401. The grid input of the triode 404 is clamped at a lower limit of +100 volts by the diode 403 whose anode-end is connected to the +100 volts source. Thus only the positive pulses of the differentiated clock pulses appear on the grid input 402. The plate of triode 404 is connected directly to the +225 volt source, and the cathode is connected to ground through an integrating circuit composed of resistor 405 and capacitor 406 in parallel. The value of the resistor 405 is chosen sufficiently high to maintain the cathode at a value slightly above the +100 volts of the grid when no clock pulses are present on line 400.

When clock pulses are continuously applied on the input line 400, the positive portion of the integrated pulses appearing on grid input 402 would appear, by cathode follower action, across the resistor 405, were it not for the capacitor 406. This capacitor is chosen sufficiently large so that only a small portion of the charge received from one positive pulse appearing across resistor 405 will be drained off by the resistor, before the next clock pulse appears (by cathode follower action) across resistor 405 and fully recharges it again. Therefore, as long as clock pulses are continually received on line 400, the output line 407 will be maintained at a positive value approaching closely +125 volts. However, as soon as the clock pulses cease, the charge on capacitor 406 drains off through resistor 405 and the output line 407 approaches closely a +100 volt value.

The output line 407 of the integrator is fed directly to the logical driver 409 which is similar to the logical driver 253a previously explained in Fig. 4. The output of the driver 409, which is clamped between +100 v. and +125 v. by the diodes 410 and 411, appears on line 408 as an inverted and clamped replica of the input on line 407. Thus, as long as clock pulses C are received on line 400, the output on line 408 will remain at +100 volts, but very shortly after the clock pulses cease, the potential will rise to +125 volts and remain at that potential until clock pulses again appear on line 400.

The multivibrator 154 is a conventional mutivibrator circuit well known in the prior art which operates continuously (Fig. 1) and generates a substantially square wave of approximately the same period as the clock pulse C. The output 413 of the multivibrator, $C_0$, is also clamped between +100 v. and +125 v. by the clamping diodes 414. The clamped output $Z_1$ of the driver 409 and the clamped output $C_0$ of the multivibrator 154 are both fed to the product gate 412.

Thus, in effect, when clock pulses C are present on the input line 400, $Z_1$ on line 408 is maintained low (+100 v.) and the pulses $C_0$ on output 413 are blocked from appearing on the output of the gate 412. But when there are no clock pulses C on the input line 400, $Z_1$ rises to +125 volts (high) and effectively permits the pulses $C_0$ to appear on the gate output $(Z_1C_0)$.

Returning to Fig. 12, it is seen that during the $B_1$ period, the A1 and A2 flip-flops should be true and the A3 and A4 flip-flops should be false. Therefore, the reset signal $(Z_1C_0)$ should be applied to the true inputs of A1 and A2 and to the false inputs of A3 and A4 flip-flops.

The combined logical grid input equations appear directly below their respective flip-flops in Fig. 15 and have the reset product $(Z_1C_0)$ logically added to the counting terms. These combined equations define both the counting operations and the resetting operations.

Figure 16:
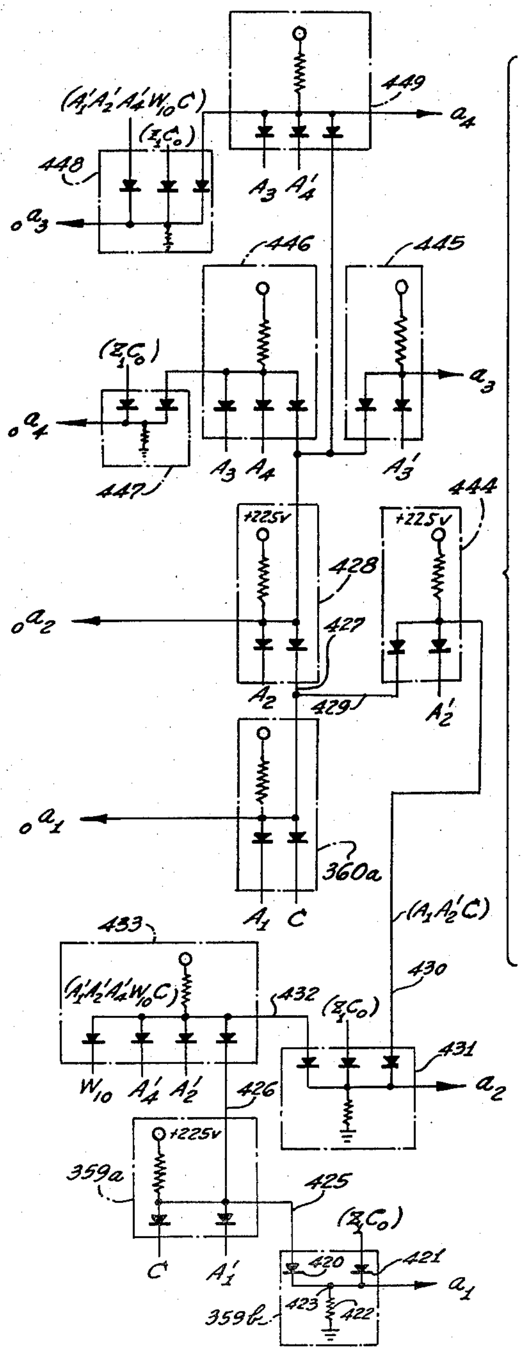
Fig. 16 shows the input circuits to the A1, A2, A3, and A4 flip-flops.

The logical diode networks used for physically solving the triggering equations for the A1, A2, A3, and A4 flip-flops will next be introduced in Fig. 16.

The network for the equation ${}_0a_1=A_1C$ for the false input to the A1 flip-flop is simply shown by designating the inputs to the logical "and" network 360a by the terms of the ${}_0a_1$ equation, and marking the output of the gate by ${}_0a_1$.

The circuit for the equation $a_1=A_1'C+(Z_1C_0)$ is shown to be comprised of a typical "and" network 359a followed by a typical "or" network 359b. The inputs to the logical "and" network 359a are simply designated i.e., $A_1'$ and C. The output of the gate 359a, which represents the product $A_1'C$, is fed by line 425 to one of the inputs of the typical sum gate 359b. This logical "or" network has two input diodes 420 and 421. The product $A_1'C$ is impressed on input diode 420; and the separately generated reset signal $(Z_1C_0)$ is impressed on the other input diode 421. The cathode-ends of their diodes are connected to a common junction 423 which is returned to ground through a resistor 422. The operation of the sum gate or logical "or" network is such that, whenever either one of the inputs or both inputs are at the high potential of +125 v., the output is at a high potential. When all the inputs, in the present case both inputs, are of the low potential of +100 v., the output is at a low potential. Thus the output of the logical "or" network 359b represents the logical sum of the two inputs $A_1'C$ and $(Z_1C_0)$; i.e., $a_1=A_1'C+(Z_1C_0)$.

The output of the "and" network 360a, in addition to representing the false input to the A1 flip-flop, is also fed by line 427 to one of the inputs of a second product gate 428. The other input to the gate 428 is designated $A_2$. Thus the output of this second product gate represents the product of the two inputs $A_1C$ and $A_2$; i.e. ${}_0a_2=A_1A_2C$, which is the logical equation for the false input to the A2 flip-flop.

The output of the "and" network 360a, which represents the product $A_1C$, is also fed by line 429 to one of the inputs of the product gate 444 whose other input is desingated $A_2'$. The output 430 of this logical "and" network 444 represents the combined product $(A_1A_2'C)$ and constitutes one input of the sum gate 431. This sum gate is a logical "or" network similar to the sum gate 359b previously discussed.

The output of the product gate 359a, which represents the product $A_1'C$, is fed to the product gate 433 and represents one input thereof. The other inputs $W_{10}$, $A_4'$, and $A_2'$ are so designated. The output 432 of this logical "and" network, which represents the product $(A_1'A_2'A_4'W_{10}C)$, represents a second input to the sum gate 431. The third output to this latter logical "or" network is the previously generated reset signal $(Z_1C_0)$. The output of the sum gate 431, which represents the logical sum of the three above inputs; i.e.

$$(A_1'A_2'A_4'W_{10}C)+(Z_1C_0)+(A_1A_2'C)$$

is fed to the true input of the A2 flip-flop designated $a_2$. Thus $a_2=A_1'A_2'A_4'W_{10}C+(Z_1C_0)+A_1A_2'C$, which by simple Boolean algebra well known in the prior art, reduces to $a_2=A_2'(A_1+A_1'A_4W_{10})C+(Z_1C_0)$.

In a similar manner it is readily seen that the output of the product gate 445 is the combined product of the output $A_1A_2C$ of gate 428 and the $A_3'$ designated input, thus: $a_3=A_1A_2A_3'C$. Similarly, the output of the product gate 449 is the combined product of the output $A_1A_2C$ of gate 428 and the designated inputs $A_3A_4'$, thus: $a_4=A_1A_2A_3A_4'C$. The output of the sum gate 448 is seen to be composed of the logical sum of the output of gate 449 and the previously generated product $(A_1'A_2'A_4'W_{10})$ and the reset signal $(Z_1C_0)$, thus: ${}_0a_3=A_1A_2A_3A_4'C+(Z_1C_0)+A_1'A_2'A_4'W_{10}C$, which reduces to $${}_0a_3=A_4'(A_1A_2A_3+A_1'A_2'A_4'W_{10})C+Z_1C_0$$

Similarly the output of the sum gate 447 is readily reduced as: ${}_0a_4=A_1A_2A_3A_4C+(Z_1C_0)$.

The above circuits illustrate clearly how the equations for the inputs to the proposition flip-flops operate as a key, revealing the manner in which the outputs are logically interconnected to the inputs; i.e., they define how and when the flip-flops should change with respect to the conditions of the other propositions in the circuits.

The equations representing the reset $B_1$ and the digit counts $P_b$, $P_2$, $P_3$, $P_4$, $P_5$, $P_6$, $P_7$, and $P_8$ are seen in Fig. 12 to be composed of terms represented by the outputs from the A1 to A4 flip-flops. The digit counts $P_0$, $P_1$, $P_9$, and $P_{10}$ are not used in the remainder of the present invention and are therefore not generated.

Figure 17:
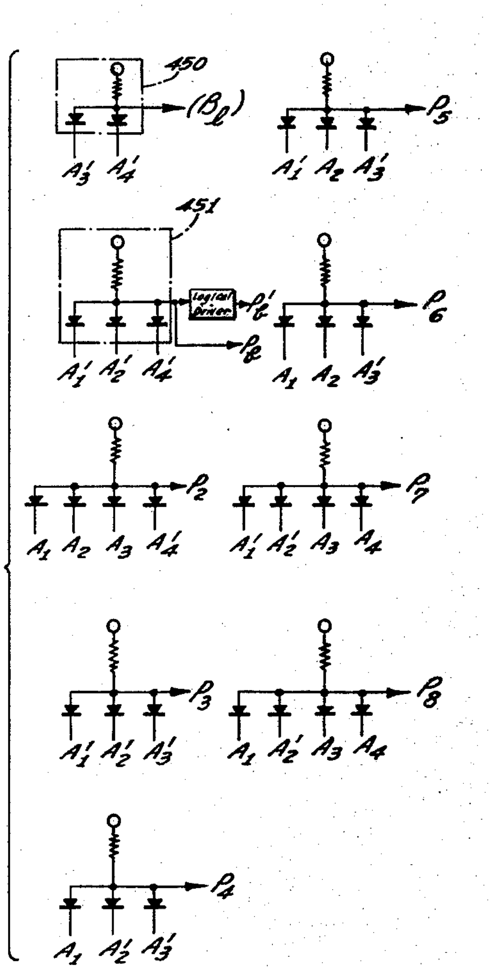
Fig. 17 shows diode networks for generating the useful signal outputs of the digit counter flip-flops.

The $B_1$ is seen from the table to be uniquely characterized by the false states of the A3 and A4 flip-flops; $P_b$ by the false states of the A1, A2, and A4 flip-flops. In Fig. 17, the (reset) $B_1$ is physically generated by the product gate 450 having the inputs $A_3'$, $A_4'$, and $P_b$ by the product gate 451 having the inputs $A_1'$, $A_2'$, and $A_4'$. Since the inverse of the $P_b$ term is later used in the circuitry of the tape input, the $P_b'$ term is generated by feeding the $P_b$ term into a logical driver. In a similar manner $P_2$ through $P_8$ are physically generated by the other product gates presented in Fig. 17.

The nature of the word counter 108 (Fig. 1) will now be described. As shown in Figs. 19 and 20, the A5 to A9 flip-flops, inclusive, are used for defining the word counts. Here also the counter arrangement is a parallel one in that the clock pulse C is applied to all the flip-flop inputs so as to cause all changes to occur simultaneously and in synchronism with the clock periods. The interconnections of the flip-flop outputs, however, only allow certain flip-flops to be triggered by the successive pulses.

In Fig. 19 the combination of the states of the flip-flops characteristic of each word count of the counter is shown by a table. This table is a binary representation of the word counts $W_s$ and $W_0$ through $W_{10}$ of a block. Referring momentarily to Fig. 2, it may be noted that each word in a block is terminated by the $P_b$ digit. Thus at $P_b$ digit pulse time an effective "carry" pulse is received by the word counter from the digit counter, which in effect signifies the end of a word.

Referring back to the table in Fig. 19, it is noted that, when desiring to make the A5 flip-flop true, i.e., have a 1 therein, upon receipt of the next $P_b$ digit count signal from the digit counter 109, the A5 flip-flop must have a 0 therein, i.e., be in a false state. Similarly, the A5 flip-flop must be in a true state in order to be switched to a false state on the next $P_b$ count. Thus the A5 flip-flop changes state every time a $P_b$ digit count output signal is generated by the digit counter 109.

By examining the states of the A flip-flops, as presented in the table of Fig. 19, the symbolic logic equations for the A6 flip-flop can be similarly determined. On moving down the table it is noted that the conditions necessary to make flip-flop A6 trigger to a true state are that flip-flop A6 itself be in the false state and either (1) that the A5 flip-flop be true and the A9 flip-flop be false, or (2) A7 flip-flop be in a false state and the A8 flip-flop be in the true state. This can be symbolically noted by $a_6=A_6'P_b(A_5A_9'+A_7'A_8)C$. In a similar manner, the conditions required to make the flip-flop A6 false are that flip-flops A5 and A6 both be true, thus: ${}_0a_6=A_5A_6P_bC$.

Again examining the table, it is noted that the A7 flip-flop changes from a false state to the true state at the end of the $W_4$ word count and again at the end of the $W_9$ word count. The $W_4$ word count is characterized by the A5 and A6 flip-flops being true and the A7 flip-flop being false. The $W_9$ word count is characterized by the A6, A7, and A8 flip-flops all being in their false states, thus: $a_7=A_7'P_b(A_5A_6+A_6'A_8')C$. The A7 flip-flop is triggered false at the end of the $W_8$ and $W_{10}$ word counts, which are both characterized by the true states of the A5, A6, and A7 flip-flops, thus: ${}_0a_7=A_5A_6A_7P_bC$.

The A8 flip-flop is only triggered true once in a word counting cycle, i.e., at the end of the $W_8$ word count, which is identified by the true states of the A5, A6, and A7 flip-flops, and the false states of the A8 and A9 flip-flops, thus: $a_8=A_5A_6A_7A_8'P_bC$. The A8 flip-flop is triggered false at the end of the $W_{10}$ word time, thus: ${}_0a_8=A_5A_6A_7A_8P_bC$.

The A9 flip-flop is triggered true at the end of the $W_{10}$ word time, thus: $a_9=A_5A_6A_7A_8A_9'P_bC$. The A9 flip-flop is triggered false at the end of the $W_0$ word time, uniquely characterized by the true states of the A5 and A9 flip-flops, thus: ${}_0a_9=A_5A_9P_bC$.

As previously described in connection with the digit counter, the reset signal ($Z_1C_0$) is separately generated while the multiple-head 130 (Fig. 1) is in the blank area of the tape ($B_1$ of $W_s$, Fig. 2). The reset signal, therefore, is so applied that the word counter flip-flops will be triggered to the states representing the $W_s$ word count, as depicted in the table of Fig. 19. Thus the reset signal is applied to the false inputs of the A5, A6, A7, and A8 flip-flops and the true input of the A9 flip-flop.

The combined counting and reset logical grid equations appear directly below their respective flip-flops in Fig. 20.

The logical diode networks used for physically solving the triggering equations for the A5, A6, A7, A8, and A9 flip-flops are presented in Fig. 21. These networks are comprised of logical "and" networks and logical "or" networks similar to those previously explained in detail in reference to Fig. 16 for the digit counter flip-flops.

The equations representing the individual word counts $W_s$, $W_0$, and $W_{10}$, and the overall word count $W_1$–$W_{10}$, inclusive, are presented to the right of the table in Fig. 19. The $W_s$ word count is uniquely characterized in the table by the false state of the A5 flip-flop and the true state of the A9 flip-flop. Similarly, the $W_0$ word count is the only word count in the table where both the A5 and A9 flip-flops are in their true state. The information in a block (excluding the address) includes the word counts $W_1$ to $W_{10}$, inclusive, and is separable from the $W_s$ and $W_0$ word counts by the false state of the A9 flip-flop. The $W_{10}$ word count is characterized by the true states of the A5, A6, A7, and A8 flip-flops.

These outputs, which are the only outputs of the word counter used in the remainder of the present invention, are physically generated by the product gates presented in Fig. 22. It should be noted that gate 452 has two designated inputs, $A_9'$ and $R_{18}$. As previously explained, $A_9'$ alone is sufficient to characterize the $W_1$ to $W_{10}$, inclusive, word count. The $R_{18}$ input is a qualifying proposition from the register 116 of Fig. 1 which will be explained in detail later on.

*Register*

As has been previously mentioned, when it is desired to search for a desired block of information on the tape, the address of the block desired is sent from the computer 100 to the register 116 (Fig. 1) where it is permanently stored during the process of searching for the block. Similarly, when it is desired to read information from the tape or record information onto the tape, the reading and recording instructions are sent from the computer 100 to the register 116 where these instructions are permanently stored during the process of reading or recording.

Following a search operational command, the four decimal digits of the address of the block desired are sent to the register from the computer in the form of sixteen binary signals simultaneously received by the register 116 on sixteen separate conductors. The binary signals are represented by a grounded line for a binary "one" and an ungrounded line for a binary "zero." A grounded line causes a relay within the register 116 to close, and an ungrounded line leaves an associated relay within the register 116 open. Each of the above storage relays within the register, which are sixteen in number (one associated storage relay for each of the sixteen signal conductors from the computer), has a holding contact which causes the relay to remain closed once it is momentarily closed by a ground signal on its associated input line. Thus the sixteen binary signals representing the address desired are permanently stored in sixteen storage relays within the register 116 releasing the computer for other operations while the address stored in the register is being located on the tape.

Following a "read" or "record" operational command, the computer sends the reading and recording instructions to the register 116 on three of the above sixteen input lines. The instructions are received by the register in the form of ground and no ground electrical signals on the three lines, a grounded line causing the associated storage relay to close and the ungrounded line causing the associated storage relay to open. In this way the reading and recording instructions are permanently stored in three of the sixteen storage relays within the register.

The physical circuitry and operation of the register will be made clear by reference to Figs. 24, 25, 26, 27, 28, 29, and 30 and the following description.

Reference is first made to Fig. 25, presenting the physical circuitry of a logical network within the register.

The operational command is sent by the computer to the register on three input lines $W_2$, $R_2$, and $S_2$ (Fig. 8), the particular operation desired being signaled by a high (+125 v.) potential on one of the lines, and a low (+100 v.) potential on the other two lines. For a "record" operational command, $W_2$ will be high; for a "read" command, $R_2$ will be high; and for a "search" command, $S_2$ will be high.

If the magnetic tape storage unit is in the process of locating a desired block of information on the tape, the register, wherein the address of the block desired is stored, should not be cleared by a "read" or "record" operational command until the block desired is located. Since searching is done at high speed tape travel only, the H1 proposition in the tape drive control 131 (Fig. 1), which is the output of the relay that controls the speed of the two-speed motor 144, will be in the true state until the block on the tape desired is located, at which time the H1 proposition changes to the false state (this will be made clearer in the ensuing description). The false output $H_1'$ of the H1 proposition is applied as one input to the product gates 621 and 622. The "record" operational command product $W_2$ is applied to the second input of the product gate 621, and the "read" operational command product $R_2$ forms the second input of the product gate 622. The output of both product gates 621 and 622 are applied as inputs to the sum gate 623, the third input of which is $S_2$, which when high represents a "search" operational command. Thus the output $(S_2+W_2H_1'+R_2H_1')$ will be high immediately upon receiving a "search" operational command, but will remain low upon reception of a "read" or "record" operational command as long as a previously commenced search is in process as evidenced by a low potential on the false output $H_1'$ of the H1 proposition in the tape drive control.

Referring to Fig. 24, which is a detailed drawing of the register relay circuitry, it is seen that the proposition $(S_2+W_2H_1'+R_2H_1')$ is fed directly to the input of a relay driver 520. The output 521 of the relay driver is fed to one terminal of the relay winding 522 of a relay $Rl_2$. The other terminal of the winding 522 is connected to a +225 volt source. The relay driver 520 is similar to the relay driver 180 of Fig. 8 previously described in that when the input $(S_2+W_2H_1'+R_2H_1')$ is high (+125 v.), the relay winding 522 is energized; but when the input is low (+100 v.), the winding 522 will not be energized.

When relay $Rl_2$ is energized, the windings of relays $Rl_3$ and $Rl_4$ are energized. Relay $Rl_3$ is energized as follows: ground, through the relay winding 548, through the resistor 527, and to the +225 volt source through the contacts of relay $Rl_2$. The resistor 527 and the capacitor 520a form an RC timing circuit delaying the closing of the $Rl_3$ relay for approximately 20 milliseconds after the $Rl_2$ relay contacts are closed. During this time interval after relay $Rl_2$ is closed and before relay $Rl_3$ is closed, both lines 525 and 526 are disconnected from the +225 volt source, leaving the common bus 533 de-energized. This releases all of the self-holding storage relays $Rl_{11}$ to $Rl_{14}$, $Rl_{21}$ to $Rl_{24}$, $Rl_{31}$ to $Rl_{34}$, and $Rl_{41}$ to $Rl_{44}$, inclusive, thus removing previously stored information. The above mentioned storage relays are therefore set or ready for the new address.

The winding of relay $Rl_4$ is also energized when relay $Rl_2$ closes by the line 534 to ground completing the circuit from the +225 volt source, through the winding of relay $Rl_4$, thence through the current limiting resistor 523, line 534, through the lower contacts of relay $Rl_2$ and ground.

The relay windings of relays $Rl_{10}$, $Rl_{20}$, and $Rl_{30}$ are energized by completing the circuit to the +225 volt source through the current linking resistor 540 to the common junction 539 thence through the upper three pairs of contacts on relay $Rl_4$. The winding of relay $Rl_{40}$ is also energized when relay $Rl_4$ closes by the following path: ground, through the winding of relay $Rl_{40}$, thence by line 535 through the lower pair of closed contacts of relay $Rl_4$, through resistor 551, through the parallel path composed of the capacitor 552 and the winding of relay $Rl_5$, and finally to the +225 volt source. The resistor 551 and the capacitor 552 form a time delay circuit such that relay $Rl_5$ closes a definite period of time after the input relays $Rl_{10}$, $Rl_{20}$, $Rl_{30}$, and $Rl_{40}$ are closed.

Once the relays $Rl_{10}$, $Rl_{20}$, $Rl_{30}$, and $Rl_{40}$ are closed, the sixteen input lines from the computer, 500 to 515, inclusive, are each connected to a relay winding of the storage relays. The other terminal of each relay winding of the storage relays is returned to the +225 volt source by way of the common bus 533. For example, the left terminal of the storage relay $Rl_{14}$ is connected to the input line 515 from the computer by way of line 550 and the lower contacts of relay $Rl_{10}$. The right terminal of the relay winding of relay $Rl_{14}$ is returned to the +225 volt source by way of line 530, thence by the common bus 533 to line 526, through the closed contacts of relay $Rl_4$ to the +225 volt source.

Each of the storage relay windings is connected to one of its own contacts such that once the relay is momentarily energized, a ground return is supplied through its own closed pair of contacts holding the relay energized, as for example, relay $Rl_{14}$ will be closed by a momentary ground applied to line 550 from the computer lead 515, but once closed, the lower set of contacts of the relay will supply a permanent ground by line 532, through the said lower contacts to the relay winding, thus holding the relay closed as long as line 530 is energized from the +225 volt potential.

Considering first the operation of the register during the search routine, the "search" operational command (a high potential on $S_2$ and a low potential on both $W_2$ and $R_2$ is followed by reception of the address from the computer.

As previously mentioned, the address is sent from the computer in binary signal form on the sixteenth input lines 500 to 515, inclusive, simultaneously, i.e., the four decimal digits of the address are all sent at once to the register.

The least significant decimal digit of the address is sent from the computer to the register in the form of four binary digits represented by a momentary ground or no ground on the input lines 500 to 503, inclusive; i.e., a grounded signal represents a binary "one" and an ungrounded signal (floating) represents a binary "zero." The second decimal digit of the address, which is the next to the least significant decimal digit, is sent from the computer to the register in the form of four binary digits (ground for binary "ones," and no ground for binary "zeros") on the input lines 504 to 507, inclusive. The third decimal digit of the address is sent from the computer on input lines 508 to 511, inclusive, and the most significant decimal digit appears in binary form on the input lines 512 to 515, inclusive.

An input signal represented by a ground on the input line (which is a binary "one" in the present system) causes the corresponding storage relay to close, and an input signal representing a binary "zero" (ungrounded line) leaves the corresponding storage relay unaffected (open). For example, if the input line 515 is grounded, the ground will appear on the left terminal of the winding of the storage relay $Rl_{44}$ by way of line 550. Since the other terminal of the relay winding is supplied with a +225 volt from the common bus 533 by way of line 530, relay $Rl_{14}$ will close. Once the relay closes, it will be held closed by its own closed lower contacts supplying a ground by way of line 532. In this way the address, which is sent from the computer on the input lines 500 to 515, inclusive, is stored in the storage relays.

Relay $Rl_5$ closes sufficiently later in time than relays $Rl_{10}$, $Rl_{20}$, $Rl_{30}$, and $Rl_{40}$ to insure that after the address is stored in the storage relays, the E1 proposition reverses state, i.e., $E_1$ becomes high and $E_1'$ becomes low. The $E_1'$ product, which is fed to the tape drive control 131 by line 181 (Fig. 1) signals the tape drive control 131 to put the tape in motion. The $E_1$ product is fed back to the computer 100, signaling the computer when high (+125 v.) that the address (or reading and recording instructions) are stored in the register.

Thus the computer is free for other computations, and the tape is set in motion for the second phase of the search routine.

Referring momentarily to Fig. 1, the decimal digits of the addresses read from the tape 140 will be received by the comparator 114 from the reader 112 in the order they are sensed from the tape by the multiple-head 130. It is seen that the forward motion of the tape is from right to left. When the tape is moving in the forward direction, the decimal digits of the address will be received by the comparator 114 from the reader 112 in the following order: $P_2$, $P_3$, $P_4$, and finally $P_5$, where the $P_2$ decimal digit is the least significant decimal digit of the address, and the $P_5$ decimal digit is the most significant decimal digit of the address.

As will be brought out in detail later on, the comparator operates by comparing decimal digit for decimal digit the address stored in the register with that read from the tape. Since the least significant decimal digit of the address read from the tape is received by the comparator 114 at $P_2$ digit time, the least significant decimal digit of the address stored in the register 116 is also sent to the comparator at $P_2$ time. Referring to Fig. 24, this is accomplished in the following manner.

The least significant decimal digit of the address received from the computer is stored in relays $Rl_{41}$ to $Rl_{44}$, inclusive, wherein an open relay represents a binary "zero" and a closed relay represents a binary "one." The outputs of the relay contacts $R_{41}$ to $R_{44}$, inclusive, which are associated with open relays, will be at +100 volts potential by way of the back contacts of the relays and the common +100 volt bus 560. The outputs of the relay contacts, which are associated with closed relays (storing a binary "one" therein), will be at the potential of the common bus 561. Thus all the relay outputs $R_{41}$ to $R_{44}$, inclusive, will be at a low potential (+100 v.) as long as the common bus 561 is at a low potential (+100 v.), regardless of whether the associated relay is closed or open. But whenever the common bus 561 is high (+125 v.), the outputs from the contacts of the closed relays (storing binary "ones" therein) will also be high, and the outputs from the open relays will still remain at +100 volts (low). Therefore, the time at which the four binary signals representing the least significant decimal digit of the address stored in the register will appear on the relay output lines will depend upon the time at which the potential on the common bus 561 is at +125 volts (high).

Similarly, the four binary digits of the second decimal digit of the address in the register will appear on the output lines $R_{31}$ to $R_{34}$, inclusive, when the common bus 562 is of a high potential (+125 v.). The binary signals representing the third decimal digit of the address stored in the storage relays $Rl_{21}$ to $Rl_{24}$, inclusive, will appear on the output lines $R_{21}$ to $R_{24}$, inclusive, when the common bus 563 is a +125 volts; and the fourth decimal digit of the address, i.e., the most significant decimal digit of the stored address will appear in the form of four binary digits on output lines $R_{11}$ to $R_{21}$, inclusive, when the common bus 564 is at a high potential. Thus by applying the $P_2$ output of the digit counter (Fig. 17) to the common bus 561, the least significant decimal digit of the address stored in the storage relays of the register will appear on the relay output lines $R_{41}$ to $R_{44}$, inclusive, at $P_2$ time. By applying the $P_3$ output of the digit counter on the common bus 562, the second decimal digit of the address in the register will appear on the outputs $R_{31}$ to $R_{34}$, inclusive, at the $P_3$ decimal digit period. Similarly, by applying the $P_4$ output of the digit counter on the common bus 563, the third decimal digit of the stored address in the register will appear in binary coded decimal form on outputs $R_{21}$ to $R_{24}$, inclusive, at $P_4$ time; and finally applying the $P_5$ output of the digit counter on the bus 564 causes the most significant decimal digit of the address within the register to appear as four binary signals on lines $R_{11}$ to $R_{21}$ at the $P_5$ digit pulse time.

As has been previously mentioned, during the search routine the tape is moved in both the forward and reverse direction. Therefore, provision must also be made to send the decimal digits of the address stored in the register to the comparator 114 in synchronism with the decimal digits read from the addresses recorded on the tape 140 when the tape is moving in the reverse direction.

As was previously explained in detail in relation to the clock reading circuitry of Fig. 4, clock pulses are read from the tape both in the forward and reverse tape motion in such a manner that the fall of the output $C_1$ of the clock flip-flop C1 occurs at the same point in time regardless of the direction of motion of the tape.

The digit and word counters 109 and 108, respectively, respond to the clock pulses C without regard to the direction of motion of the tape. In other words, the counters are in essence counting clock pulses from the clock reader 142*a* (Fig. 1) and makes no distinction as to the direction of motion of the tape when the clock pulses are sensed. Since the tape only reverses direction of motion when the multiple-head 130 (Fig. 1) is over the blank area of $W_s$ on the tape (Fig. 2), the counter will count the $P_b$ digit of the $W_{10}$ word of a block as the $P_b$ digit of the $W_s$ word when the tape is moving in reverse. This will be made clearer by reference to Figs. 27 and 28 which represent the actual digit and word position of a block on the tape in Fig. 27, and the apparent digit and word positions as seen from the standpoint of the digit and word counter when the tape is in reverse in Fig. 28. The tape is physically located in the two drawings so that each actual digit position, which is shown in Fig. 27, is vertically aligned with the corresponding apparent digit position as counted by the counters when the tape is moving in reverse, which is shown dotted in Fig. 28. Since the actual $P_b$ digit of the $W_{10}$ word is counted as the $P_b$ digit of the $W_s$ word when the tape is reversed, the $P_{10}$ digit of the $W_{10}$ word appears as the $P_0$ digit of the $W_0$ word, the $P_9$ of $W_{10}$ as the $P_1$ of $W_0$, and so on. Likewise the $P_{10}$ digit of the $W_0$ word becomes the apparent $P_0$ digit of the $W_{10}$ word; the $P_9$ digit of the $W_0$ word becomes the apparent $P_1$ digit of the $W_{10}$ word, etc. It is seen, therefore, that the digits $P_2$, $P_3$, $P_4$, and $P_5$ of the $W_0$ word, which contain the address of the block, become the apparent $P_8$, $P_7$, $P_6$, and $P_5$ digit positions of the $W_{10}$ word, respectively, when the tape is moving in reverse; i.e., $P_2W_0$ becomes $P_8W_{10}$, $P_3W_0$ becomes $P_7W_{10}$, $P_4W_0$ becomes $P_6W_{10}$, and $P_5W_0$ becomes $P_5W_{10}$.

Returning back to Fig. 24, the least significant decimal digit of the address stored in the storage relays $Rl_{41}$ to $Rl_{44}$, inclusive, in addition to being stepped out at $P_2$ time for the forward motion of the tape, should be stepped out at $P_8$ digit time for the reverse motion of the tape. The second decimal digit, stored in the $Rl_{31}$ to $Rl_{34}$, inclusive, relays should be stepped out at the $P_7$ digit period for the reverse motion of the tape. Similarly, the third decimal digit of the address stored in the $Rl_{21}$ to $Rl_{24}$ relays should be stepped out at the $P_6$ digit period for reverse motion of the tape, and the most significant decimal digit of the address stored in the relays $Rl_{11}$ to $Rl_{14}$ need only be stepped out at the $P_5$ digit period as the actual digit position in the forward tape motion and the apparent period in the reverse direction are both $P_5$ time.

Since the searching of a desired address on the tape is only done at high tape speed, the $H_1'$ output of the H1 proposition within the tape drive control 131 is also applied to all the common buses 561, 562, 563, and 564 of the register storage relays in order to make the storage relays effective for storing the recording and reading instructions which is done only at slow speed tape travel.

The common bus 561 should be high (+125 v.) when either $P_2$, $P_8$, or $H_1'$ is high. By the system of logical representation used throughout the present disclosure, this may be expressed by the logical sum $(P_2+P_8+H_1')$, which states that the sum will be high when either $P_2$, $P_8$, or $H_1'$ is high. Similarly, the logical sums $(P_3+P_7+H_1')$, $(P_4+P_6+H_1')$, and $(P_5+H_1')$ represent the required inputs to the common buses 562, 563, and 564, respectively.

In Fig. 26 are presented the circuits physically generating the above sums. The actual sums required are generated in each instance by a typical "or" logical network, such as the sum gate 600. The outputs of the sum gates are fed directly to cathode followers, such as the output 602 of the sum gate 600 is fed to the cathode follower 601. The cathode followers are conventional cathode followers well known in the prior art, which are used to increase the current capacity, without inverting, of the outputs of the sum gates.

Returning to Fig. 24, since each decimal digit of the address stored in the register 116 is stepped out at separate pulse times, the binary digit outputs may be combined in logical networks reducing the number of signal lines required to the comparator 114. For example, the least significant binary digit of each decimal digit may be combined in a logical "or" network, the output of which will be high when the tape is traveling at high speed in "searching"; at $P_2$ and $P_8$ time if relay $Rl_{41}$ is closed; $P_3$ and $P_7$ time if relay $Rl_{31}$ is closed; at $P_4$ and $P_6$ time if relay $Rl_{21}$ is closed; and at $P_5$ time if relay $Rl_{11}$ is closed. Identifying the output of this logical "or" circuit as $B_1$, the logical equation $$B_1=H_1(R_{41}+R_{31}+R_{21}+R_{11})$$

may be written which satisfies this condition. Similarly the second significant binary digit outputs may be combined by the equation $B_2=H_1(R_{42}+R_{32}+R_{22}+R_{12})$. The third binary digit outputs may be also combined by the equation $B_3=H_1(R_{43}+R_{33}+R_{23}+R_{13})$, and finally the most significant binary digit outputs may be combined in the logical equation $B_4=H_1(R_{44}+R_{34}+R_{24}+R_{14})$.

Fig. 30 presents the circuits for physically solving the logical equations for $B_1$, $B_2$, $B_3$, and $B_4$. The output of each sum gate, as for example the output 606 of the sum gate 603, is fed to a product gate 610, which has a second input $H_1$. The outputs of the product gates represent the solutions for the equations for $B_1$, $B_2$, $B_3$, and $B_4$ and are so labeled. It is noted, however, that the outputs $B_1$, $B_2$, $B_3$, and $B_4$ are fed directly to logical drivers, as shown at 605. These logical drivers are similar to the logical drivers **253*a* and 253*b* in Fig. 4 in that the output is a low impedance inverse of the input signal. In conformity with the system of nomenclature used throughout this presentation, the output 604**, which is the inverse of $B_1$ is designated as $B_1'$. Similarly, the inverse of $B_2$, $B_3$, and $B_4$ are designated as $B_2'$, $B_3'$, and $B_4'$, respectively.

The outputs $B_1'$, $B_2'$, $B_3'$, and $B_4'$ of the first logical drivers are fed to second logical drivers, such as $B_1'$ on line 604 is fed to the logical driver 607. The outputs of the second logical drivers will be a low impedance replica of the input signals $B_1$, $B_2$, $B_3$, and $B_4$ of the first logical drivers and are, therefore, so designated.

In accordance with the system of nomenclature used throughout this presentation, the $B_1$, $B_2$, $B_3$, and $B_4$ products may be considered the true outputs of propositions B1, B2, B3, and B4, respectively. Similarly, the $B_1'$, $B_2'$, $B_3'$, and $B_4'$ products may be considered the false outputs of propositions B1, B2, B3, and B4. In other words, B1, B2, B3, and B4 may be considered propositions having true and false states. For example, when the $B_1$ product is high, the proposition B1 is considered true; and when $B_1'$ is high, the B1 proposition is considered false.

In Fig. 23 is presented a table of a binary-coded decimal system in a conventional excess 3 code. The propositions B1, B2, B3, and B4 appear at the top of the vertical binary columns. To the left of the table appear the decimal equivalents of the binary states of the B1, B2, B3, and B4 propositions during a pulse period. A binary "one" signifies that the respective proposition is true, and a binary "zero" means that the proposition is false. For example, a "zero" in the B1 proposition column means that the $B_1$ product output is low and the $B_1'$ product output is high (Fig. 30).

The true and false products of the propositions B1, B2, B3, and B4 are fed to the comparator 114 (Fig. 1) on eight individual conductors, wherein the address stored in the register and that read from the tape are compared during the search routine.

As was previously suggested, the register 116 performs a dual function. In searching for a given block on the tape, the register stores the address of the block desired and steps out the stored address to the comparator 114 in synchronism with the addresses read from the tape. The register also stores the reading and recording instructions sent to the register from the computer following a read or record operational command.

Since three modes of reading and recording are used in the present invention, three of the register storage relays are used for storing these instructions; namely, relays $Rl_{41}$, $Rl_{31}$, and $Rl_{11}$.

The operational command to record information onto the tape or read information from the tape, represented by a high potential of $W_2$ or $R_2$, respectively (Fig. 25), is followed by the reading and recording instructions. These instructions are received from the computer in the form of ground and no ground signals on the three input lines 500, 504, and 512 (Fig. 24). When it is desired to read or record the "addresses" of blocks only, the computer causes the input line 500 to be grounded and input lines 504 and 512 to remain ungrounded (floating), thus causing relay $Rl_{41}$ to close. The instructions to read or record the "information" only are received as a ground on input line 504 and are stored in relay $Rl_{31}$, and the instructions to read or record both the "address and information" are received on input line 512 and are stored in relay $Rl_{11}$.

Since information is recorded onto the tape or read from the tape while the tape is moving at slow speed, the H1 proposition in the tape drive control 131 (Fig. 1) will be in the false state making $H_1'$ high. The common buses 561, 562, 563, and 564 will therefore be at a high potential during reading and recording. An "address" only instruction will be represented by a high potential on output $R_{41}$, an "information" only instruction will be characterized by $R_{31}$ being high, and an "address and information" instruction will be represented by a high potential on output $R_{11}$.

As was previously mentioned in relation to the recording circuitry of Fig. 9, a product $Q_1$ is sent to the recorder 122 from the register 116 by line 120 (Fig. 1) which limits the operation of the recorder in conformity to the instructions stored in the register. When the product signal $Q_1$ is high (+125 v.) the recorder 122 causes the information received from the computer 100 to be recorded on the tape 140, but when $Q_1$ is low (+100 v.) the recorder is inhibited from transferring information received from the computer onto the tape. Similarly, the clock pulses C, which are fed to the register from the clock reader **142*a* on line 101, are gated by the instructions stored in the register; and these gated clock pulses $C_s$ are sent to the computer 100 by line 104**. The computer sends information to be recorded onto the tape and reads information read from the tape in synchronism with these gated clock pulses $C_s$.

Since the address of the blocks is recorded in the $W_0$ word position and the information of the blocks is recorded in the $W_{1-10}$ word positions (Fig. 3), a logical equation for $Q_1$ and $C_s$ may be written as follows:

$$Q_1=R_{41}W_0+R_{31}(W_{1-10})+R_{11}$$
$$C_s=\{R_{41}W_0+R_{31}(W_{1-10})+R_{11}\}P_b'C$$

which state that $Q_1$ will be high and the gated clock pulses $C_s$ will be generated during the $W_0$ word time if the $R_{41}$ output is high, or during the $W_1$ to $W_{10}$ word times if the $R_{31}$ output is high, or at all times if the $R_{11}$ output is high. The clock pulse at the $P_b$ pulse period of each word is not sent back to the computer regardless of the nature of the read and record instructions. In order to gate out the $P_b$ pulse at all times from the $C_s$ line, the entire $C_s$ term is multiplied by $P_b'$. The circuitry for physically generating the product $Q_1$ and the gated clock pulses $C_s$, which satisfy the above logical equations, is presented in Fig. 29.

*The comparator*

Referring to Fig. 1, when it is desired to locate a particular block on the tape 140, the computer 100 sends a "search" operational command to the register 116 by way of lines 106 and 119. The register, upon receiving the search command, signals the tape drive control 131 by line 181 causing the tape to travel in the forward direction at high speed. Immediately following the search operational command, the computer sends the address of the block desired to the register 116 where it is stored in binary form.

As the decimal digits of the addresses recorded on the tape 140 are serially sent from the reader 112 to the comparator 114, the decimal digits of the address stored in the register 116 are stepped out and sent to the comparator in synchronism with the decimal digits read from the tape.

The decimal digits of the block addresses read from the tape are received by the comparator in binary signal form on eight separate conductors from the true and false outputs of the M1, M2, M3, and M4 proposition flip-flops in the reader 112 (Fig. 10). The decimal digits of the address stored in the register are also received by the comparator in binary signal form on eight separate conductors from the true and false outputs of propositions B1, B2, B3, and B4 generated within the register (Fig. 30). Therefore, during a given digit pulse period, the states of the M1, M2, M3, and M4 flip-flops within the reader 112, as signified by the potentials on their true and false outputs, represent the four binary digits of the decimal digit read from the tape during the digit pulse period. Similarly the states of the B1, B2, B3, and B4 propositions within the register, as signified by the potentials on their true and false product outputs, represent the four binary digits of the decimal digit stepped out of the register during the digit pulse period (Fig. 23).

Since the numerical values of the addresses of each block recorded on the tape arithmetically progress from the decimal number 0000 at the extreme left end of the tape to 9,999 at the extreme right end of the tape, the numerical value of each address read from the tape while the tape is moving in the forward direction will be numerically one decimal unit higher than that just previously read. Thus, when an address read from the tape is greater in numerical value than that stored in the register, the tape must be reversed in order to locate the block desired. Also since the tape always idles with the multiple-head 130 in the blank area $B_1$ at the beginning of the block desired when the desired block is located, the tape direction of travel must be reversed when the address read from the tape and that stored in the register are found to be equal (Fig. 2).

When the tape is moving in the reverse direction, the addresses read from the tape are compared for equality only with the address stored in the register. When the two addresses are found to be equal, the tape drive control 131 is signaled to stop the tape at the blank area $B_1$ of the block having an equal address to that stored in the register.

Since there are four decimal digits to each block address on the tape, the results of comparing each decimal digit of the addresses read from the tape with each decimal digit of the address sent from the register are placed into a flip-flop, K1, within the comparator 114. At the beginning of each block read from the tape at high speed (during the search routine), the K1 flip-flop is reset true. Then as each decimal digit of the address within the block is compared with each decimal digit of the address stored in the register, the results are placed in the K1 flip-flop. After comparing the four decimal digits of the address stored in the register with that read from the tape, the state of the K1 flip-flop determines whether the tape will be reversed, if moving in the forward direction, or stopped, if moving in the reverse direction. As will be brought out in detail later on, if the K1 flip-flop is in the true state at the termination of a comparison while the tape is moving in the forward direction, the tape is reversed. If the K1 flip-flop is false at this time, the tape continues on to the next block in the forward direction. When a comparison is made while the tape is traveling in the reverse direction, the tape is stopped if the K1 flip-flop is true at the end of the comparison, but continues to the next block in the reverse direction of travel if the K1 flip-flop is false at the end of the comparison.

The K1 flip-flop is also used to store the "stop" signal received from the computer 100 while the tape 140 is traveling in the forward direction at slow speed in reading or recording. For this purpose the K1 flip-flop is triggered false at the beginning of each word block read or recorded, and is triggered true at any point within the block upon reception of the "stop" signal from the computer, in which state it remains till the end of the block. If the K1 flip-flop is true at the end of a block in reading or recording, the tape drive control, in response to the high potential state of the true output $K_1$ of the K1 flip-flop, stops the tape at the $W_sB_1$ area of the following block.

The detailed circuitry of the comparator is presented in Figs. 31, 32, and 33.

Momentarily referring back to the table in Fig. 23, it is seen that for a particular decimal digit of an address read from the tape to be equal in value to the equivalent weight decimal digit of the address stored in the register, the binary digit represented by the state of the M1 proposition flip-flop within the reader must be equal to the binary digit represented by the state of the B1 proposition within the register, and a like similarity between the M2 and B2, M3 and B3, and M4 and B4 propositions.

Letting $D_1$ equal the product term which will be high when the state of the M1 proposition is equal to the state of the B1 proposition, the following logical equation may be written: $D_1=(M_1B_1+M_1'B_1')$.

Letting $D_2$ equal the product term which will be high when the M1 proposition is equal to the B1 proposition and the M2 proposition is also equal to the B2 proposition, the following equation may be written:

$$D_2=D_1(M_2B_2+M_2'B_2')$$

Similarly, if $D_3$ represents equality between the M1, M2, and M3 propositions and the B1, B2, and B3 propositions, respectively, the equation becomes:

$$D_3=D_2(M_3B_3+M_3'B_3')$$

And finally letting $D_4$ represent equality between all the binary digits of the decimal digit read from the tape and that received from the register during the pulse period, the following equation may be written:

$$D_4=D_3(M_4B_4+M_4'B_4')$$

In making the "greater than" comparison, which as previously stated is only done when the tape is moving in the forward direction, if the M4 flip-flop is in the true state (representing a binary "one") and the B4 proposition is in the false state (representing a binary "zero"), then the "greater than" comparison is satisfied regardless of the states of the other M and B propositions. Thus, letting $D_4$ represent the result of the "greater than" comparison for the entire decimal digit comparison, the following equation may be written:

$$D_4=M_4B_4'F_1$$

where $F_1$ is the true output of the F1 flip-flop in the tape drive control 131 (Fig. 1), which will be in the true state when the tape is traveling in the forward direction.

Combining the two above expressions for $D_4$, the following equation is obtained:

$$D_4=M_4B_4'F_1+D_3(M_4B_4+M_4'B_4')$$

If the M4 and B4 propositions are equal, the M3 and B3 propositions must be compared for a "greater than" relationship. This comparison may be added in the $D_3$ equation previously derived giving:

$$D_3=M_3B_3'F_1+D_2(M_3B_3+M_3'B_3')$$

In precisely similar manners, the $D_2$ and $D_1$ expressions may be enlarged to include the "greater than" expressions, giving:

$$D_2=M_2B_2'F_1+D_1(M_2B_2+M_2'B_2')$$
$$D_1=M_1B_1'F_1+K_1(M_1B_1+M_1'B_1')$$

The $K_1$ product in the $D_1$ expression represents the true output of the K1 flip-flop within the comparator previously mentioned. As will be brought out later, the K1 flip-flop is triggered true at the end of the pulse period when the $D_4$ product is high and triggered false when the $D_4$ product is low. Since the last decimal digit of an address read from the tape may be equal to the decimal digit received from the register during the same digit period, yet the decimal digit just previously compared may not have been equal, the $D_4$ product is not permitted to show equality during a decimal digit comparison of an address unless the previous decimal digits compared were equal, as indicated by the true state of the K1 flip-flop. The K1 flip-flop is reset true at the $B_1$ digit position of the $W_s$ word (Fig. 2) of each block so that the $K_1$ product will be high while the first decimal digit read from the address on the tape is compared with the decimal digit of the address stored in the register.

The equations for $D_1$, $D_2$, $D_3$, and $D_4$ appear below their respective networks for physically solving the equations in Fig. 32. The logical drivers appearing in the outputs of the $D_2$, $D_3$, and $D_4$ networks are for the purpose of increasing the current capacity of the $D_2$ and $D_3$ products in order to allow them to represent inputs of the other networks. It should be noted that both the true $D_4$ output and the false $D_4'$ output of the proposition $D_4$ are generated by use of logical drivers.

In Fig. 31 is presented the K1 flip-flop, previously mentioned, in block form. It should be noted that the flip-flop is triggered by the fall of the clock pulses C applied to both the true and false inputs when permitted to pass to the grid inputs by the gates.

As previously mentioned, the K1 flip-flop is triggered true at the end of a pulse period when the $D_4$ proposition is true and triggered false when the $D_4$ proposition is false (Fig. 32). Since the decimal digits of the addresses of the blocks are recorded on the tape in the $P_2$, $P_3$, $P_4$, and $P_5$ digit positions of the $W_0$ word of each block (Fig. 2), the inputs of the K1 flip-flop, when the tape is moving in the forward direction at high speed in search, may be written:

$$k_1=(P_2+P_3+P_4+P_5)W_0F_1H_1D_4C$$
$$_0k_1=(P_2+P_3+P_4+P_5)W_0F_1H_1D_4'C$$

where the $H_1$ term is the true output of the H1 proposition in the tape drive control 131 (Fig. 1) which will be in the true state when the tape is traveling at high speed, and the $F_1$ term is the true output of the F1 flip-flop which will be in the true state when the tape is traveling in the forward direction.

It was previously explained in connection with the register 116 that, when the tape is traveling in the reverse direction, the apparent position of the decimal digits of the addresses of blocks on the tape are in the $P_5$, $P_6$, $P_7$, and $P_8$ digit positions of the $W_{10}$ word (Figs. 27 and 28); therefore, the inputs to the K1 flip-flop, when the tape is traveling in reverse during search, will be:

$$k_1=(P_5+P_6+P_7+P_8)W_{10}R_1H_1D_4C$$
$$_0k_1=(P_5+P_6+P_7+P_8)W_{10}R_1H_1D_4'C$$

where the $R_1$ product is from the true output of the R1 flip-flop in the tape drive control 131 (Fig. 1) which will be in the true state when the tape is traveling in the reverse direction.

As previously mentioned, the K1 flip-flop is reset true during the block search at the beginning of each block. This is accomplished by the input logical network expressed by the equation $k_1=W_sP_bH_1C$, where the $H_1$ product is introduced to make the input effective only during block search.

In reading or recording, the "stop" signal ($U_{1r}$ or $U_{1w}$, Fig. 8), received from the computer, is stored in the K1 flip-flop until the termination of the block being read at the time of receiving the command, at which time a true state of the K1 flip-flop signals the tape drive control 131 (Fig. 1) to stop the tape. The logical input equations to store the "stop" signals in the K1 flip-flop appear below the flip-flop in the figure in the "Computer Stop Signal" row.

In order to insure that the condition of the K1 flip-flop at the end of each block in reading and recording represents the absence or presence of a "stop" signal from the computer, the K1 flip-flop is reset false at the $W_sB_1$ area of each block by the input $_0k_1=W_sB_1C_0$ which is included in the "reset" equation below the flip-flop in the figure.

The true and false input equations, combining the equations below the K1 flip-flop in Fig. 31, are presented below the networks for physically solving the equation in Fig. 33.

*The tape drive control*

The detailed circuitry of the tape drive control 131 is presented in Figs. 34, 35, and 36.

Referring first to Fig. 34, the tape drive control flip-flops F1 and R1 are symbolically presented together with their input triggering equations and their associated relay drivers. Since clock pulses C are generated by the clock reader 142a (Fig. 1) only when the tape is in motion, the tape drive control flip-flops are triggered by the auxiliary pulses $C_0$ from the multivibrator 154 (Fig. 1) which are independently generated at all times. It should be noted that the true input to the F1 flip-flop does not include the multivibrator pulses $C_0$. The F1 flip-flop is triggered true by the fall of the output 711 of the product gate 710. One input to this gate is the +125 v. source. The other input is $E_1'$. Referring momentarily to Fig. 24, the output $E_1'$ of the lower double throw contacts of relay $Rl_5$ is at +125 v. when the relay is de-energized. When the relay is energized, the potential on $E_1'$ will be indeterminate for a short period during the travel of the movable contact, and become +100 v. at the completion of the contact travel. Returning to Fig. 34, the output 711 of the product gate 710 will be at +125 v. as long as $E_1'$ is high. When the relay $Rl_5$ (Fig. 24) is energized, the output of the product gate will be held at +125 v. during the travel of the contacts of the relay $Rl_5$ by the +125 v. input to the gate. But the instant the contact travel of the relay $Rl_5$ is completed, the +100 v. potential of $E_1'$ will cause the output 711 of the gate to sharply drop to +100 v. This sudden drop from high to low of the input $f_1$ triggers the F1 flip-flop true.

The logical input equations of the F1 and R1 flip-flops below their respective flip-flops in Fig. 34. The circuitry for physically solving the input equations for the false input of the F1 flip-flop and both the true and false inputs to the R1 flip-flop are presented in Fig. 36.

The true output $F_1$ of the flip-flop in Fig. 34 is fed to a relay driver 703, and the true output $R_1$ of the R1 flip-flop is fed to a second relay driver 704. The output of relay driver 703 is fed by line 157 to the forward solenoid 155 (Fig. 1). The output 158 of relay driver 704 is fed to the reverse solenoid 151 (Fig. 1). The relay drivers 703 and 704 are similar to the relay driver 180 of Fig. 8. When $F_1$ is high (+125 v.), the forward solenoid 155 will be energized. When $R_1$ is high, the reverse solenoid 151 will be energized.

In Fig. 35 is presented the circuitry for controlling the speed of the two-speed tape drive motor 144 (Fig. 1). The output line 700 of a logical network is fed to a relay driver 701. The output 714 of the relay driver is connected to one terminal of the winding of a relay $Rl_{60}$. The other terminal of the relay winding is connected to the +225 v. D.C. source. The relay driver 701 is similar to the other relay drivers previously described. When the output line 700 of the logical network is high (+125 v.), the relay $Rl_{60}$ will be energized and when the output line 700 is low (+100 v.), the relay will be de-energized.

Relay $Rl_{60}$ has three sets of single pole double throw contacts. The movable contact of the upper set of contacts is connected to a 115 v. A.C. source. The normally closed contact of the upper set is applied to the low speed winding of the tape drive motor 144 (Fig. 1) by line 146, and the normally open contact is connected to the high speed winding of the motor by line 147.

The output of the movable contact of the middle set of contacts is designated $H_1$ and the output of the movable contact of the lower set is designated $H_1'$. The normally closed fixed contacts of the middle and lower set of contacts are connected to +100 v. and +125 v. sources, respectively; and the normally open fixed contacts are connected to +125 v. and +100 v., respectively.

Thus, when relay $Rl_{60}$ is de-energized, the low speed winding of the tape drive motor 144 is energized, the $H_1$ product is low and the $H_1'$ product is high. When the relay is energized, the high speed winding of the motor is energized, $H_1$ is high and $H_1'$ is low.

When it is desired to locate a particular block of information recorded on the tape, the search operational command sent by the computer is received by the tape drive control 131 by way of the R link in the form of a rise in potential of the $S_2$ line (Fig. 8) from +100 v. to +125 v. This causes the output line 700 of the logical network to be high, which in turn causes relay $Rl_{60}$ to be energized. The energizing of relay $Rl_{60}$ places the tape drive motor 144 in high speed and causes $H_1$ to go high and $H_1'$ to go low.

Referring back momentarily to Fig. 24, the time delay relay $Rl_5$ closes a given time after reception of the search command represented by a high potential on $S_2$. Therefore, for a short period of time, both $E_1'$ and $S_2$ will be simultaneously high.

Referring to Fig. 34, both the F1 and R1 flip-flops will be triggered false at $W_sB_1$ time (Fig. 2) in response to the portion of the input logical networks represented by the expressions: ${}_0f_1=S_2E_1'W_sB_1C_0$ and $${}_0r_1=S_2E_1'W_sB_1C_0$$

Thus the tape 140 (Fig. 1) is brought to a stop from any previous motion during the time delay between reception of a search command from the computer and the closing of the time delay relay $Rl_5$ of the register 116 (Fig. 24). When the time delay relay $Rl_5$ closes, signifying that the address sought is stored in the register relays, the sudden fall in potential of $E_1'$ from high to low will appear on the output 711 of the product gate 710 triggering the F1 flip-flop true, thus putting the tape in forward motion at high speed.

The purpose of using the product $S_2E_1'$ to trigger both the F1 and R1 flip-flops false is to prevent repetition of a previous search in case the $S_2$ command from the computer was not terminated upon reception (by the computer) of the $E_1$ signal (Fig. 24) at the inception of the previous search. Referring momentarily to Fig. 24, when the address is stored in the register storage relays, this fact is signaled to the computer by a rise in the product line $E_1$ (relay $Rl_5$ closes). The computer then releases the magnetic tape storage unit to proceed on the search routine by removal of the search operational command, i.e., $S_2$ changes from high to low (Figs. 8 and 25). Relay $Rl_5$ is then de-energized causing $E_1'$ to rise from low to high. If for any reason the search operational command is not released by the computer, $E_1'$ would stay low and the product $S_2E_1'$ would stay low, thus preventing the needless repetition of the search operation for the same address.

Referring to Fig. 35, the output line 700 of the logical network, which was made high by the search command $S_2$, will be held high when $S_2$ goes low by the product $F_1H_1$, keeping relay $Rl_{60}$ energized and thus causing the tape to remain in high speed travel after the computer removes the search operational command.

The tape continues in the forward direction at high speed until an address read from the tape is equal to or greater than the address stored in the register when the comparator 114 (Fig. 1) signals the tape drive control by a high potential on the true output of the K1 flip-flop within the comparator 114 (Fig. 31) at the $W_sB_1$ area of the block on the tape last read. Referring to Fig. 34, this signal causes the F1 flip-flop to be triggered false and the R1 flip-flop true by the portion of the input networks expressed by the logical equations: ${}_0f_1=K_1W_sB_1C_0$ and $r_1=H_1F_1K_1W_sB_1C_0$, respectively, thus reversing the tape direction of travel.

Referring momentarily to Fig. 35, since the input $R_1$ to the logical network goes high at the same fall of the auxiliary clock pulses $C_0$ that $F_1$ goes low, relay $Rl_{60}$ continues to remain energized by the product $R_1H_1$.

The tape continues traveling in the reverse direction at high speed until an address read from the tape by the reader 112 is equal to the address stored in the register 116 as determined by the comparator 114 (Fig. 1), at which time the comparator signals the tape drive control by a high potential on the true output $K_1$ of the K1 flip-flop within the comparator (Fig. 31) at the $W_sB_1$ area of the block last read. Referring to Fig. 34, this signal causes the R1 flip-flop to be triggered false by that portion of the input logical network expressed by the equation ${}_0r_1=K_1R_1W_sB_1C_0$, thus bringing the tape to a stop at the $W_sB_1$ area of the block last read.

In Fig. 35 it is seen that since $S_2$, $F_1$, and $R_1$ are all at a low potential, the output line 700 of the logical network will be low and relay $Rl_{60}$ will open, thus putting the tape drive motor 144 (Fig. 1) at slow speed.

Therefore, at the termination of the search routine, the tape 140 will be stationary with the multiple-head 130 over the blank area $W_sB_1$ (Fig. 2) of the block on the tape desired, and the capstans 142 and 143 will be rotating at slow speed.

When a read or record operational command is received by the register 116 (Fig. 1) from the computer 100, it will remain ineffective as long as any previously commenced search is in operation. The read or record commands are received by the register from the computer in the form of a high potential of $R_2$ for read or $W_2$ for record (Fig. 8). From Fig. 25 it is seen that the output of the sum gate 623 will not go high in response to a high potential on either $R_2$ or $W_s$ as long as $H_1'$ remains low. As previously mentioned in relation to Fig. 35, as long as a search is in progress, relay $Rl_{60}$ remains energized. Therefore, $H_1'$ will remain low until any previously commenced search is completed.

Storage of the read or record instructions, which are sent to the register from the computer, following the operational command, is signaled to the tape drive control by the fall of the output $E_1'$ of the $Rl_5$ relay in the register 116 (Fig. 24).

Returning to Fig. 34, the fall of $E_1'$, which will appear on the output 711 of gate 710 as a sudden drop from +125 v. to +100 v. triggers the F1 flip-flop true. Since the $Rl_{60}$ relay of Fig. 35 is de-energized, the tape is put in the forward motion at slow speed.

The F1 flip-flop remains in the true state, causing the tape to travel in the forward direction at slow speed, as long as the reading or writing process continues. When the computer 100 (Fig. 1) desires the reading or recording process to terminate, a "stop" signal is sent to the R link 115 signified by a high potential on the $U_1$ line (Fig. 8). This "stop" signal is received by the comparator 114 from the R link by a high potential $U_{1r}$ line (for read) or the $U_{1w}$ line (for record). Referring momentarily to Fig. 31, it is seen that a high condition of the $U_{1r}$ or $U_{1w}$ product will trigger the K1 flip-flop true at the fall of each clock pulse according to the input logical equation $k_1=(U_{1r}+U_{1w})C$. Returning to Fig. 34, the F1 flip-flop will be triggered false at $W_sB_1$ time by the input network expressed in logical equation form as $${}_0f_1=K_1W_sB_1C_0$$

thus stopping the tape at the beginning of the block following the reception of the "stop" signal from the computer.

*Operation*

Assume the tape is in rest at the $W_sB_1$ area (Fig. 2) of block number 8,360 and it is desired to locate block number 8,362.

Referring to Fig. 1, the computer 100 sends a "search" operational command to the R link 115 on line 106. Referring to Fig. 8, this search command will be received by the R link as a high potential on line $S_2$ and a low potential on lines $W_2$ and $R_2$. The $S_2$ signal will not affect the R link but is passed to the register 116 and to the tape drive control 131. In Fig. 24 it is seen that the input $(S_2+W_2H_1'+R_2H_1')$ will rise causing the register storage relays to reset preparatory to storing the address desired from the computer. Referring to Fig. 35, the $S_2$ signal will cause relay $Rl_{60}$ to close, putting the tape drive motor 144 (Fig. 1) in high speed.

Returning to Fig. 1, immediately following the search command, the computer 100 sends the address 8,362 to the register 116 by way of line 105. The address is stored in the register storage relays of Fig. 24 in the excess 3 binary coded decimal form. When relay $Rl_5$ closes, signifying that the address desired is stored, the rise in the product $E_1$ signals the computer, freeing it for other computations. The fall in the $E_1'$ product triggers the F1 flip-flop of Fig. 34 true, putting the tape in forward motion at high speed.

Referring back to Fig. 1, the least significant decimal digit "zero" of the address of block 8,360 read from the tape 140 is sent to the comparator 114 from the reader 112 on proposition lines M1 to M4, inclusive, at the $P_2$ digit period (Fig. 2). During the same period the least significant decimal digit "two" of the address 8,362 stored in the register 116 is stepped out to the comparator 114 on proposition lines B1 to B4, inclusive. From Fig. 23 it is seen that the decimal zero from the reader 112 is characterized by the true states of the M1 and M2 propositions, and the false states of the M3 and M4 propositions. The decimal two from the comparator 114 is characterized by the true states of the B1 and B3 propositions and the false states of the B2 and B4 propositions.

Referring to Fig. 32, it is seen that the $D_4$ product will be low and the $D_4'$ product high during the $P_2$ digit period. From Fig. 31, the K1 flip-flop within the comparator will be triggered false at the end of the $P_2$ digit period, and will therefore be in the false state at the $W_sB_1$ area of the succeeding block on the tape.

Momentarily returning to Fig. 1, during the $P_3$ digit period (Fig. 2) the decimal digit "six" from the address on the tape 140 will be received by the comparator 114 from the reader 112 on the proposition lines M1 to M4, inclusive. At the same time the decimal digit "six" of the address stored in the register 116 will be stepped out of the proposition lines B1 to B4, inclusive, and sent to the comparator 114. Similarly, during $P_4$ time the comparator will receive the decimal digit "three" from both the reader 112 and the register 116, and finally the most significant digit "eight" read from the tape and stored in the register will be received at $P_5$ time by the comparator. Therefore, during $P_3$, $P_4$, and $P_5$ digit periods, M1 will equal B1, M2 will equal B2, M3 will equal B3, and M4 will equal B4.

Returning to Fig. 32, since the K1 flip-flop is in the false state during the $P_2$ digit period, the product $D_4$ will be low and the product $D_4'$ will be high during the $P_2$ period. Therefore, the K1 flip-flop in Fig. 31 will again be triggered false at the end of the $P_2$ pulse period. In a similar manner, the K1 flip-flop will be triggered false at the end of the $P_3$, $P_4$, and $P_5$ pulse periods.

Referring to Fig. 34, since the K1 flip-flop is in the false state at the $W_sB_1$ area of the block, the F1 and R1 flip-flops of the tape drive control are undisturbed and the tape continues on in the forward direction at high speed.

In comparing the address 8,361 of the following block on the tape with the address 8,362 in the register, a similar process takes place and the K1 flip-flop of the comparator will be in the false state at the $W_sB_1$ area of the succeeding block of block address 8,362, permitting the tape to continue on in the forward direction at high speed.

During the comparison of the address of block 8,362 as sensed from the tape and the address 8,362 stored in the register, the logical equation for the $D_4$ product of Fig. 32 will be satisfied causing the K1 flip-flop of Fig. 32 to be triggered true at the end of the $P_2$, $P_3$, $P_4$, and $P_5$ digit periods, making the true output $K_1$ of the flip-flop high during the $W_sB_1$ area of the succeeding block on the tape. Referring to Fig. 34, it is seen that the true state of the K1 flip-flop during the $W_sB_1$ time will cause the F1 flip-flop to be triggered false and the R1 flip-flop true at the end of the $W_sB_1$ time, thus reversing the direction of travel of the tape.

Referring momentarily to Fig. 1, while the tape 140 is traveling in the reverse direction, the most significant decimal digit of the address read from the tape is sent to the comparator 114 from the reader 112 at the $P_5$ digit period on proposition lines M1 to M4, inclusive (Fig. 28). At the same time the most significant decimal digit of the address stored in the register 116 is stepped out to the comparator on proposition lines B1 to B4, inclusive. Similarly, the remaining decimal digits of the address read from the tape 140 are received by the comparator 114 in unison with the remaining decimal digits of the address stored in the register 116 at the $P_6$, $P_7$, and $P_8$ pulse periods.

Since the two addresses compared are alike, the equation for the $D_4$ product will be satisfied during the $P_5$, $P_6$, $P_7$, and $P_8$ pulse periods and the K1 flip-flop of Fig. 31 will be triggered true at the end of each of the said periods and therefore enter the $W_sB_1$ area of the block in the true state.

From Fig. 34 it is seen that the R1 flip-flop will be triggered false at the fall of the first multivibrator clock pulse $C_0$ at the $W_sB_1$ digit count, thus stopping the tape at the beginning of the block desired. Referring to Fig. 35 since both products $F_1$ and $R_1$ are low, the relay $Rl_{60}$ will be de-energized reducing the tape drive motor 144 to slow speed.

Returning to Fig. 1, assume it is desired to record information on the tape 140 and further assume it is desired to record the information in the "information" area of the block 8,362 previously located and also the "information" areas of the two following blocks 8,363 and 8,364.

The computer 100 first sends a "record" operational command to the R link 115 on line 107. Referring to Fig. 8, the record command is received by a high potential on line $W_2$ and a low potential on lines $S_2$ and $R_2$. When $W_2$ rises, relays $Rl_{50}$ and $Rl_{51}$ are energized by way of the relay driver 180 thus connecting the input lines $T_1$, $T_2$, $T_3$, and $T_4$ from the computer to the $X_1$, $X_2$, $X_3$, and $X_4$ lines to the recorder 122 (Fig. 1), and the stop signal line $U_1$ from the computer to the comparator 116 (Fig. 1) as well as connecting the supply voltage V to the plates of the record tubes in the recorder (Fig. 9). The $W_2$ record command is also sent to the register 116 (Fig. 1).

Referring to Fig. 24, the reception of the record command resets the register storage relays preparatory to storing the recording instructions.

Returning to Fig. 1, immediately following the record operational command, the computer 100 sends the recording instructions to the register 116 by line 105 where they are stored. In this instance the "information only" record instructions are stored in the register storage relay $Rl_{31}$ of the register of Fig. 24. When relay $Rl_5$ closes, signifying that the record instructions are stored, the rise in the product line $E_1$ signals the computer to send the information to be recorded, and the fall in potential of the product $E_1'$ triggers the F1 flip-flop of Fig. 34 true in the tape drive control 131 putting the tape in forward motion at slow speed.

Referring to Fig. 29, it is seen that since the $R_{31}$ product (Fig. 24) is high and $R_{41}$ and $R_{11}$ are low, the gated clock pulses $C_s$ will only be generated and the $Q_1$ product will only be high during $W_1$ to $W_{10}$ word periods of each block.

Returning to Fig. 1, the gated clock pulses $C_s$ are sent from the register 116 to the computer 100 on line 104, and the product $Q_1$ is sent to the recorder 122 from the register on line 120.

The computer 100 sends the information to be recorded to the recorder 122 via the R link 115 in synchronization with the gated clock pulses $C_s$.

From the detailed circuitry of the recorder presented in Fig. 9, it is seen that the recorder records on the tape 140 the information received on input lines $X_1$, $X_2$, $X_3$, and $X_4$ from the computer only during the time the product $Q_1$ is high. Thus the information received from the computer is recorded during the $W_1$ to $W_{10}$ word periods only (Fig. 2) in accordance with the instructions previously received from the computer.

The recording process continues in this manner for blocks 8,362, 8,363, and 8,364. At the end of the last block, it is desired to discontinue the recording process.

Referring to Fig. 8, in order to discontinue recording, the computer sends a "stop" signal to the R link at any time during recording in the 8,364 block by a rise from low to high of the product line $U_1$, which is connected by the contacts of relay $Rl_{51}$ to the $U_{1W}$ product line to the comparator 114 (Fig. 1). From Fig. 31, it is seen that if the $U_{1W}$ product is high at any time, the K1 flip-flop is triggered true and remains in this state for the remainder of the block. By reference to Fig. 34, it is apparent that the true state of the K1 flip-flop triggers the F1 flip-flop false at the $W_sB_1$ area of the following block thus stopping the tape at the beginning of block 8,365.

Now assume it is desired to read both the address and information of the next three blocks, viz. 8,365, 8,366, and 8,367 recorded on the tape to the computer.

Referring to Fig. 1, the computer 100 sends a "read" operational command to the R link 115 by way of line 107. Referring momentarily to Fig. 8, the "read" command is received by a high potential on line $R_2$ which causes the computer lines $T_1$, $T_2$, $T_3$, and $T_4$ to be connected to the reader output lines $M_1$, $M_2$, $M_3$, and $M_4$, and connects the "stop" signal $U_1$ from the computer to the product line $U_{1r}$ to the comparator. The $R_2$ "read" command is also received by the register 116 of Fig. 24, the storage relays of which are reset as a result of the reception of the command. The "address and information" reading instructions, which are received by the register after reception of the "read" operational command, are stored in relay $Rl_{11}$ of the register. The drop in potential of $E_1'$, caused by the energizing of relay $Rl_5$, triggers the F1 flip-flop of Fig. 34 true, thus putting the tape in forward motion at slow speed.

Returning to Fig. 1, the information recorded on the tape 140 is sensed by the multiple-head 130 and the sensed voltage signals sent to the reader 112 by line 129. The sensed signals are synchronized with the clock pulses C in the reader and the synchronized signals trigger the M1 to M4 flip-flops in the reader as evidenced by the reader circuit of Fig. 10. The true outputs of the M1 to M4 flip-flops, which are connected to the computer lines $T_1$ to $T_4$ by way of the R link (Fig. 8), reproduce the information recorded on the tape.

Referring to Fig. 29, since the reading instructions were stored in the $Rl_{11}$ relay of the register (Fig. 24), the product $R_{11}$ will be high and the gated clock pulses $C_s$ will be generated at all times except during the $P_b$ digit periods. Returning to Fig. 1, these gated clock pulses $C_s$ are sent from the register to the computer on line 104.

In the computer 100 the binary signals received by line 107 ($T_1$, $T_2$, $T_3$, and $T_4$ of Fig. 8) from the reader 112 are combined with the gated clock pulses $C_s$, and the combined signals trigger the reading flip-flop within the computer.

At any time during the reading of block 8,367, the computer 100 sends a "stop" signal to the comparator 114 via the R link 115 which will be received by the comparator in the form of a high potential on product $U_{1r}$ (Fig. 8). Referring to Fig. 31, this will trigger the K1 flip-flop true at the fall of the next clock period. Referring to Fig. 34, the true state of the K1 flip-flop at the $W_sB_1$ area of the following block will cause the F1 flip-flop to be triggered false, thus stopping the tape at the beginning of the 8,368 block.

While the form of the invention shown and described herein is admirably adapted to fulfill the objects primarily stated, it is to be understood that it is not intended to confine the invention to the one form or embodiment disclosed herein, for it is susceptible of embodiment in various other forms.

What is claimed is:

1. Apparatus for controlling the movement of a magnetic tape comprising: a motor; a pair of capstans spanned by said magnetic tape and connected to be continually driven in a clockwise and counterclockwise direction, respectively, by said motor; a roller associated with each of said capstans; engaging means capable of holding one of said rollers at a time against its capstan for imparting motion to said tape in either a forward or reverse direction; a plurality of magnetic heads positioned adjacent the surface of said tape for sensing addresses previously recorded on successive blocks thereof in an ascending numerical order as the tape is traveling in the forward direction; a relay register for storing an address corresponding to one of the blocks on said tape; means for comparing the addresses sensed by said magnetic heads with the address in said relay register; means operable when said tape is moving in the forward direction to engage the opposite roller when said comparing means indicates that the address sensed by said magnetic heads is greater than or equal to the address stored in said relay register and also operable when said tape is moving in the reverse direction to disengage said opposite roller to stop said tape when said comparing means indicates that the address sensed by said magnetic heads is equal to the address stored in said relay register.

2. Apparatus for controlling the movement of a magnetic tape, said tape having information serially recorded thereon in blocks, each block including an area on one end thereof in which the block address is recorded, comprising: a motor; a pair of capstans spanned by said magnetic tape and connected to be continually driven in a clockwise and counterclockwise direction by said motor; a forward and a reverse engaging means capable of holding said tape against one or the other of said capstans; means positioned adjacent the surface of said tape for sensing the addresses previously magnetically recorded thereon, said addresses being sensed in ascending numerical order as the tape is traveling in the forward direction; storage means for storing an address corresponding to one of the designated blocks of said tape; means for comparing the addresses sensed by said sensing means with the address stored in said storage means; means operable when said tape is moving in the forward direction to de-energize said forward engaging means and energize said reverse engaging means when said comparing means indicates the address sensed by said sensing means is greater than or equal to the address stored in said storing means; and means operable when said tape is moving in the reverse direction to de-energize said reverse engaging means so as to terminate the motion of said tape when said comparing means indicates the address sensed by said sensing means is equal to the address stored in said storing means.

3. A storage system comprising: tape driving means capable of moving a magnetic tape in a forward or reverse direction past a read-record station; means positioned at said read-record station for sensing addresses previously magnetically recorded in ascending order on portions of successive areas of said tape; storage means for storing signals corresponding to the address of a desired area on said tape; means for comparing the addresses sensed by said sensing means with the address signals in said storage means; a first means responsive to a search operational signal from an outside source to change the direction of motion of said tape when said comparing means indicates the address stored in said sensing means is greater than or equal to the address stored by said storing means; a second means responsive to said search operational signal and operable after said first means to terminate the movement of said tape when said comparing means indicates the address sensed by said sensing means is equal to the address stored in said storage means; and means responsive to a read or record operational signal received from said outside source while said search operation is going on to move said tape, including the portion of the desired area having the address recording thereon, in a forward direction past said read-record station upon completion of said seach operation.

4. In a storage system, apparatus for controlling the movement of a magnetic tape comprising: tape driving means capable of moving said magnetic tape in a forward or reverse direction past a read-record station; magnetic heads positioned at said read-record station for sensing addresses previously recorded in ascending order on successive areas thereof; means for storing information corresponding to the address of a desired area on said tape; means for comparing the addresses sensed by said magnetic heads with the address in said storage means; means for receiving a search operational signal from an outside source; a first means responsive to said search signal to change the direction of motion of said tape when said comparing means indicates the address sensed by said magnetic heads is equal to or of the incorrect relative order for locating the address stored in said storing means by continuing to move the tape in the same direction; a second means responsive to said search signal and operable after said first means to terminate the movement of said tape when said comparing means indicates the address sensed by said magnetic heads is equal to the address stored in said storing means; means for receiving a record operational signal from said outside source; a third means responsive to said record signal upon completion of said search operation to move said tape in a forward direction past said read-record position; and means capable of operating during said record operation to alter the addresses on the areas of said tape by impressing signals on said magnetic heads received from said outside source.

5. Apparatus for controlling the movement of a magnetic tape comprising: tape driving means capable of moving said magnetic tape in a forward or reverse direction; means positioned adjacent the surface of said tape for sensing address signals previously magnetically recorded in ascending numerical order on successive longitudinal areas thereof; means for storing address signals corresponding to the address signals recorded in a desired area on said tape; means for comparing the address signals as sensed by said sensing means with the address signals in said storage means; and means controlling said tape driving means when said tape is moving in a one of its possible directions of movement to move said tape in its other possible direction of movement when said comparing means indicates the address sensed by said sensing means is equal to or of the incorrect relative numerical order for accessing by this direction the address stored in said storing means and also being effective to control said tape driving means when said tape is moving in said other direction to terminate the movement of said tape when said comparing means indicates the address sensed by said sensing means is identical to the address stored by said storing means.

6. Apparatus for controlling the movement of a magnetic tape comprising: driving means for moving said tape in either a forward or reverse direction; a plurality of magnetic heads positioned adjacent the surface of said tape for sensing address signals previously recorded on successive areas thereof; a relay register for storing address signals corresponding to the address signals recorded in a given area on said tape; a comparing circuit for comparing the address signals as sensed by said magnetic heads with the address signals in said relay register; means including a decision flip-flop responsive to the output of said comparing circuit for controlling said driving means; said decision flip-flop being operable when said tape is moving in a forward direction to reverse its direction when the address sensed by said magnetic heads is greater than or equal to the address stored in said relay register, and said decision flip-flop being further operable when said tape is moving in a reverse direction to terminate the movement of said tape when the address sensed by said magnetic heads is equal to the address stored in said relay register.

7. Apparatus for controlling the movement of a magnetic tape comprising: tape driving means capable of moving said magnetic tape in a forward or reverse direction past a read-record station; means positioned at said read-record station for sensing addresses previously magnetically recorded in ascending order on successive areas thereof; storage means for storing an address corresponding to the address of a desired area on said tape; means for comparing the addresses sensed by said sensing means with the address in said storage means; a first means for controlling said tape driving means when said tape is moving in a forward direction to reverse its motion when said comparing means indicates the address sensed by said sensing means is equal to or of the incorrect relative order for locating the address stored in said storing means by continuing to move the tape in the forward direction; a second means whose operation follows said first means for controlling said tape driving means so as to terminate the reverse motion of said tape when said comparing means indicates the address sensed by said sensing means is equal to the address stored in said storing means; and a third means whose operation follows said second means for controlling said tape driving means so as to move the desired area of said tape in a forward direction past said read-record station.

8. A system for storing information in longitudinally spaced portions of a magnetic tape comprising: tape driving means capable of moving said magnetic tape in a forward or reverse direction past a read-record position; transducing means positioned at said read-record position for sensing addresses previously magnetically recorded in ascending order on each of the longitudinal portions thereof; storage means for storing an address corresponding to the address of a given longitudinal portion on said tape; means for comparing the addresses sensed by said transducing means with the address in said storage means; a first means responsive to a search signal from an outside source to change direction of motion of said tape from forward to reverse direction when said comparing means indicates the address sensed by said transducing means is greater than or equal to the address stored in said storing means; a second means responsive to said search signal and operable after said first means to terminate the movement of said tape when said comparing means indicates the address sensed by said transducing means is equal to the address stored in said storing means; a third means responsive to a read or record signal received from said outside source to move said tape in a forward direction past said read-record position after said search operation is completed; and a fourth means including said storage means responsive to an instruction signal received from said outside source for limiting the information sensed from or recorded by said transducing means on each longitudinally spaced portion by said sensing means of said tape as it is moved past said read-record position.

9. A magnetic storage system comprising: a magnetic tape having recorded in successive blocks thereof an address represented by a plurality of groups of binary signals, each group corresponding to a decimal digit; driving means for moving said tape in a forward or reverse direction past a read-record station; a plurality of magnetic heads positioned at said read-record station for successively sensing each group of binary signals representing an address of a block on said tape; storage means for simultaneously storing a plurality of groups of binary signals representing the decimal digits of an address of a desired block on said tape; an output circuit for said storage means for successively feeding out each group of signals stored therein; means for successively comparing the group of binary signals as sensed on said output circuit with the corresponding group of binary signals as sensed from said reading means; means connected to said driving means for controlling the direction of the movement of said tape in accordance with the output of said comparing means; and means for feeding out the groups of binary signals on said output circuit in reverse order when said tape is moved past said read-record station in a reverse direction.

10. A magnetic storage system comprising: a magnetic tape having information serially recorded thereon in blocks, each block including a blank area followed by an area in which the block address is magnetically recorded and thereafter by an area in which other block data signals are magnetically recorded; means for moving said magnetic tape first in a forward and then in a reverse direction; sensing means positioned adjacent the surface of said moving tape for sensing said block address signals and also the remaining data signals in the block; storage means for storing signals corresponding to the address signals of one of the blocks of said tape to be communicated with; means for comparing the block address signals sensed by said sensing means with the signals in said storage means when the tape is moving in both directions; means under the control of said comparing means when the tape is moving in a forward direction to reverse the direction of the tape when the comparison indicates the relative location of the blank area of the desired block is in the opposite direction on the tape; and further means under the control of said comparing means when the tape is moving in the reverse direction for terminating the movement of said tape such that said sensing means is positioned in the blank area of the block to be communicated with when said comparison indicates the address signals are identical.

11. A magnetic storage system comprising: a magnetic tape having timing signals serially recorded in groups along longitudinally spaced portions thereof; means capable of longitudinally moving said magnetic tape past a reading position in either a forward or reverse direction; means located at said reading position for generating square wave pulses in response to said timing signal recording, said latter means including circuits for generating the fall of each square wave pulse at the end of the period of the timing signal sensed from the tape; and counting means advanced by the fall of said square wave pulses for generating signals defining the unit areas along each of the spaced portions of said moving tape as defined by said recordings irrespective of the direction of motion of said tape.

12. A magnetic storage system comprising: a magnetic tape having timing signals serially recorded in groups along the length of said tape; means capable of longitudinally moving said magnetic tape past a reading position in either a forward or reverse direction; and sensing means located at said reading position for generating square wave pulses in response to said timing signal recordings; said latter means including circuits for enabling the fall of said square wave pulses to be generated at precisely the end of the period of a timing signal sensed from the tape irrespective of the direction of tape motion.

13. A magnetic storage system comprising: a magnetic tape; means for serially recording timing signals in fixed areas spaced along the length of said tape; means capable of longitudinally moving said magnetic tape past a reading position in either a forward or reverse direction; reading means located at said reading position for generating signals in response to said timing signal recording; a flip-flop circuit having an output; and circuit means responsive to signals generated by said reading means for triggering said flip-flop circuit such that the fall of the waveform generated on the output of said flip-flop circuit occurs at the end of the periods of the recorded timing signals irrespective of the direction of movement of said tape.

14. In a storage system, a magnetic tape; means for serially recording timing signals in areas spaced along the length of said tape; means capable of longitudinally moving said magnetic tape past a reading position in either a forward or reverse direction; sensing means located at said reading positions for generating signals in response to said timing signal recording; a flip-flop circuit having an output; gating means for triggering said flip-flop circuit in response to signals generated by said sensing means such that the fall of the signal on the output of said flip-flop circuit occurs at the end of the period of the timing signal being sensed irrespective of the direction of motion of said tape; and means triggered by the fall of the signal on said output for generating a signal inhibiting said flip-flop gating means from operating during the first portion of the period of the following timing signal being sensed from said tape.

15. A magnetic storage system comprising: a magnetic tape; means for serially recording clock pulses on longitudinally spaced portions of said tape; means capable of moving said magnetic tape past a reading position at a fixed speed in either a forward or reverse direction; means located at said reading position for generating square wave pulses from said clock recording, said square wave pulse generating means including circuits for enabling the fall of said square wave pulses to be generated at precisely the end of the period of a clock pulse read from said tape; counting means responsive to the fall of said square wave pulses for generating signals defining the unit areas along each of the longitudinally spaced portions of the moving tape for both said directions of motion of the tape; and means responsive to signals on the tape identified by said counting means for stopping said tape movement in the spacing between the recording portions on the tape.

16. A magnetic storage system comprising: a magnetic tape; means for serially recording clock pulses in longitudinal areas separated by blank spaces along the length of said tape; means capable of moving said magnetic tape past a reading position at a fixed speed in either a forward or reverse direction; means located at said reading position for generating square wave pulses from said clock recording; means counting said square wave pulses for defining the unit areas along the longitudinal area of the moving tape for both said directions of motion of the tape; means capable of stopping said tape in the blank space between the longitudinal areas on the tape; an auxiliary source of clock pulses; and means responsive to the output of said square wave pulse generating means for gating clock pulses from said auxiliary source to reset said counting means to a count indicative of the blank space on said tape during the period that said tape is not moving.

17. Apparatus for controlling the movement of a magnetic tape having information recorded thereon in blocks, each block including a blank area and an area adjacent the blank area in which block address signals are magnetically recorded in a manner similar to the information signals in the remainder of the block comprising: tape driving means capable of moving said magnetic tape in a forward or reverse direction; a plurality of magnetic heads located at a reading position to sense signals on said tape; means for storing address signals; means for comparing the address signals as sensed by said magnetic heads with the address signals in said storage means; and control means connected to said tape driving means for advancing said tape in a forward direction until said comparing means indicates that the blank area of the block to be communicated with is in the opposite direction on the tape, said control means being then operable to advance said tape in said reverse direction until said comparing means indicates that the blank area of the block to be communicated with is located at said reading position.

18. Apparatus for controlling the movement of a magnetic tape having clock pulses serially recorded on longitudinally spaced portions thereof comprising: tape driving means capable of moving said tape past a read-record position in either a forward or reverse direction; means located at said read-record position for generating square wave pulses from said clock recording, said square wave pulse generating means including circuits for enabling the fall of said square wave pulses to be generated at the end of the period of a clock pulse read from said tape irrespective of the direction of motion thereof; counting means actuated by the fall of said square wave pulses for generating signals representing predefined unit areas in each of said longitudinally spaced portions of the moving tape; a storage means for storing signals corresponding to those in one of the portions of the tape; and means controlling said tape driving means in accordance with the information in said predefined unit areas and said storage means for repositioning said tape such that the space preceding the desired portion of said tape is located at said read-record position.

19. A storage system according to claim 3 characterized in that there is provided means for searching for a predefined area on the tape by reading addresses recorded thereon while the tape is moving at high speed in a forward or reverse direction; means for reading information from or recording information on to selected areas of the tape while the tape is moving at slow speed in a forward direction; and means for maintaining the amplitude of the information signals read from the tape relatively constant during both high and low speeds.

References Cited in the file of this patent

UNITED STATES PATENTS

| | | |
|---|---|---|
| 2,611,813 | Sharpless et al. | Sept. 23, 1952 |
| 2,628,346 | Burkhart | Feb. 10, 1953 |
| 2,679,551 | Newby | May 25, 1954 |
| 2,692,728 | Strickler | Oct. 26, 1954 |
| 2,721,990 | McNaney | Oct. 25, 1955 |
| 2,782,398 | West et al. | Feb. 19, 1957 |

OTHER REFERENCES

"The Raydac System and Its External Memory," by K. M. Rehler in Review of Input and Output Equipment Used in Computing Systems, Joint AIEE–IRE–ACM Computer Conference, March 1953 (pages 63–70).

UNITED STATES PATENT OFFICE

CERTIFICATE OF CORRECTION

Patent No. 2,954,546 September 27, 1960

Cecil H. Burns, Jr., et al.

It is hereby certified that error appears in the printed specification of the above numbered patent requiring correction and that the said Letters Patent should read as corrected below.

Column 7, line 49, for "tap" read -- tape --; column 20, line 5, for "rest" read -- reset --; column 22, line 52, for "chanels" read -- channels --; column 35, line 15, for "a" read -- at --; column 42, line 32, after "flip-flops" insert -- appear --; line 37, before "flip-flop" insert -- F1 --; column 49, line 9, for "seach" read -- search --.

Signed and sealed this 11th day of April 1961.

(SEAL)
Attest:

ERNEST W. SWIDER
Attesting Officer

ARTHUR W. CROCKER
Acting Commissioner of Patents